United States Patent
Suwa et al.

(10) Patent No.: US 10,458,611 B2
(45) Date of Patent: *Oct. 29, 2019

(54) HEADLIGHT MODULE AND HEADLIGHT DEVICE

(71) Applicant: Mitsubishi Electric Corporation, Tokyo (JP)

(72) Inventors: Masashige Suwa, Tokyo (JP); Ritsuya Oshima, Tokyo (JP); Kuniko Kojima, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,908

(22) Filed: Mar. 7, 2019

(65) Prior Publication Data

US 2019/0203895 A1    Jul. 4, 2019

Related U.S. Application Data

(63) Continuation of application No. 15/907,772, filed on Feb. 28, 2018, now Pat. No. 10,267,472, which is a (Continued)

(30) Foreign Application Priority Data

Nov. 19, 2013 (JP) .................................. 2013-238884

(51) Int. Cl.
*F21V 9/00* (2018.01)
*F21S 41/143* (2018.01)
(Continued)

(52) U.S. Cl.
CPC .............. *F21S 41/143* (2018.01); *B60Q 1/12* (2013.01); *B62J 6/02* (2013.01); *F21S 41/24* (2018.01);
(Continued)

(58) Field of Classification Search
CPC .......... B60Q 1/0011; B60Q 1/02; B60Q 1/04; B60Q 1/12; B60Q 1/2696; B62J 6/02;
(Continued)

(56) References Cited

U.S. PATENT DOCUMENTS

| 4,833,573 A | 5/1989 | Miyauchi et al. |
| 2009/0257240 A1 | 10/2009 | Koike |

(Continued)

FOREIGN PATENT DOCUMENTS

| CN | 102243335 A | 11/2011 |
| CN | 103267256 A | 8/2013 |

(Continued)

OTHER PUBLICATIONS

Office Action dated Apr. 25, 2017 in counterpart Japanese Patent Application No. 2015-132947 with a partial English Translation.

*Primary Examiner* — Jason M Han

(74) *Attorney, Agent, or Firm* — Birch, Stewart, Kolasch & Birch, LLP

(57) ABSTRACT

A headlight module includes a light source, a light guide element, and a projection optical element. The light source emits light. The light guide element has a reflecting surface for reflecting light emitted from the light source and an emitting surface for emitting light reflected by the reflecting surface. The projection optical element projects light emitted from the emitting surface. In a direction of an optical axis of the projection optical element, an end portion on the emitting surface side of the reflecting surface includes a point located at a focal position of the projection optical element.

19 Claims, 23 Drawing Sheets

Related U.S. Application Data continuation of application No. 15/037,533, filed as application No. PCT/JP2014/080212 on Nov. 14, 2014, now Pat. No. 9,945,528.

(51) Int. Cl.

| | | |
|---|---|---|
| *B60Q 1/12* | (2006.01) | |
| *B62J 6/02* | (2006.01) | |
| *F21S 41/20* | (2018.01) | |
| *F21S 41/24* | (2018.01) | |
| *F21S 41/255* | (2018.01) | |
| *F21S 41/32* | (2018.01) | |
| *F21S 41/43* | (2018.01) | |
| *F21S 41/63* | (2018.01) | |
| *F21Y 115/10* | (2016.01) | |

(52) U.S. Cl.
CPC ............ *F21S 41/255* (2018.01); *F21S 41/285* (2018.01); *F21S 41/322* (2018.01); *F21S 41/43* (2018.01); *F21S 41/635* (2018.01); *B60Q 2300/112* (2013.01); *B60Q 2300/122* (2013.01); *B60Q 2300/136* (2013.01); *B62K 2207/02* (2013.01); *F21Y 2115/10* (2016.08)

(58) Field of Classification Search
CPC .......... F21S 48/10; F21S 48/11; F21S 48/115; F21S 48/1154; F21S 48/1159; F21S 48/12; F21S 48/1241; F21S 48/125; F21S 48/1258; F21S 48/1329; F21S 48/145; F21S 48/17; F21S 48/1715; F21S 48/1721
USPC ........ 362/473–476, 511, 520–522, 538, 551, 362/555

See application file for complete search history.

(56) References Cited

U.S. PATENT DOCUMENTS

| | | |
|---|---|---|
| 2011/0279999 A1 | 11/2011 | Takahashi |
| 2012/0275173 A1 | 11/2012 | Hamm et al. |
| 2013/0242590 A1 | 9/2013 | Fedosik et al. |

FOREIGN PATENT DOCUMENTS

| | | |
|---|---|---|
| DE | 10 2007 052 696 A1 | 7/2008 |
| JP | 62-51101 A | 3/1987 |
| JP | 63-158702 A | 7/1988 |
| JP | 2003-217321 A | 7/2003 |
| JP | 2004-22223 A | 1/2004 |
| JP | 2007-264330 A | 10/2007 |
| JP | 2008-10265 A | 1/2008 |
| JP | 2009-199938 A | 9/2009 |
| JP | 2010-262765 A | 11/2010 |
| JP | 2011-54484 A | 3/2011 |
| JP | 2012-256491 A | 12/2012 |
| JP | 2013-54386 A | 3/2013 |

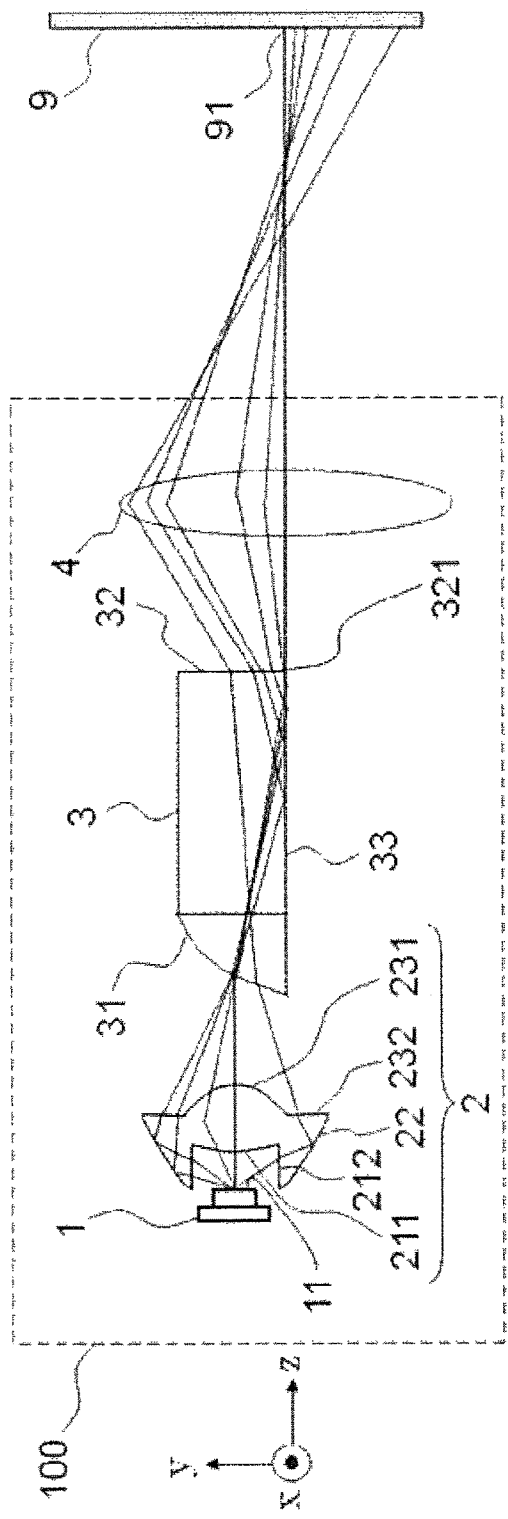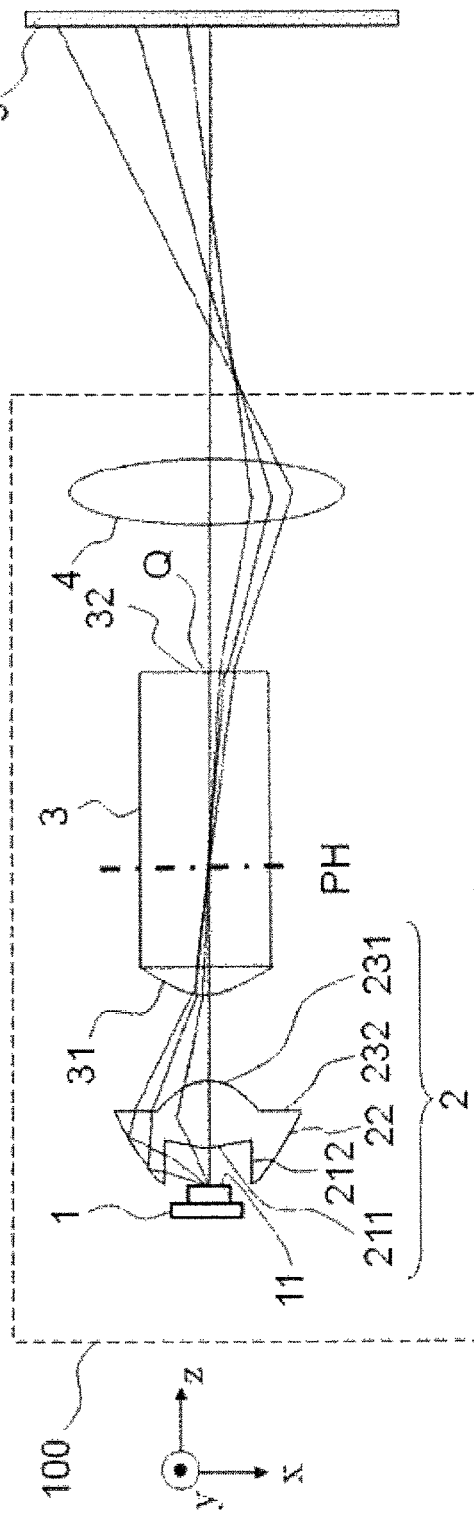

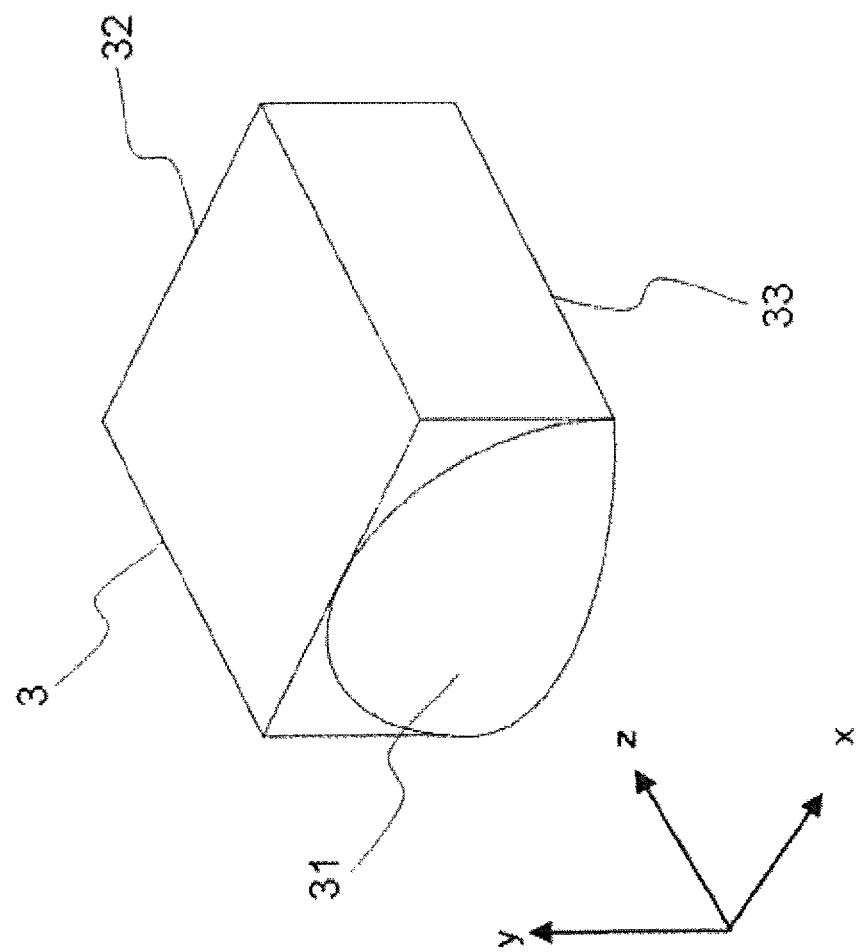

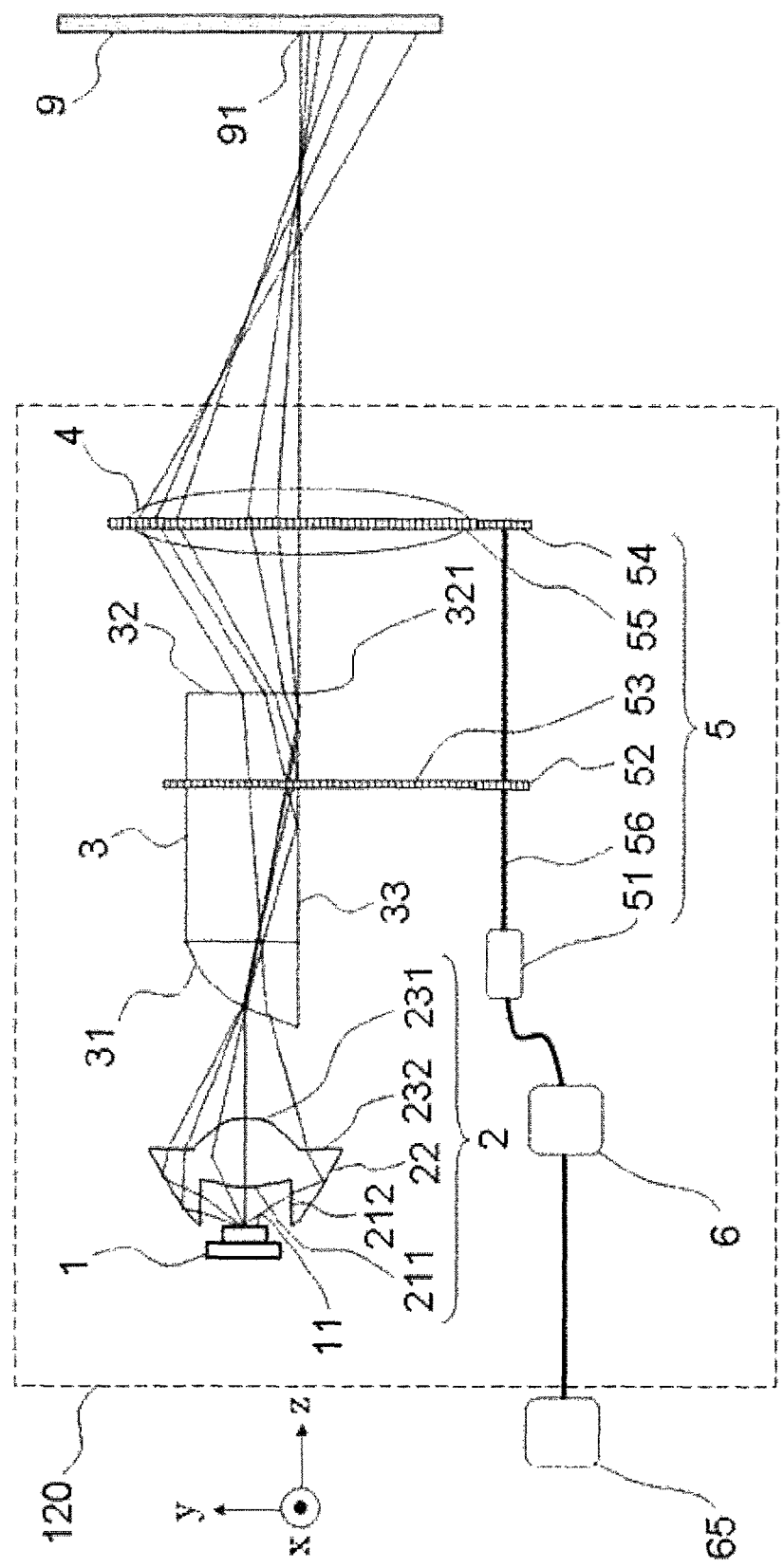

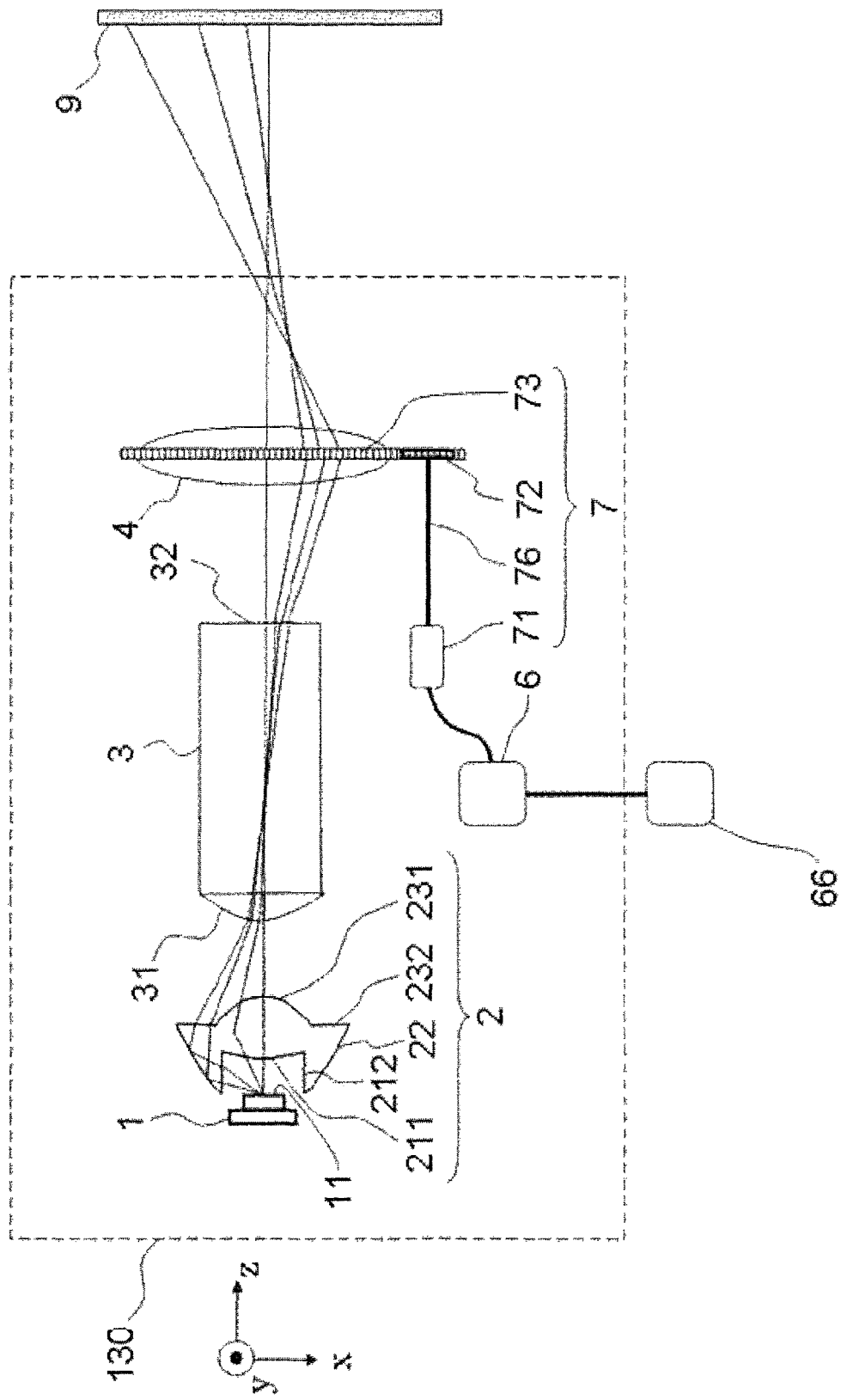

HEADLIGHT MODULE AND HEADLIGHT DEVICE

CROSS-REFERENCE TO RELATED APPLICATIONS

This application is a Continuation of co-pending application Ser. No. 15/907,772, filed on Feb. 28, 2018. Application Ser. No. 15/907,772 is a Divisional of co-pending U.S. application Ser. No. 15/037,533, filed on May 18, 2016, (U.S. Pat. No. 9,945,528, issued on Apr. 17, 2018), which is a US National Phase under 35 USC § 371 of International Application No. PCT/JP2014/080212, filed on Nov. 14, 2014, which claims benefit under 35 U.S.C. § 119(a) to Application No. 2013-238884, filed in Japan on Nov. 19, 2013, all of which are hereby expressly incorporated by reference into the present application.

TECHNICAL FIELD

The present invention relates to a headlight module and a headlight device for irradiating an area in front of a vehicle or the like.

BACKGROUND ART

Headlight devices for vehicles need to have a predetermined light distribution pattern specified by road traffic rules or the like. "Light distribution" refers to a luminous intensity distribution of a light source with respect to space. That is, it refers to a spatial distribution of light emitted from a light source. Further, "luminous intensity" indicates the degree of intensity of light emitted by a luminous body and is obtained by dividing the luminous flux passing through a small solid angle in a given direction by the small solid angle.

As one of the road traffic rules, for example, a predetermined light distribution pattern for an automobile low beam has a horizontally long shape narrow in an up-down direction. To prevent an oncoming vehicle from being dazzled, a boundary (cutoff line) of light on the upper side of the light distribution pattern is required to be sharp. That is, a sharp cutoff line with a dark area above the cutoff line (outside the light distribution pattern) and a bright area below the cutoff line (inside the light distribution pattern) is required.

"Cutoff line" here refers to a light/dark borderline formed when a wall or screen is irradiated with light from a headlight, and a borderline on the upper side of the light distribution pattern. That is, it refers to a light/dark borderline on the upper side of the light distribution pattern. It refers to a borderline on the upper side of the light distribution pattern and between a bright area (inside of the light distribution pattern) and a dark area (outside of the light distribution pattern). Cutoff line is a term used when an irradiating direction of a headlight for passing each other is adjusted. The headlight for passing each other is also referred to as a low beam.

The illuminance is required to be highest at a region on the lower side of the cutoff line (inside the light distribution pattern). The region of highest illuminance is referred to as the "high illuminance region." Here, "region on the lower side of the cutoff line" refers to an upper part of the light distribution pattern, and corresponds to a part for irradiating a distant area, in a headlight device. To achieve such a sharp cutoff line, large chromatic aberration, blur, or the like must not occur on the cutoff line. "Blur occurs on the cutoff line" indicates that the cutoff line is unclear.

Further, as another example of the road traffic rules, for identification of pedestrians and signs, it needs to have a "rising line" along which the irradiation on a walkway side rises. This is in order to visually recognize people, signs, or the like on the walkway side without dazzling oncoming vehicles. "Rising line along which the irradiation rises" here refers to the shape of the light distribution pattern of a low beam that is horizontal on an oncoming vehicle side and obliquely rises from the oncoming vehicle side toward a walkway side.

The "low beam" is a downward beam and used in passing an oncoming vehicle or the like. Typically, the low beam illuminates an area about 40 m ahead. Further, "up-down direction" refers to a direction perpendicular to the ground surface (road surface). A vehicle headlight device needs to provide this complicated light distribution pattern.

To provide such a complicated light distribution pattern, a configuration using a light blocking plate or the like is commonly used. In this configuration, the light blocking plate or the like blocks light, thereby reducing use efficiency of light. Hereinafter, use efficiency of light will be referred to as "light use efficiency."

Patent Reference 1 discloses a technique that forms a cutoff line by using a light blocking plate.

PRIOR ART REFERENCES

Patent References

Patent Reference 1: Japanese Patent Application Publication No. 2009-199938

SUMMARY OF THE INVENTION

Problems to be Solved by the Invention

However, since the configuration of Patent Reference 1 forms the cutoff line using the light blocking plate, the light use efficiency is low. Specifically, part of light emitted from a light source is blocked by the light blocking plate and is not used as projection light.

The present invention is made in view of the problems of the prior art, and is intended to provide a headlight device that reduces reduction of the light use efficiency.

Means for Solving the Problems

A headlight module includes: a light source for emitting light; a light guide element having a reflecting surface for reflecting the light and an emitting surface for emitting light reflected by the reflecting surface; and a projection optical element for projecting light emitted from the emitting surface, wherein in a direction of an optical axis of the projection optical element, an end portion on the emitting surface side of the reflecting surface includes a point located at a focal position of the projection optical element.

Effect of the Invention

According to the present invention, it is possible to provide a headlight module or a headlight device that reduces reduction of the light use efficiency.

BRIEF DESCRIPTION OF THE DRAWINGS

FIGS. 1(A) and 1(B) are configuration diagrams illustrating a configuration of a headlight module 100 according to a first embodiment.

FIG. 2 is a perspective view of a light guide component 3 of the headlight module 100 according to the first embodiment.

FIG. 15 is a configuration diagram illustrating a configuration of a headlight module 120 according to a second embodiment.

FIG. 19 is a configuration diagram illustrating a configuration of a headlight module 130 according to a third embodiment.

MODES FOR CARRYING OUT THE INVENTION

Figure 3:
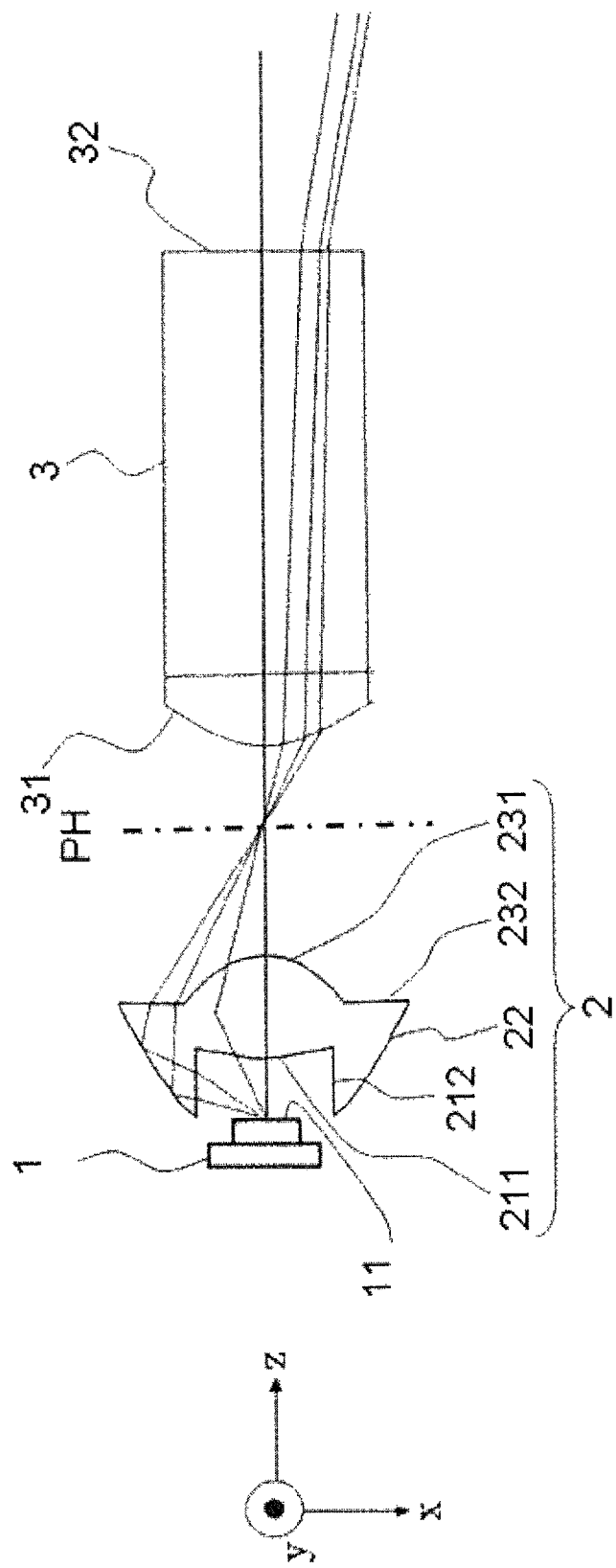
FIG. 3 is an explanatory diagram for explaining a light concentration position PH of the headlight module 100 according to the first embodiment.

Recently, from the viewpoint of reducing the burden on the environment, such as reducing emission of carbon dioxide ($CO_2$) and consumption of fuel, it is desired to improve energy efficiency of vehicles, for example. Accordingly, in vehicle headlight devices, downsizing, weight reduction, and improvement of power efficiency are required. Thus, it is desired to employ, as a light source of a vehicle headlight device, a semiconductor light source having high luminous efficiency as compared to conventional halogen bulbs (lamp light sources).

"Semiconductor light source" refers to, for example, a light emitting diode (LED), laser diode (LD), or the like. "Vehicle headlight device" refers to an illuminating device that is mounted on a transportation machine or the like and used to improve visibility for an operator and conspicuity to the outside. A vehicle headlight device is also referred to as a headlamp or headlight.

A conventional lamp light source (bulb light source) is a light source having directivity lower than that of a semiconductor light source. Thus, a lamp light source uses a reflecting mirror (reflector) to give directivity to the emitted light. On the other hand, a semiconductor light source has at least one light emitting surface and emits light to the light emitting surface side. In this manner, a semiconductor light source is different from a lamp light source in light emitting characteristics, and therefore requires an optical system suitable for the semiconductor light source instead of a conventional optical system using a reflecting mirror.

From the above-described characteristics of a semiconductor light source, for example, a light source of the present invention, described later, may include an organic electroluminescence (organic EL) light source that is a type of solid-state light sources. Also, for example, a solid-state light source, described later, may include a light source that irradiates phosphor applied on a plane with excitation light to cause the phosphor to emit light.

Excluding bulb light sources, light sources having directivity are referred to as "solid-state light sources." "Directivity" refers to a property that the intensity of light or the like emitted into space varies depending on direction. "Having directivity" here indicates that light travels to the light emitting surface side and does not travel to the side opposite to the light emitting surface, as described above. That is, it indicates that the divergence angle of light emitted from the light source is 180 degrees or less. Thus, a reflecting mirror such as a reflector is not particularly necessary.

The above-described Patent Reference 1 discloses a technique in which a semiconductor light source is disposed at a first focal point of a reflector with an ellipsoid of revolution, light emitted from the semiconductor light source is concentrated at a second focal point, and parallel light is emitted by a projection lens. Patent Reference 1 also discloses a technique for headlights using semiconductor light sources. That is, Patent Reference 1 discloses a technique that uses a semiconductor light source and gives directivity by using a reflector.

Further, to achieve a complicated light distribution pattern, such as a sharp cutoff line or rising line as described above, a configuration using a polyhedral reflector, a light blocking plate, or the like is commonly used. This enlarges and complicates the optical system. The configuration of Patent Reference 1 also uses a reflector, and therefore has a large optical system.

Further, in general, downsizing of an optical system reduces the light use efficiency. Thus, it is necessary to achieve a small-sized optical system having high light use efficiency. Further, as described above, the use of a light blocking plate reduces the light use efficiency. "Light use efficiency" refers to use efficiency of light.

Embodiments described below use a solid-state light source and give directivity without using a reflector. Thus, the embodiments described below can provide a small headlight device that uses a solid-state light source and reduces reduction of the light use efficiency.

Examples of the embodiments of the present invention will be described below with reference to the drawings by taking vehicle headlights as examples. In the following description of the embodiments, to facilitate explanation, xyz-coordinates will be used. It will be assumed that a left-right direction of a vehicle is the x axis direction; the right direction with respect to a forward direction of the vehicle is the +x axis direction; the left direction with respect to the forward direction of the vehicle is the −x axis direction. Here, "forward direction" refers to a traveling direction of the vehicle. That is, "forward direction" refers to a direction in which the headlight radiates light. It will be assumed that an up-down direction of the vehicle is the y axis direction; the upward direction is the +y axis direction; the downward direction is the −y axis direction. The "upward direction" is a direction toward the sky; the "downward direction" is a direction toward the ground (road surface or the like). It will be assumed that the traveling direction of the vehicle is the z axis direction; the traveling direction is the +z axis direction; the opposite direction is the −z axis direction. The +z axis direction will be referred to as the "forward direction"; the −z axis direction will be referred to as the "backward direction". That is, the +z axis direction is the direction in which the headlight radiates light.

As described above, in the following embodiments, a z-x plane is a plane parallel to a road surface. This is because the road surface is usually considered to be a "horizontal plane." Thus, a z-x plane is considered as a "horizontal plane." "Horizontal plane" refers to a plane perpendicular to the direction of gravity. However, the road surface may be inclined with respect to the traveling direction of the vehicle. Specifically, it is an uphill, a downhill, or the like. In these cases, the "horizontal plane" is considered as a plane parallel to the road surface. That is, the "horizontal plane" is not a plane perpendicular to the direction of gravity.

On the other hand, a typical road surface is seldom inclined in the left-right direction with respect to the traveling direction of the vehicle. "Left-right direction" refers to a width direction of a road. In these cases, the "horizontal plane" is considered as a plane perpendicular to the direction of gravity. For example, even if a road surface is inclined in the left-right direction and the vehicle is upright with respect to the left-right direction of the road surface, this is considered to be equivalent to a state in which the vehicle is tilted with respect to the "horizontal plane" in the left-right direction.

To simplify explanation, the following description will be made on the assumption that the "horizontal plane" is a plane perpendicular to the direction of gravity. That is, the description will be made on the assumption that a z-x plane is a plane perpendicular to the direction of gravity.

Further, the light sources described in the following embodiments are illustrated as light sources having directivity. Typical examples include semiconductor light sources, such as light emitting diodes or laser diodes. The light sources also include organic electroluminescence light sources, light sources that irradiate phosphor applied on planes with excitation light to cause the phosphor to emit light, or the like. Light sources having directivity other than bulb light sources are referred to as "solid-state light sources."

The light sources described in the embodiments do not include bulb light sources, such as incandescent lamps, halogen lamps, or fluorescent lamps, that have no directivity and require reflectors or the like. This is because the use of a bulb light source makes it difficult to meet the demand for improvement in energy efficiency or the demand for downsizing of the device, as described above. However, with respect to the demand for improving the light use efficiency without using a light blocking plate, the light sources may be bulb light sources, such as incandescent lamps, halogen lamps, or fluorescent lamps.

The present invention is applicable to a low beam, a high beam, or the like of a vehicle headlight device. The present invention is also applicable to a low beam, a high beam, or the like of a motorcycle headlight. The present invention is also applicable to headlights for other vehicles, such as three-wheelers or four-wheelers.

However, in the following description, a case where a light distribution pattern of a low beam of a motorcycle headlight is formed will be described as an example. The light distribution pattern of the low beam of the motorcycle headlight has a cutoff line that is a straight line parallel to the left-right direction (x axis direction) of the vehicle. Further, it is brightest at a region on the lower side of the cutoff line (inside the light distribution pattern).

"Light distribution pattern" refers to a shape of a light beam and an intensity distribution of light due to the direction of light emitted from a light source. "Light distribution pattern" will also be used to mean an illuminance pattern on an irradiated surface 9 described below. Further, "light distribution" refers to a distribution of intensity of light emitted from a light source with respect to the direction of the light. "Light distribution" will also be used to mean an illuminance distribution on the irradiated surface 9 described below.

Further, the four-wheeler is, for example, a normal four-wheeled automobile or the like. Further, the three-wheeler is, for example, a motor tricycle called a gyro. "Motor tricycle called a gyro" refers to a scooter with three wheels including one front wheel and two rear wheels about one axis. In Japan, it corresponds to a motorbike. It has a rotational axis near the center of the vehicle body and allows most of the vehicle body including the front wheel and a driver seat to be tilted in the left-right direction. This mechanism allows the center of gravity to move inward during turning, similarly to a motorcycle.

First Embodiment

FIGS. 1(A) and 1(B) are configuration diagrams illustrating a configuration of a headlight module 100 according to a first embodiment. FIG. 1(A) is a diagram as viewed from the right (+x axis direction) with respect to the forward direction of the vehicle. FIG. 1(B) is a diagram as viewed from the top (+y axis direction).

As illustrated in FIG. 1, the headlight module 100 according to the first embodiment includes a light source 1, a light guide component 3, and a projection lens 4. The headlight module 100 according to the first embodiment may include a condensing lens 2. In the headlight module 100, the condensing optical element 2 may be mounted to the light source 1 to form a unit.

<Light Source 1>

The light source 1 has a light emitting surface 11. The light source 1 emits light for illuminating an area in front of the vehicle from the light emitting surface 11. The light source 1 is located on the −z axis side of the condensing lens 2. As the light source 1, a light emitting diode, a laser diode, an electroluminescence element, or the like may be used. However, the following description assumes that the light source 1 is a light emitting diode (LED).

<Condensing Lens 2>

The condensing lens 2 is located on the +z axis side of the light source 1. The condensing lens 2 is also located on the −z axis side of the light guide component 3.

The condensing lens 2 is a lens having positive power. That is, the condensing lens 2 is an optical element having positive power. The power is also referred to as "refractive power."

The condensing lens 2 is an example of an optical element having a condensing function. That is, the condensing lens 2 is an example of a condensing optical element having a condensing function.

The condensing lens 2 includes, for example, incident surfaces 211 and 212, a reflecting surface 22, and emitting surfaces 231 and 232.

In each of the following embodiments, as an example, the condensing lens 2 will be described as a condensing optical element having the following functions. Specifically, the condensing lens 2 concentrates, due to refraction, light rays emitted from the light source 1 at small emission angles. The condensing lens 2 also concentrates, due to reflection, light rays emitted from the light source 1 at large emission angles.

The condensing lens 2 receives light emitted from the light source 1. The condensing lens 2 concentrates light at an arbitrary position in the forward direction (+z axis direction). The light concentration position of the condensing lens 2 will be described with reference to FIGS. 3 and 4.

In FIG. 1, the condensing lens 2 is formed by a single optical lens, but may use multiple optical lenses. However, use of multiple optical lenses reduces manufacturability due to reasons, such as ensuring the accuracy of positioning of each optical lens. That is, it makes manufacturing difficult.

The condensing lens 2 is disposed immediately after the light source 1. "After" here refers to a side toward which light emitted from the light source 1 travels. The following embodiments assume that the traveling direction of the light is the +z axis direction. Here, "immediately after" indicates that light emitted from the light emitting surface 11 is directly incident on the condensing lens 2.

A light emitting diode emits light with a Lambertian light distribution. "Lambertian light distribution" refers to a light distribution in which the luminance of a light emitting surface is constant regardless of the viewing direction. That is, the divergence angle of light distribution of a light emitting diode is wide. Thus, by reducing the distance between the light source 1 and the condensing lens 2, it is possible to increase the amount of light incident on the condensing lens 2.

The condensing lens 2 is made of, for example, transparent resin, glass, or silicone. The material of the condensing lens 2 may be any material having transparency, and may be transparent resin or the like. However, from the viewpoint of light use efficiency, materials having high transparency are appropriate as the material of the condensing lens 2. Further, since the condensing lens 2 is disposed immediately after the light source 1, the material of the condensing lens 2 preferably has excellent heat resistance.

The incident surface 211 is an incident surface formed at a central part of the condensing lens 2. Specifically, an optical axis of the condensing lens 2 has an intersection on the incident surface 211.

The incident surface 211 has a convex shape having positive power. The convex shape of the incident surface 211 is a shape projecting in the −z axis direction. The power is also referred to as the "refractive power." The incident surface 211 has, for example, a shape rotationally symmetric about the optical axis of the condensing lens 2.

The incident surface 212 has, for example, a shape that is a part of the surface shape of a solid of revolution obtained by rotating an ellipse about its major or minor axis. A solid of revolution obtained by rotating an ellipse about its major or minor axis is referred to as a "spheroid." A rotational axis of the spheroid coincides with the optical axis of the condensing lens 2. The incident surface 212 has a surface shape obtained by cutting off both ends of the spheroid in the direction of the rotational axis. Thus, the incident surface 212 has a tubular shape.

One end (end on the +z axis direction side) of the tubular shape of the incident surface 212 is connected to the outer periphery of the incident surface 211. The tubular shape of the incident surface 212 is formed on the −z axis direction side of the incident surface 211. That is, the tubular shape of the incident surface 212 is formed on the light source 1 side of the incident surface 211.

The reflecting surface 22 has a tubular shape whose cross-sectional shape in an x-y plane is, for example, a circular shape centered on the optical axis of the condensing lens 2. In the tubular shape of the reflecting surface 22, the diameter of the circular shape in the x-y plane at the end on the −z axis direction side is smaller than the diameter of the circular shape in the x-y plane at the end on the +z axis direction side. Specifically, the diameter of the reflecting surface 22 increases in the +z axis direction. For example, the reflecting surface 22 has the shape of the side surface of a circular truncated cone. However, the shape of the reflecting surface 22 in a plane including the optical axis of the condensing lens 2 may be a curved line shape. "Plane including the optical axis" indicates that the line of the optical axis can be drawn on the plane.

One end (end on the −z axis direction side) of the tubular shape of the reflecting surface 22 is connected to the other end (end on the −z axis direction side) of the tubular shape of the incident surface 212. Specifically, the reflecting surface 22 is located on the outer peripheral side of the incident surface 212.

The emitting surface 231 is located on the +z axis direction side of the incident surface 211. Specifically, the optical axis of the condensing lens 2 has an intersection on the emitting surface 231.

The emitting surface 231 has a convex shape having positive power. The convex shape of the emitting surface 231 is a shape projecting in the +z axis direction. The emitting surface 231 has, for example, a shape rotationally symmetric about the optical axis of the condensing lens 2.

The emitting surface 232 is located on the outer peripheral side of the emitting surface 231. The emitting surface 232 has, for example, a planar shape parallel to an x-y plane. An inner periphery and an outer periphery of the emitting surface 232 have circular shapes.

The inner periphery of the emitting surface 232 is connected to an outer periphery of the emitting surface 231. The outer periphery of the emitting surface 232 is connected to the other end (end on the +z axis direction side) of the tubular shape of the reflecting surface 22.

Of the light emitted from the light emitting surface 11, light rays having small emission angles are incident on the incident surface 211. The light rays having small emission angles have, for example, a divergence angle of 60 degrees or less. The light rays having small emission angles are incident on the incident surface 211 and emitted from the emitting surface 231. The light rays with small emission angles emitted from the emitting surface 231 are concentrated at an arbitrary position in front (+z axis direction) of the condensing lens 2. As described above, the light concentration position will be described later.

Of the light emitted from the light emitting surface 11, light rays having large emission angles are incident on the incident surface 212. The light rays having large emission angles have, for example, a divergence angle greater than 60 degrees. The light rays incident on the incident surface 212 are reflected by the reflecting surface 22. The light rays reflected by the reflecting surface 22 travel in the +z axis direction. The light rays reflected by the reflecting surface 22 are emitted from the emitting surface 232. The light rays with large emission angles emitted from the emitting surface 232 are concentrated at an arbitrary position in front (+z axis direction) of the condensing lens 2. As described above, the light concentration position will be described later.

In each of the following embodiments, as an example, the condensing lens 2 will be described as an optical element having the following functions: the condensing lens 2 concentrates, due to refraction, light rays emitted from the light source 1 at small emission angles; the condensing lens 2 also concentrates, due to reflection, light rays emitted from the light source 1 at large emission angles.

The light concentration position of the light rays emitted from the emitting surface 232 and the light concentration position of the light rays emitted from the emitting surface 231 need not coincide. For example, the light concentration position of the light emitted from the emitting surface 232 may be closer to the condensing lens 2 than the light concentration position of the light emitted from the emitting surface 231.

For example, the light concentration position of the light emitted from the emitting surface 231 has a shape similar to a pattern of the light source 1 (shape of the light emitting surface 11). Thus, projection of the shape of the light emitting surface 11 of the light source 1 causes light distribution unevenness. In such a case, by differentiating the light concentration position of the light emitted from the emitting surface 232 from the light concentration position of the light emitted from the emitting surface 231 as described above, it becomes possible to reduce the light distribution unevenness due to the light emitted from the emitting surface 231.

Further, in the first embodiment, each of the incident surfaces 211 and 212, reflecting surface 22, and emitting surfaces 231 and 232 of the condensing lens 2 has a shape rotationally symmetric about the optical axis. However, the shapes are not limited to rotationally symmetric shapes as long as it can concentrate light emitted from the light source 1.

In particular, if the shape of the light emitting surface 11 of the light source 1 is a rectangular shape, the condensing lens 2 can be downsized by changing the cross-sectional shape of the reflecting surface 22 in an x-y plane to an elliptical shape, for example.

Further, for example, by changing the cross-sectional shape of the reflecting surface 22 in an x-y plane to an elliptical shape, it is possible to form a light concentration spot at the light concentration position into an elliptical shape. This facilitates formation of a wide light distribution pattern by the headlight module 100.

Further, the condensing lens 2 is only required to totally have positive power. Each of the incident surfaces 211 and 212, reflecting surface 22, and emitting surfaces 231 and 232 may have any power.

As described above, if a bulb light source is employed as the light source 1, a reflecting mirror may be used as the condensing optical element.

<Light Guide Component 3>

The light guide component 3 is located on the +z axis side of the condensing lens 2. The light guide component 3 is located on the −z axis side of the projection lens 4.

The light guide component 3 receives light emitted from the condensing lens 2. The light guide component 3 emits the light in the forward direction (+z axis direction). The light guide component 3 has a function as a light guide element that guides light entering through an incident surface 31 to an emitting surface 32. That is, the light guide component 3 is an example of a light guide element that guides light entering through the incident surface 31 to the emitting surface 32.

The light guide component 3 is made of, for example, transparent resin, glass, silicone, or the like.

FIG. 2 is a perspective view of the light guide component 3. The light guide component 3 has, for example, a column body shape with rectangular bases. "Column body" refers to a tubular spatial figure having two plane figures as bases. Surfaces of the column body other than the bases are referred to as side surfaces. Further, the distance between the two bases of the column body is referred to as a height. The light incident surface 31 of the light guide component 3 corresponds to one of the bases. Further, the light emitting surface 32 of the light guide component 3 corresponds to the other of the bases.

In FIG. 2, the incident surface 31 is a surface located on the −z axis side of the light guide component 3. The incident surface 31 faces an x-y plane. The emitting surface 32 is a surface located on the +z axis side of the light guide component 3. The emitting surface 32 faces an x-y plane. A reflecting surface 33 is a surface located on the −y axis side of the light guide component 3. The reflecting surface 33 faces a z-x plane.

Bases of a column body are typically planes, but the incident surface 31 of the light guide component 3 has a curved surface shape. Specifically, the light guide component 3 has a shape obtained by connecting a curved surface shape to a base of a column body.

In this first embodiment, a case where the shape of the incident surface 31 of the light guide component 3 is a convex shape having positive power will be described first.

If the light guide component 3 is considered as the above-described column body, the incident surface 31 corresponds to the base on the −z axis side.

The shape of the incident surface 31 is a convex shape projecting in the −z axis direction. The shape of the incident surface 31 is formed by, for example, a part of a spherical surface. In the first embodiment, a section obtained by cutting the spherical surface by a plane passing through the spherical center is flush with the reflecting surface 33. Thus, the center of the spherical shape of the incident surface 31 is on the same plane as the reflecting surface 33.

However, a plane parallel to the section obtained by cutting the spherical surface by a plane passing through the spherical center may be flush with the reflecting surface 33.

In FIG. 2, the incident surface 31 has a spherical portion and a planar portion. The planar portion of the incident surface 31 is located on the periphery of the spherical portion.

If light is incident on the spherical portion of the incident surface 31, the divergence angle of the light changes. By changing the divergence angle of the light, it is possible to form the shape of the light distribution pattern. That is, the incident surface 31 has a function of forming the shape of the light distribution pattern. That is, the incident surface 31 functions as a light distribution pattern shape forming portion.

Further, for example, by providing the incident surface 31 with a light condensing function, the condensing lens 2 can be omitted. That is, the incident surface 31 functions as a light condensing portion.

The incident surface 31 can be considered as an example of a light distribution pattern shape forming portion. The incident surface 31 can be considered as an example of a light condensing portion.

If the light guide component 3 is considered as the above-described column body, the emitting surface 32 corresponds to the base on the +z axis side.

In the first embodiment, the emitting surface 32 is indicated by a plane. The surface shape of the emitting surface 32 is not limited to planar.

The emitting surface 32 is located at a position optically conjugate to the irradiated surface 9, described later. Thus, a shape (image) of light on the emitting surface 32 is projected onto the irradiated surface 9.

If the light guide component 3 has a tubular shape and its inner side is formed by a reflecting surface, the emitting surface 32 is an imaginary surface.

The image of light on the emitting surface 32 is formed on a part of the emitting surface 32. Specifically, a light distribution pattern can be formed within the emitting surface 32 into a shape appropriate for the headlight module 100. In particular, if a single light distribution pattern is formed by using multiple headlight modules, as described later, light distribution patterns corresponding to the roles of the respective headlight modules are formed. The maximum image of light on the emitting surface 32 has the shape of the emitting surface 32.

If the light guide component 3 is considered as the above-described column body, the reflecting surface 33 corresponds to a side surface on the −y axis side.

The reflecting surface 33 reflects light reaching the reflecting surface 33. That is, the reflecting surface 33 has a function of reflecting light. That is, the reflecting surface 33 functions as a light reflecting portion.

The reflecting surface 33 is disposed at an end portion on the −y axis direction side of the incident surface 31. In the first embodiment, an end portion on the −z axis direction side of the reflecting surface 33 is connected to the end portion on the −y axis direction side of the incident surface 31.

The reflecting surface 33 is a surface facing in the +y axis direction. Specifically, a front surface of the reflecting surface 33 is a surface facing in the +y axis direction. A back surface of the reflecting surface 33 is a surface facing in the −y axis direction. The front surface of the reflecting surface 33 is a surface for reflecting light.

The reflecting surface 33 need not be planar. That is, the surface shape of the reflecting surface 33 is not limited to planar. The reflecting surface 33 may have a curved surface shape. However, in the first embodiment, the reflecting surface 33 is a plane. That is, in the first embodiment, the reflecting surface 33 has a planar shape.

The reflecting surface 33 may be a mirror surface obtained by mirror deposition. However, the reflecting surface 33 desirably functions as a total reflection surface, without mirror deposition. This is because a total reflection surface is higher in reflectance than a mirror surface, contributing improvement in light use efficiency. Further, elimination of the step of mirror deposition can simplify the manufacturing process of the light guide component 3, contributing reduction in the manufacturing cost of the light guide component 3. In particular, the configuration illustrated in the first embodiment has a feature that the incident angles of light rays on the reflecting surface 33 are shallow, thus allowing the reflecting surface 33 to be used as a total reflection surface, without mirror deposition. "Incident angles are shallow" indicates that the incident angles are great.

An edge 321 is an edge on the −y axis side of the emitting surface 32. The edge 321 is an end portion on the −y axis side of the emitting surface 32.

The edge 321 is an edge on the +z axis side of the reflecting surface 33. The edge 321 is an end portion on the +z axis side of the reflecting surface 33.

The edge 321 is a ridge line where the emitting surface 32 and the reflecting surface 33 intersect. That is, the edge 321 is a portion (ridge line portion) joining the emitting surface 32 and the reflecting surface 33. "Ridge" refers to a line segment where two plane faces of a polyhedron intersect. Although the line segment typically refers to a straight line, it here also includes a curved line, a bent line, and the like.

The edge 321 may have a straight line shape, a curved line shape, a bent line shape, and the like. "Bent line" refers to a bent line, e.g., an edge 321 having a "rising line" shape illustrated in FIG. 9 and described later, and the like. In an example of the first embodiment, the edge 321 has a straight line shape parallel to the x axis.

Further, for example, if the light guide component 3 is hollow and the emitting surface 32 is an opening portion, the edge 321 is an end portion of the reflecting surface 33. That is, the edge 321 may include a boundary portion between two surfaces. The edge 321 may also include an end portion of a surface. The above-described edge 321 will also be referred to below as the edge portion 321.

The edge 321 forms the shape of a cutoff line 91 of the light distribution pattern. This is because the emitting surface 32 is located at a position optically conjugate to the irradiated surface 9 and thus the light distribution pattern on the irradiated surface 9 has a shape similar to that of the light distribution pattern on the emitting surface 32. "Optically conjugate" refers to a relation in which light emitted from one point is imaged at another point. Thus, the edge 321 of the emitting surface 32 is preferably formed into the shape of the cutoff line 91.

The irradiated surface 9 is a virtual surface defined at a predetermined position in front of the vehicle. The irradiated surface 9 is a surface parallel to an x-y plane. The predetermined position in front of the vehicle is a position at which the luminous intensity or illuminance of the headlight device is measured, and is specified in road traffic rules or the like. For example, in Europe, United Nations Economic Commission for Europe (UNECE) specifies a position 25 m from a light source as the position at which the luminous intensity of an automobile headlight device is measured. In Japan, Japanese Industrial Standards Committee (JIS) specifies a position 10 m from a light source as the position at which the luminous intensity is measured.

Further, "cutoff line" refers to a light/dark borderline formed on the upper side of the light distribution pattern when a wall or screen is irradiated with light from a headlight. "Cutoff line" refers to a borderline between a bright section and a dark section on the upper side of the light distribution pattern. That is, the "cutoff line" is a part of a borderline between a bright section and a dark section formed on the outline portion of the light distribution pattern. That is, the area above the cutoff line (outside the light distribution pattern) is dark and the area below the cutoff line (inside the light distribution pattern) is bright.

Cutoff line is a term used in adjustment of the emitting direction of a headlight for passing each other. The headlight for passing each other is also referred to as a low beam. The "cutoff line" is required to be sharp. Here, "sharp" indicates that large chromatic aberration, blur, or the like must not occur on the cutoff line.

<Projection Lens 4>

The projection lens 4 is located on the +z axis side of the light guide component 3.

The projection lens 4 is a lens having positive power. An image of the light distribution pattern formed on the emitting surface 32 is magnified and projected by the projection lens 4 onto the irradiated surface 9 in front of the vehicle.

The projection lens 4 is a "projection optical element" for magnifying and projecting an image of the light distribution pattern formed on the emitting surface 32. In the embodiments, as an example, the projection optical element will be described as the projection lens 4.

The projection lens 4 may consist of a single lens. The projection lens 4 may also consist of multiple lenses. However, the light use efficiency decreases as the number of lenses increases. Thus, the projection lens 4 desirably consists of one or two lenses.

The projection lens 4 is made of transparent resin or the like. Further, the material of the projection lens 4 is not limited to transparent resin, and is only required to be a refractive material having transparency.

Further, the projection lens 4 is desirably disposed so that its optical axis is located on the lower side (−y axis side) of the optical axis of the light guide component 3.

The optical axis of the projection lens 4 is a line connecting centers of curvature of both surfaces of the lens. The optical axis of the projection lens 4 is a normal passing through a surface apex of the projection lens 4. In the case of FIG. 1, the optical axis of the projection lens 4 is an axis passing through the surface apexes of the projection lens 4 and being parallel to the z axis.

When the surface apexes of the projection lens 4 move parallel to the x axis direction or y axis direction in x-y planes, the optical axis of the projection lens 4 also moves parallel to the x axis direction or y axis direction similarly. Further, when the projection lens 4 tilts with respect to an x-y plane, the normal at the surface apexes of the projection lens 4 also tilts with respect to the x-y plane and thus the optical axis of the projection lens 4 also tilts with respect to the x-y plane.

The optical axis of the light guide component 3 is a central axis of the light guide component 3.

In FIG. 1, for example, the optical axis of the light guide component 3 coincides with an optical axis of the light source 1 and the optical axis of the condensing lens 2. Further, the optical axis of the light source 1 coincides with a normal at a center position of the light emitting surface 11.

Further, the projection lens 4 is disposed so that the position of the edge 321 of the emitting surface 32 of the light guide component 3 in the y axis direction coincides with the position of the optical axis of the projection lens 4 in the y axis direction. Specifically, in FIG. 1, the edge 321 intersects with the optical axis of the projection lens 4. In FIG. 1, the edge 321 intersects with the optical axis of the projection lens 4 at a right angle.

If the edge 321 is not linear, the plane passing through a position (point Q) at which the edge 321 intersects with the optical axis of the projection lens 4 and being parallel to an x-y plane is in optically conjugate relation with the irradiated surface 9, for example. The edge 321 need not necessarily intersect with the optical axis of the projection lens 4.

Such an arrangement makes it possible to make the position of the cutoff line 91 on the irradiated surface 9 in the y axis direction coincide with the position of a center of the light source 1 in the y axis direction, without tilting the entire headlight module 100.

Of course, if the headlight module 100 is mounted at a tilt on the vehicle, the position at which the projection lens 4 is disposed may be changed depending on the tilt. However, compared to adjustment of the entire headlight module 100, adjustment of the position of the projection lens 4 adjusts a small component and thus can be easily performed.

<Behavior of Light Rays>

As illustrated in FIG. 1, the light concentrated by the condensing lens 2 enters the light guide component 3 through the incident surface 31.

The incident surface 31 is a refractive surface. The light incident on the incident surface 31 is refracted at the incident surface 31. The incident surface 31 has a convex shape projecting in the −z axis direction.

The curvature of the incident surface 31 in the x axis direction contributes a "width of a light distribution" in a direction parallel to a road surface. Further, the curvature of the incident surface 31 in the y axis direction contributes a "height of the light distribution" in a direction perpendicular to the road surface.

<Behavior of Light Rays on z-x Plane>

When viewed in a z-x plane, the incident surface 31 has a convex shape and has positive power with respect to a horizontal direction (x axis direction). Here, "when viewed in a z-x plane" refers to being viewed from the y axis direction. That is, it refers to being projected onto a z-x plane and viewed. The light incident on the incident surface 31 propagates in the light guide component 3 in such a manner as to be further concentrated. Here, "propagate" refers to traveling of light in the light guide component 3.

When viewed in a z-x plane, the light propagating in the light guide component 3 is concentrated at an arbitrary light concentration position PH in the light guide component 3 by the condensing lens 2 and the incident surface 31 of the light guide component 3, as illustrated in FIG. 1(B). The light concentration position PH is indicated by a dot-and-dash line in FIG. 1(B). Thus, the light after passing through the light concentration position PH diverges. Thus, the emitting surface 32 emits light wider in the horizontal direction than that at the light concentration position PH.

The emitting surface 32 is located at a position conjugate to the irradiated surface 9. Thus, the width of the light on the emitting surface 32 in the horizontal direction corresponds to the "width of the light distribution" on the irradiated surface 9. Thus, by changing the curvature of the curved surface shape of the incident surface 31, it is possible to arbitrarily change a width of the light distribution pattern of light emitted by the headlight module 100.

Figure 4:
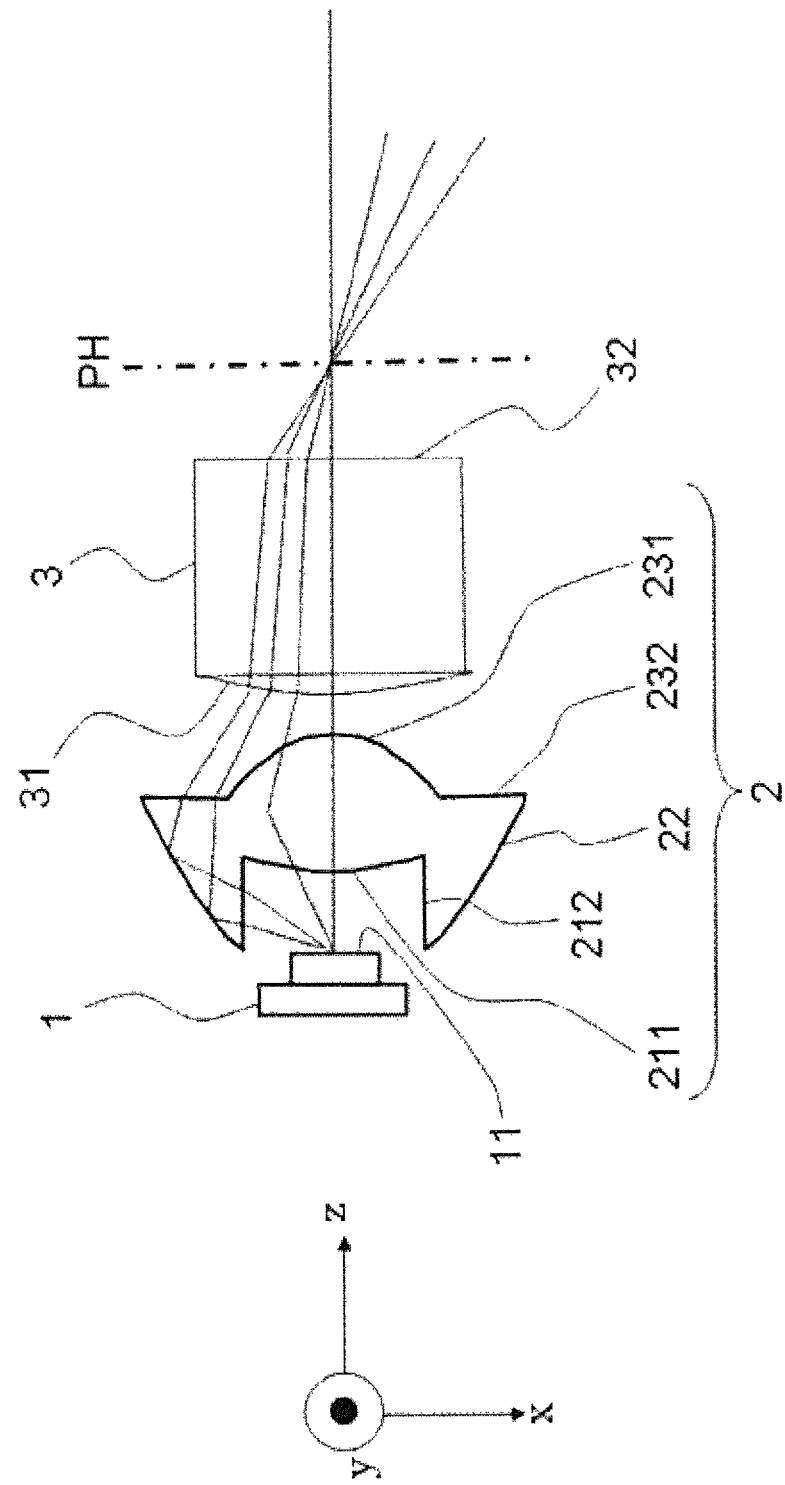
FIG. 4 is an explanatory diagram for explaining a light concentration position PH of the headlight module 100 according to the first embodiment.

Further, the light concentration position PH need not necessarily be located in the light guide component 3. FIGS. 3 and 4 are explanatory diagrams for explaining the light concentration position PH of the headlight module 100 according to the first embodiment.

In FIG. 3, the light concentration position PH is located in front (on the −z axis direction side) of the incident surface 31. That is, the light concentration position PH is located in a gap between the condensing lens 2 and the light guide component 3. "Gap" refers to a space.

In the configuration of FIG. 3, as in the configuration of FIG. 1, light after passing through the light concentration position PH diverges. The divergence angle of the diverged light decreases at the incident surface 31. However, since the distance from the light concentration position PH to the emitting surface 32 can be made large, the width of the light beam on the emitting surface 32 in the x axis direction can be controlled. Thus, the emitting surface 32 emits light wide in the horizontal direction (x axis direction).

In FIG. 4, the light concentration position PH is located in back (on the +z axis direction side) of the emitting surface 32. Specifically, the light concentration position PH is located in a gap between the light guide component 3 and the projection lens 4.

The light after passing through the emitting surface 32 concentrates at the light concentration position PH. By controlling the distance from the emitting surface 32 to the light concentration position PH, it is possible to control the width of the light beam on the emitting surface 32 in the x axis direction. Thus, the emitting surface 32 emits light wide in the horizontal direction (x axis direction).

Figure 5:
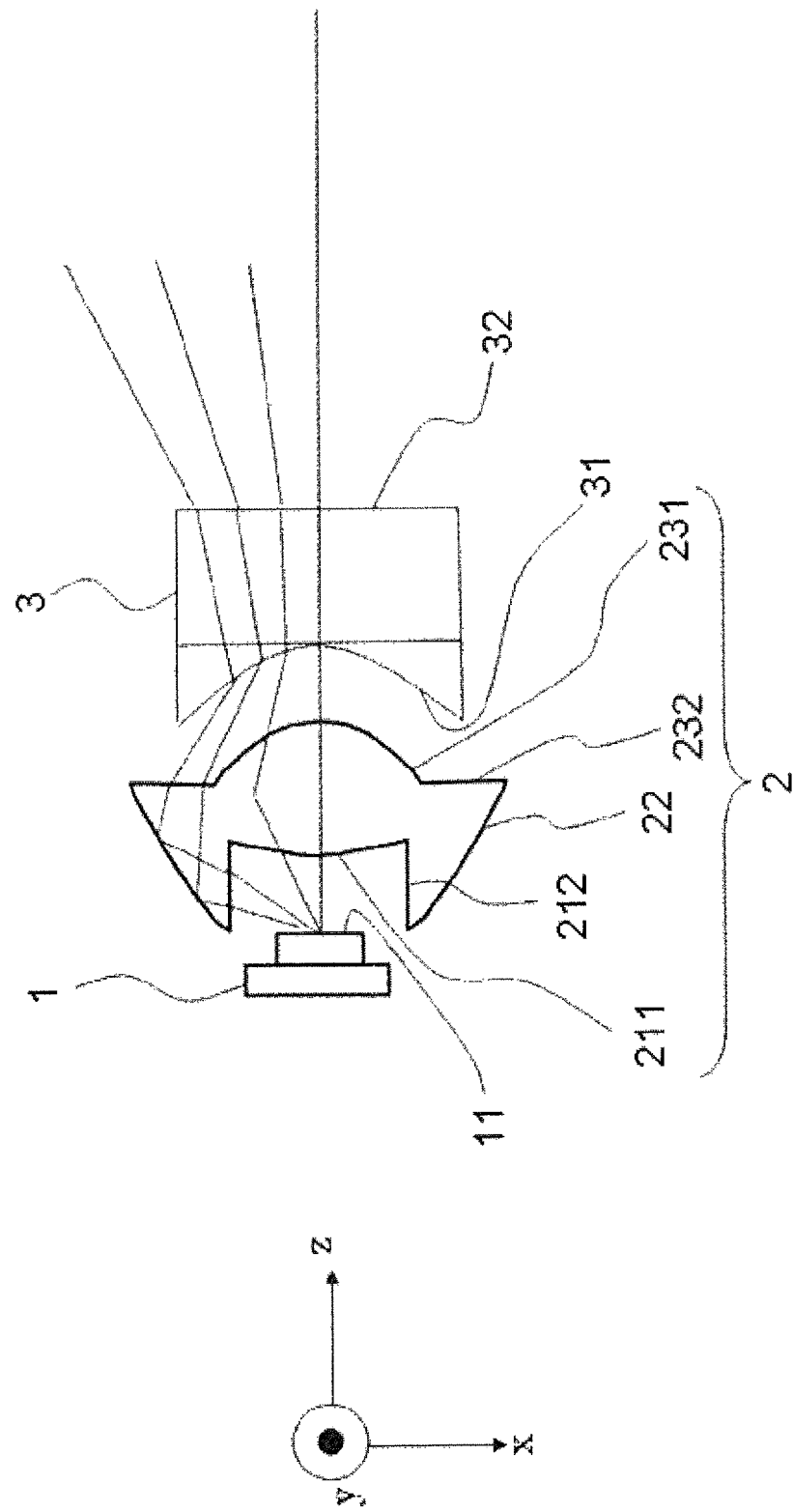
FIG. 5 is a configuration diagram illustrating a configuration of the headlight module 100 according to the first embodiment.

FIG. 5 is a configuration diagram illustrating a configuration of the headlight module 100 according to the first embodiment. As illustrated in FIG. 5, the headlight module 100 has no light concentration position PH.

In the headlight module 100 illustrated in FIG. 5, a curved surface of the incident surface 31 in the horizontal direction (x axis direction) is a concave surface having negative power, for example. This can spread light in the horizontal direction at the emitting surface 32, providing a light distribution pattern wide in the horizontal direction at the irradiated surface 9.

Thus, the width of the light beam on the emitting surface 32 is larger than the width of the light beam on the incident surface 31. The incident surface 31 with the concave surface can control the width of the light beam on the emitting surface 32 in the x axis direction, providing a light distribution pattern wide in the horizontal direction at the irradiated surface 9.

The light concentration position PH indicates that light density per unit area on an x-y plane is high. Thus, if the light concentration position PH coincides in position with the emitting surface 32, the width of the light distribution on the irradiated surface 9 is minimum, and the illuminance of the light distribution on the irradiated surface 9 is maximum.

Further, as the light concentration position PH separates from the emitting surface 32, the width of the light distribution on the irradiated surface 9 increases, and the illuminance of the light distribution on the irradiated surface 9 decreases. "Illuminance" refers to a physical quantity indicating brightness of light radiated to a planar object. It is equal to a luminous flux radiated per unit area.

<Behavior of Light Rays on z-y Plane>

On the other hand, when the light incident on the incident surface 31 is viewed in a y-z plane, the light refracted at the incident surface 31 propagates in the light guide component 3 and is guided to the reflecting surface 33. Here, "propagate" refers to traveling of light in the light guide component 3.

Light entering the light guide component 3 and reaching the reflecting surface 33 enters the light guide component 3 and directly reaches the reflecting surface 33. "Directly reach" refers to reaching without being reflected by another surface or the like. Light entering the light guide component 3 and reaching the reflecting surface 33 reaches the reflecting surface 33 without being reflected by another surface or the like. That is, light reaching the reflecting surface 33 undergoes the first reflection in the light guide component 3.

Further, the light reflected by the reflecting surface 33 is directly emitted from the emitting surface 32. That is, the light reflected by the reflecting surface 33 reaches the emitting surface 32 without being reflected by another surface or the like. That is, the light undergoing the first reflection at the reflecting surface 33 reaches the emitting surface 32 without undergoing further reflection.

In FIG. 1, light emitted from the part of the emitting surfaces 231 and 232 on the +y axis direction side of the optical axis of the condensing lens 2 is guided to the reflecting surface 33. Further, light emitted from the part of the emitting surfaces 231 and 232 on the −y axis direction side of the optical axis of the condensing lens 2 is emitted from the emitting surface 32 without being reflected by the reflecting surface 33. That is, in FIG. 1, part of the light entering the light guide component 3 reaches the reflecting surface 33. The light reaching the reflecting surface 33 is reflected by the reflecting surface 33 and emitted from the emitting surface 32.

All of the light entering the light guide component 3 may reach the reflecting surface 33. As described later, by tilting the light source 1 and condensing lens 2 with respect to the light guide component 3, it is possible to cause all of the light emitted from the condensing lens 2 to be reflected by the reflecting surface 33. Also, as described later, by tilting the reflecting surface 33 with respect to the optical axis of the projection lens 4, it is possible to cause all of the light emitted from the condensing lens 2 to be reflected by the reflecting surface 33. The light reaching the reflecting surface 33 is reflected by the reflecting surface 33 and then emitted from the emitting surface 32.

For a typical light guide component, light travels inside the light guide component while being repeatedly reflected at a side surface of the light guide component. Thereby, the intensity distribution of the light is equalized. In the present application, light entering the light guide component 3 is reflected at the reflecting surface 33 only once and emitted from the emitting surface 32. In this respect, the way of using the light guide component 3 in the present application differs from the conventional way of using a light guide component.

In a light distribution pattern specified in road traffic rules or the like, a region on the lower side of the cutoff line 91 has the highest illuminance, for example. The emitting surface 32 of the light guide component 3 and the irradiated surface 9 are in conjugate relation with each other. Thus, to make a region on the lower side (−y axis direction side) of the cutoff line 91 on the irradiated surface 9 have the highest illuminance, it is required to make a region on the inner side (+y axis direction side) of the edge 321 on the emitting surface 32 of the light guide component 3 have the highest luminous intensity. "Luminous intensity" refers to a physical quantity indicating how strong light emitted from a light source is.

If the edge 321 is not linear, the plane passing through a position at which the edge 321 intersects with the optical axis of the projection lens 4 and being parallel to an x-y plane is in conjugate relation with the irradiated surface 9, for example.

To produce such a light distribution pattern, it is effective that, when viewed in a y-z plane, part of the light entering through the incident surface 31 of the light guide component 3 is reflected by the reflecting surface 33, as illustrated in FIG. 1(A).

This is because light entering through the incident surface 31 and reaching the emitting surface 32 without being reflected at the reflecting surface 33 and light entering through the incident surface 31 and reflected at the reflecting surface 33 are superposed on the emitting surface 32. Specifically, the light reaching the emitting surface 32 without being reflected at the reflecting surface 33 and the light reaching the emitting surface 32 after being reflected at the reflecting surface 33 are superposed in a region on the emitting surface 32 corresponding to the high illuminance region on the irradiated surface 9. Such a configuration makes it possible to make a region on the inner side (+y axis direction side) of the edge 321 on the emitting surface 32 have the highest luminous intensity in the emitting surface 32.

A region having high luminous intensity is formed by superposing, on the emitting surface 32, the light reaching the emitting surface 32 without being reflected at the reflecting surface 33 and the light reaching the emitting surface 32 after being reflected at the reflecting surface 33.

The position of the region having high luminous intensity on the emitting surface 32 can be changed by changing the reflection position of the light on the reflecting surface 33. By setting the reflection position of the light on the reflecting surface 33 near the emitting surface 32, it is possible to set the region having high luminous intensity near the edge 321 on the emitting surface 32. Thus, it is possible to set a region having high illuminance on the lower side of the cutoff line 91 on the irradiated surface 9.

Further, the amount of the superposed light can be adjusted by arbitrarily changing the curvature of the incident surface 31 in a vertical direction (y axis direction), as in the case of adjusting the width of the light distribution in the horizontal direction. "Amount of the superposed light" refers to the amount of light resulting from the superposition of the light reaching the emitting surface 32 without being reflected at the reflecting surface 33 and the light reflected at the reflecting surface 33.

In this manner, by adjusting the curvature of the incident surface 31 in the horizontal direction, a desired light distribution can be obtained. Here, "desired light distribution" refers to, for example, a light distribution specified in road traffic rules or the like. If a single light distribution pattern is formed by using multiple headlight modules, as described later, "desired light distribution" refers to a light distribution required for each headlight module. That is, by adjusting the curvature of the incident surface 31 in the horizontal direction, the light distribution can be adjusted.

Further, by adjusting the geometric relationship between the condensing lens 2 and the light guide component 3, a desired light distribution can be obtained. Here, "desired light distribution" refers to, for example, a light distribution specified in road traffic rules or the like. If a single light distribution pattern is formed by using multiple headlight modules, as described later, "desired light distribution" refers to a light distribution required for each headlight module. That is, by adjusting the geometric relationship between the condensing lens 2 and the light guide component 3, the light distribution can be adjusted.

"Geometric relationship" refers to, for example, the positional relationship between the condensing lens 2 and the light guide component 3 in the optical axis direction. As the distance from the condensing lens 2 to the light guide component 3 decreases, the amount of light reflected at the reflecting surface 33 decreases, and the dimension of the light distribution in the vertical direction (Y axis direction) decreases. That is, the height of the light distribution pattern decreases. Conversely, as the distance from the condensing lens 2 to the light guide component 3 increases, the amount of light reflected at the reflecting surface 33 increases, and the dimension of the light distribution in the vertical direction (Y axis direction) increases. That is, the height of the light distribution pattern increases.

Further, the position of the superposed light can be changed by adjusting the position of the light reflected by the reflecting surface 33. "Position of the superposed light" refers to the position at which the light reaching a region on the +Y axis direction side of the edge 321 (on the emitting surface 32) without being reflected at the reflecting surface 33 and the light reflected at the reflecting surface 33 are superposed on the emitting surface 32. That is, it refers to a high luminous intensity region on the emitting surface 32. The high luminous intensity region is a region on the emitting surface 32 corresponding to the high illuminance region on the irradiated surface 9.

Further, by adjusting a light concentration position of the light reflected at the reflecting surface 33, the height of the high luminous intensity region on the emitting surface 32 can be adjusted. Specifically, if the light concentration position is near the emitting surface 32, the dimension of the high luminous intensity region in the height direction is small. Conversely, if the light concentration position is far from the emitting surface 32, the dimension of the high luminous intensity region in the height direction is large.

In the above description, the high illuminance region is described as a region on the lower side (−Y axis direction side) of the cutoff line 91. This is the position of the high illuminance region in the light distribution pattern on the irradiated surface 9.

As described later, for example, a single light distribution pattern may be formed on the irradiated surface 9 by using multiple headlight modules. In such a case, the high luminous intensity region on the emitting surface 32 of each headlight module is not necessarily a region on the +Y axis direction side of the edge 321. For each headlight module, the high luminous intensity region is formed, on the emitting surface 32, at a position appropriate for the light distribution pattern of the headlight module.

As described above, by adjusting the light concentration position PH in the horizontal direction, a width of the light distribution pattern can be controlled. Further, by adjusting a light concentration position in the vertical direction, the height of the high illuminance region can be controlled. As such, the light concentration position PH in the horizontal direction and the light concentration position in the vertical direction need not necessarily coincide. By independently setting the light concentration position PH in the horizontal direction and the light concentration position in the vertical direction, it is possible to control the shape of the light distribution pattern or the shape of the high illuminance region.

The cutoff line 91 can be easily formed by giving the shape of the cutoff line 91 to the edge 321 of the light guide component 3. That is, the shape of the cutoff line 91 can be easily formed by changing the shape of the edge 321 of the light guide component 3. Thus, there is an advantage that the light use efficiency is high as compared to a conventional case where it is formed by using a light blocking plate. This is because the cutoff line 91 can be formed without blocking light.

An image of the light distribution pattern formed on the emitting surface 32 is magnified and projected by the light guide component 3 onto the irradiated surface 9 in front of the vehicle.

A focal position of the projection lens 4 coincides with a position of the edge 321 on the optical axis of the projection lens 4 (position in the z axis direction). Specifically, a focal position of the projection lens 4 is located at an intersection between the edge 321 and the optical axis of the projection lens 4.

In another aspect, the position of a focal point of the projection lens 4 in the z axis direction (optical axis direction of the projection lens 4) coincides with a position of the edge 321 in the z axis direction.

<Light Distribution Pattern>

In the light distribution pattern of the low beam of the motorcycle headlight device, the cutoff line 91 has a linear shape parallel to the left-right direction (x axis direction) of the vehicle. That is, the cutoff line 91 has a linear shape extending in the left-right direction (X axis direction) of the vehicle.

Further, it is necessary that the light distribution pattern of the low beam of the motorcycle headlight device is brightest in a region on the lower side of the cutoff line 91. That is, a region on the lower side of the cutoff line 91 is a high illuminance region.

The emitting surface 32 of the light guide component 3 and the irradiated surface 9 are in optically conjugate relation with each other. Thus, the edge 321 of the emitting surface 32 corresponds to the cutoff line 91 of the irradiated surface 9.

The headlight module 100 according to the first embodiment directly projects the light distribution pattern formed on the emitting surface 32 onto the irradiated surface 9. Thus, the light distribution on the emitting surface 32 is projected onto the irradiated surface 9 as it is. Hence, to achieve a light distribution pattern that is brightest in a region on the lower side of the cutoff line 91, it is necessary to form, on the emitting surface 32, a luminous intensity distribution in which the luminous intensity is highest near the edge 321.

Figure 6:
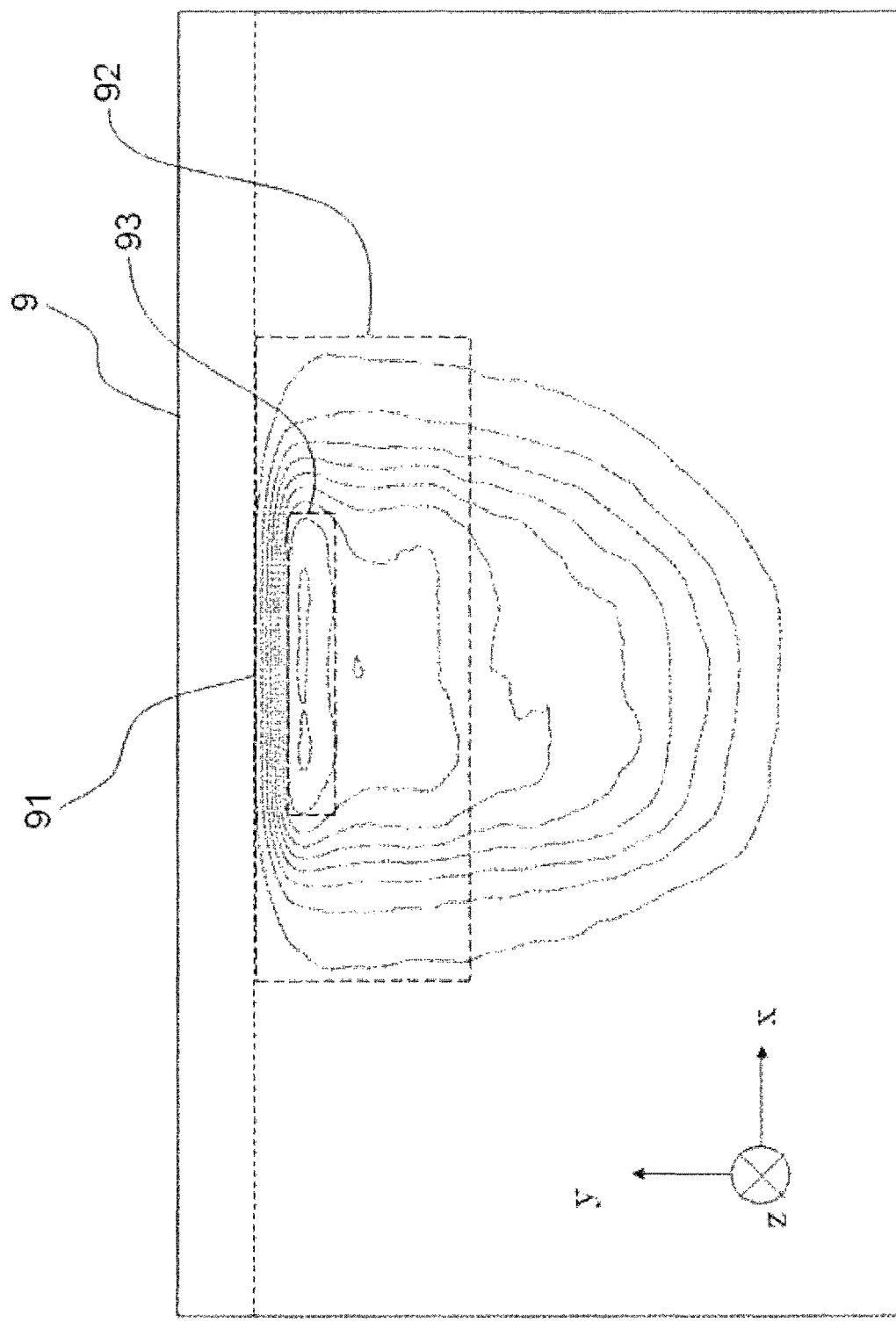
FIG. 6 is a diagram illustrating, in contour display, an illuminance distribution of the headlight module 100 according to the first embodiment.
Figure 7:
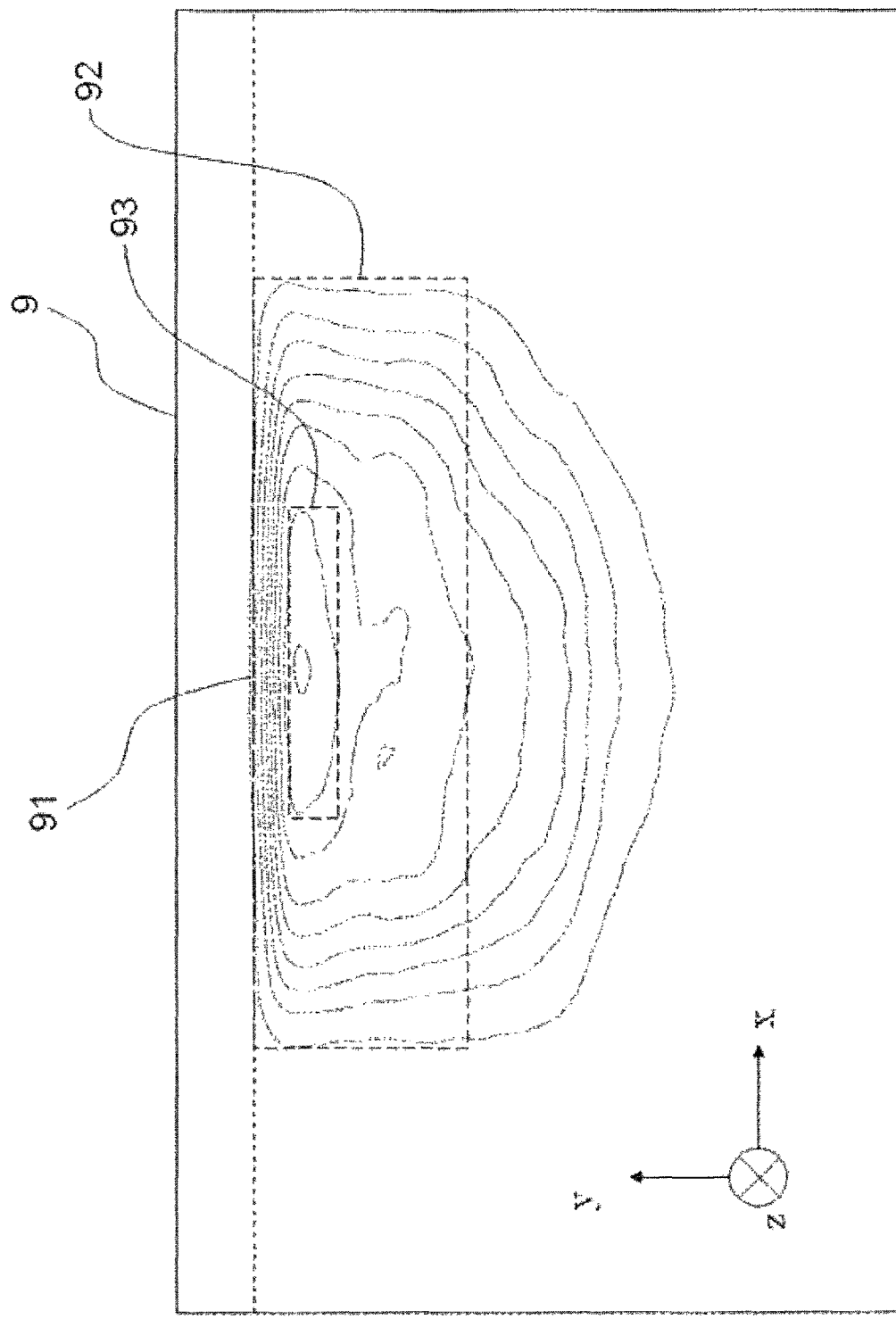
FIG. 7 is a diagram illustrating, in contour display, an illuminance distribution of the headlight module 100 according to the first embodiment.
Figure 8:
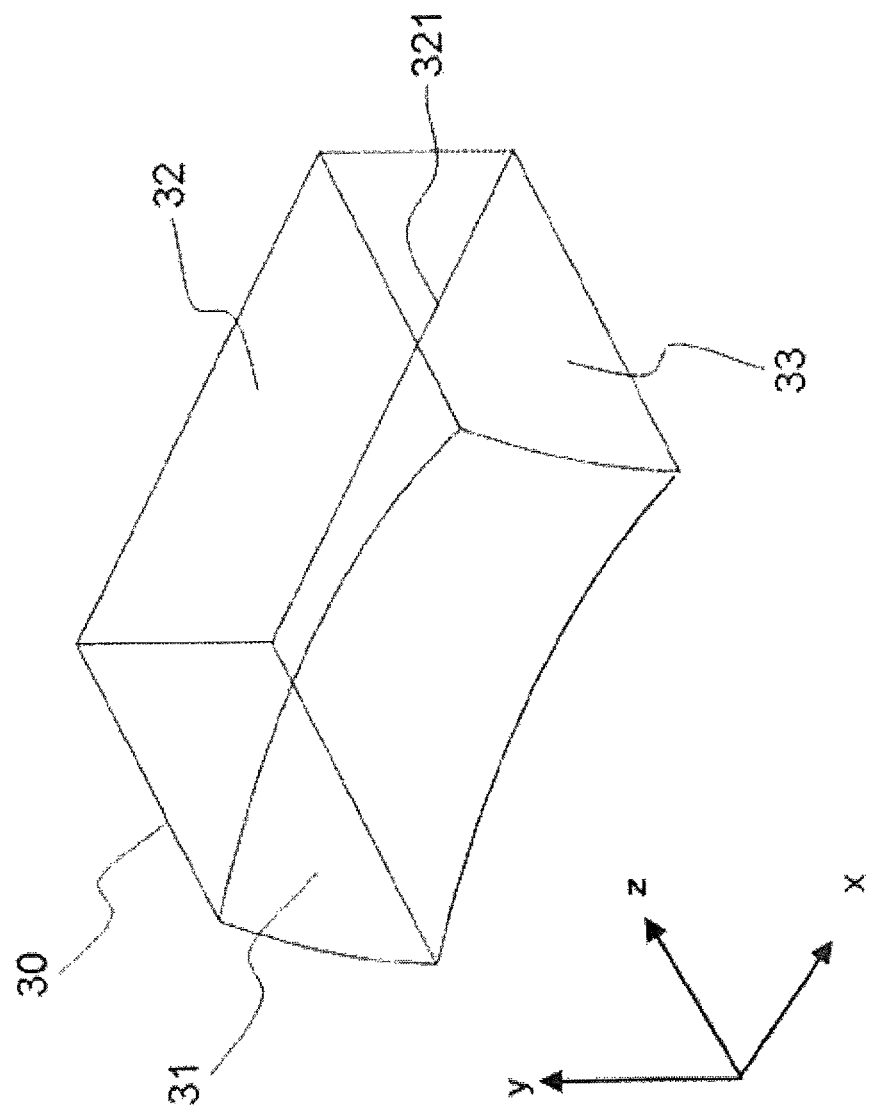
FIG. 8 is a perspective view of a light guide component 30 of the headlight module 100 according to the first embodiment.

FIGS. 6 and 7 are diagrams illustrating, in contour display, illuminance distributions on the irradiated surface 9 of the headlight module 100 according to the first embodiment. FIG. 6 is an illuminance distribution when the light guide component 3 illustrated in FIG. 2 is used. FIG. 7 is an illuminance distribution when a light guide component 30 illustrated in FIG. 8 is used. This illuminance distribution is an illuminance distribution projected on the irradiated surface 9 located 25 m ahead (+z axis direction). Further, this illuminance distribution is obtained by simulation. "Contour display" refers to displaying by means of a contour plot. "Contour plot" refers to a diagram depicting a line joining points of equal value.

As illustrated in FIG. 2, the curved surface shape of the incident surface 31 of the light guide component 3 is a convex shape having positive power in both the horizontal and vertical directions.

As can be seen from FIG. 6, the cutoff line 91 of the light distribution pattern is a sharp straight line. That is, intervals between contour lines are small on the lower side of the cutoff line 91. The light distribution has a region having the highest illuminance (high illuminance region) 93 near the cutoff line 91.

In FIG. 6, a center of the high illuminance region 93 is located on the +y axis direction side of a center of the light distribution pattern. In FIG. 6, the entire high illuminance region 93 is on the +y axis direction side of the center of the light distribution pattern. The center of the light distribution pattern is a center of the light distribution pattern in its width direction and is a center of the light distribution pattern in its height direction.

It can be seen that a region 92 on the lower side of the cutoff line 91 in the light distribution pattern is brightest. That is, the region 92 on the lower side of the cutoff line 91 in the light distribution pattern includes the brightest region 93 in the light distribution pattern.

FIG. 8 is a perspective view of the light guide component 30 of the headlight module 100 according to the first embodiment. FIG. 7 is a diagram illustrating, in contour display, an illuminance distribution on the irradiated surface 9 obtained by using the light guide component 30 illustrated in FIG. 8.

The incident surface 31 of the light guide component 30 illustrated in FIG. 8 has a concave shape having negative power in the horizontal direction (x axis direction). Also, the incident surface 31 has a convex shape having positive power in the vertical direction (y axis direction).

FIG. 7 illustrates, in contour display, an illuminance distribution projected on the irradiated surface 9 located 25 m ahead (+z axis direction) when the light guide component 30 is used. Further, this illuminance distribution is obtained by simulation. The incident surface 31 has negative power in the horizontal direction.

Thus, in the light distribution pattern illustrated in FIG. 7, the width (in the x axis direction) of the light distribution is wide, as compared to the light distribution pattern illustrated in FIG. 6.

Further, in the light distribution pattern illustrated in FIG. 7, the cutoff line 91 is a sharp straight line. That is, intervals between contour lines are small on the lower side of the cutoff line 91. The light distribution has a region having the highest illuminance (high illuminance region) 93 near the cutoff line 91.

In FIG. 7, a center of the high illuminance region 93 is located on the +y axis direction side of a center of the light distribution pattern. In FIG. 7, the entire high illuminance region 93 is on the +y axis direction side of the center of the light distribution pattern. The center of the light distribution pattern is a center of the light distribution pattern in its width direction and is a center of the light distribution pattern in its height direction.

In the light distribution pattern illustrated in FIG. 7, a region 92 on the lower side of the cutoff line 91 is illuminated most brightly. That is, the region 92 on the lower side of the cutoff line 91 in the light distribution pattern includes the brightest region 93 in the light distribution pattern.

In FIGS. 6 and 7, the region 92 on the lower side of the cutoff line 91 is located between the center of the light distribution pattern and the cutoff line 91.

As above, by changing the curved surface shape of the incident surface 31 of the light guide component 3, it is possible to easily form a desired light distribution pattern. Here, "desired light distribution pattern" refers to, for example, a light distribution pattern specified in road traffic rules or the like. In another aspect, if a single light distribution pattern is formed by using multiple headlight modules, as described later, "desired light distribution pattern" refers to a light distribution pattern required for each headlight module.

As above, by changing the curved surface shape of the incident surface 31 of the light guide component 3, it is possible to easily form a light distribution pattern. In particular, it is possible to make the region 92 on the lower side of the cutoff line 91 brightest while keeping the sharp cutoff line 91.

Thus, to form the cutoff line 91, the headlight module 100 need not use a light blocking plate, which causes reduction in the light use efficiency, as in the conventional headlight device. Further, to provide the high illuminance region in the light distribution pattern, the headlight module 100 needs no complicated optical system. Thus, the headlight module 100 can provide a small and simple headlight device having high light use efficiency.

The headlight module 100 according to the first embodiment of the present invention is described by taking a low beam of a motorcycle headlight device as an example. However, the present invention is not limited to this. For example, it is also applicable to a low beam of an automobile headlight device or the like. Specifically, the headlight module 100 is also applicable to a low beam of a headlight device for a motor tricycle or a low beam of a headlight device for a four-wheeled automobile.

Figure 9:
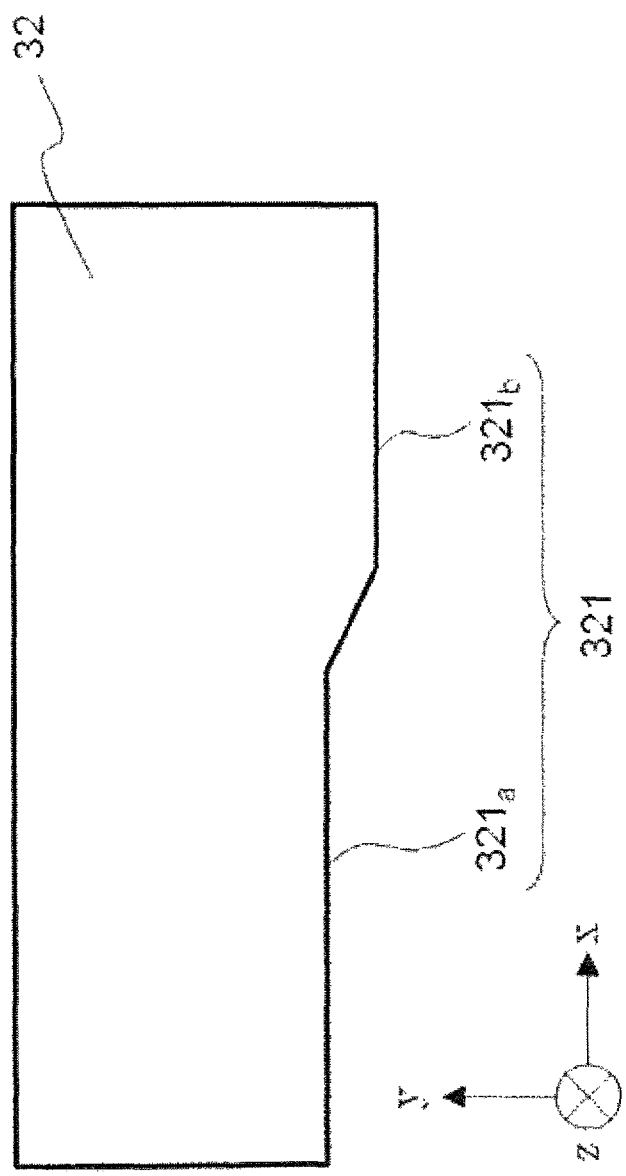
FIG. 9 is a schematic diagram illustrating an example of a shape of an emitting surface 32 of the light guide component 3 of the headlight module 100 according to the first embodiment.

FIG. 9 is a schematic diagram illustrating an example of the shape of the emitting surface 32 of the light guide component 3. The shape of the edge 321 of the emitting surface 32 may be, for example, a stepped shape as illustrated in FIG. 9. That is, the shape of the edge 321 illustrated in FIG. 9 is a bent line shape described above. When viewed from the rear side (−z axis direction), in the shape of the edge 321, an edge $321_a$ on the left side (−x axis direction side) is located above (+y axis direction) an edge $321_b$ on the right side (+x axis direction side).

The emitting surface 32 and the irradiated surface 9 are in optically conjugate relation with each other. Thus, the shape of the light distribution pattern on the emitting surface 32 is projected on the irradiated surface 9. Thus, on the irradiated surface 9, a cutoff line on the left side in the traveling direction of the vehicle is high and a cutoff line on the right side is low. This makes it possible to easily form a "rising line" along which the irradiation on a walkway side rises for identification of pedestrians and signs. The description is made by taking, as an example, a vehicle traveling in the left lane of a road.

Further, in some vehicles, multiple headlight modules are arranged, and the light distribution patterns of the respective modules are combined to form a desired light distribution pattern. That is, a light distribution pattern may be formed by arranging multiple headlight modules and combining the light distribution patterns of the respective modules. Here, "desired light distribution pattern" refers to, for example, a light distribution pattern specified in road traffic rules or the like. Even in such a case, the headlight module 100 according to the first embodiment can be easily applied.

In the headlight module 100, by adjusting the curved surface shape of the incident surface 31 of the light guide component 3, it is possible to arbitrarily change the width and height of light distribution of the light distribution pattern. It is then possible to arbitrarily change the light distribution.

Further, in the headlight module 100, by adjusting the optical positional relationship between the condensing lens 2 and the light guide component 3, it is possible to arbitrarily change the width and height of light distribution of the light distribution pattern. It is then possible to arbitrarily change the light distribution.

Further, by using the reflecting surface 33, it is possible to easily change the light distribution. For example, as described later, by changing an inclination angle e of the reflecting surface 33, it is possible to change the position of the high illuminance region.

Further, in the headlight module 100, the shape of the cutoff line 91 can be arbitrarily defined by the shape of the edge 321 of the emitting surface 32 of the light guide component 3. That is, an arbitrary light distribution pattern can be formed depending on the shape of the light guide component 3.

Thus, in particular, for the condensing lens 2, projection lens 4, and the like, their shapes or the like need not be changed between modules. It is possible to use the condensing lens 2, projection lens 4, and the like as common parts, thereby reducing the number of types of parts, improving ease of assembly, and reducing manufacturing cost.

Further, it is enough that the function of arbitrarily adjusting the width and height of the light distribution and the function of arbitrarily adjusting the light distribution can be provided by the headlight module 100 as a whole. The optical components of the headlight module 100 include the condensing lens 2, light guide component 3, and projection lens 4. That is, the functions can be shared by optical surfaces constituting the headlight module 100.

For example, the emitting surface 32 of the light guide component 3 or the reflecting surface 33 may be formed into a curved surface shape to have power and form a light distribution.

However, if the emitting surface 32 is given a curvature, the emission position of light varies in the optical axis direction. That is, the emission position of light on the emitting surface 32 shifts forward or backward in the optical axis direction. Since the emitting surface 32 is conjugate to the irradiated surface 9, variation of the emission position of light in the optical axis direction may cause effects, such as blur of a projected cutoff line.

Further, for the reflecting surface 33, it is not necessary that all the light reaches the reflecting surface 33. Thus, if the reflecting surface 33 is given a shape, limited light can provide an effect of the shape of the reflecting surface 33 to the light distribution pattern. That is, the amount of light that can contribute to formation of the light distribution pattern is limited. The amount of light that is reflected at the reflecting surface 33 to provide an effect of the shape of the reflecting surface 33 to the light distribution pattern is limited. Thus, to provide an optical effect to all the light and easily change the light distribution pattern, it is preferable to give power to the incident surface 31 and cause it to form a desired light distribution. Here, "desired light distribution" refers to, for example, a light distribution specified in road traffic rules or the like.

The headlight module 100 includes the light source 1, condensing lens 2, light guide component 3, and projection lens 4. The light source 1 emits light having directivity that becomes illumination light. The condensing lens 2 concentrates light emitted from the light source 1. The light guide component 3 receives light emitted from the condensing lens 2 through the incident surface 31, reflects the received light at the reflecting surface 33 formed on the side surface, and emits it from the emitting surface 32. The projection lens 4 receives light emitted from the light guide component 3 and magnifies and emits it. The incident surface 31 is formed by a curved surface for changing the divergence angle of the incident light.

The headlight module 100 includes the light source 1, light guide element 3, and projection optical element 4. The light source 1 emits light. The light guide element 3 has the reflecting surface 33 for reflecting light emitted from the light source 1 and the emitting surface 32 for emitting light reflected at the reflecting surface 33. The projection optical element 4 projects light emitted from the emitting surface 32. In the direction of the optical axis of the projection optical element 4, the edge portion 321 of the reflecting surface 33 on the emitting surface 32 side includes the point Q located at a focal position of the projection optical element 4.

In the first embodiment, as an example, the light guide element 3 is described as the light guide component 3. Further, as an example, the projection optical element 4 is described as the projection lens 4. Further, as an example, the edge portion 321 is described as the edge 321.

Light entering the light guide element 3 and reaching the reflecting surface 33 enters the light guide element 3 and undergoes the first reflection at the reflecting surface 33.

Light undergoing the first reflection at the reflecting surface 33 reaches the emitting surface 32 without undergoing further reflection.

In the headlight module 100, of the light entering the light guide element 3, light reflected at the reflecting surface 33 and light other than the light reflected at the reflecting surface 33 are superposed on a plane passing through the point Q located at the focal position on the edge portion 321 and being perpendicular to the optical axis of the projection optical element 4, thereby forming a high luminous intensity region on the plane.

The plane perpendicular to the optical axis of the projection optical element 4 is the emitting surface 32.

The light guide element 3 has the incident portion 31 for receiving light emitted from the light source 1, the incident portion 31 having refractive power.

As an example, the incident portion 31 is described as the incident surface 31.

Light reflected at the reflecting surface 33 directly reaches the emitting surface 32.

The reflecting surface 33 is a total reflection surface.

The inside of the light guide element 3 is filled with refractive material.

First Modification Example

Further, in the headlight module 100 according to the first embodiment of the present invention, each of the optical axes of the light source 1, condensing lens 2, light guide component 3, and projection lens 4 is arranged in parallel with the z axis. However, such an arrangement is not mandatory.

The light source 1 is located on the −z axis side (in back) of the light guide component 3. The light source 1 is located on the +y axis side (upper side) of the light guide component 3.

The condensing lens 2 is located on the −z axis side (in back) of the light guide component 3. The condensing lens 2 is located on the +y axis side (upper side) of the light guide component 3.

Figure 10:
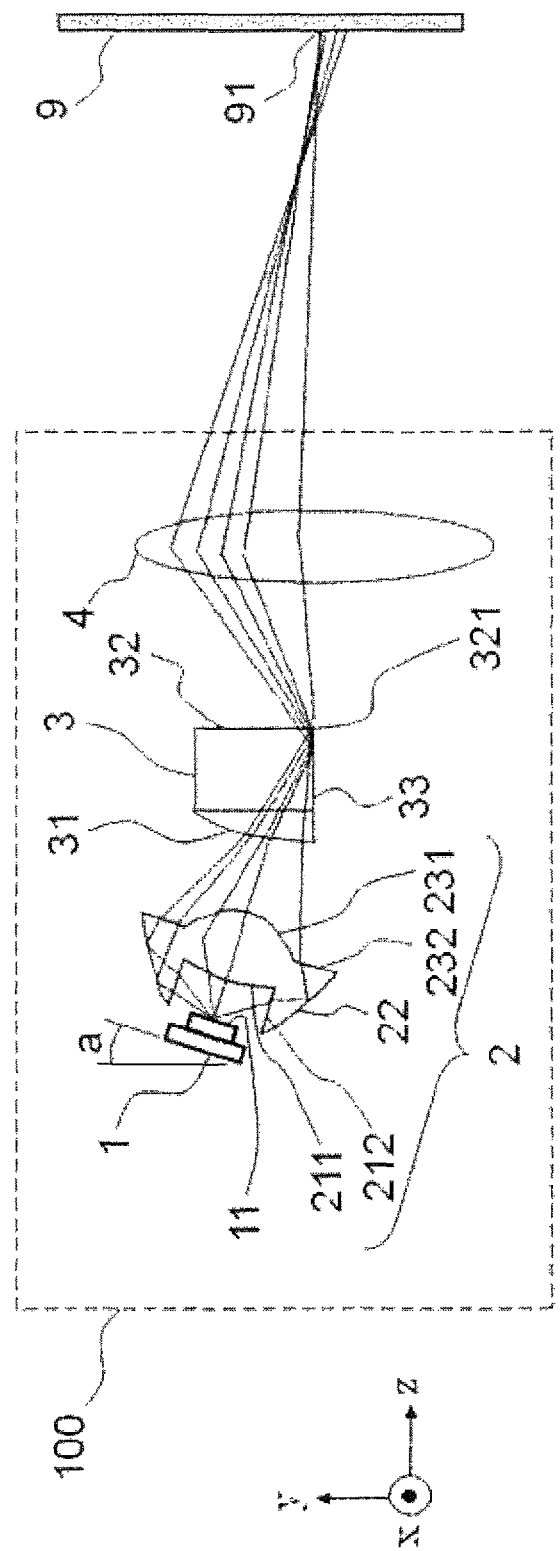
FIG. 10 is a configuration diagram illustrating a configuration of the headlight module 100 according to a first modification example of the first embodiment.

FIG. 10 is a configuration diagram illustrating a configuration of the headlight module 100 according to the first embodiment. For example, as illustrated in FIG. 10, optical axes of the light source 1 and condensing lens 2 may be arranged to be inclined in the −y axis direction. "Optical axes are inclined in the −y axis direction" indicates that when viewed from the +x axis direction, the optical axes are rotated clockwise about the x axis. That is, it indicates that the end portions on the −z axis side of the optical axes are located in the +y axis direction from the end portions on the +z axis side of the axes.

In FIG. 10, with respect to the reflecting surface 33, the light source 1 and condensing lens 2 are located on a light reflecting side of the reflecting surface 33. That is, with respect to the reflecting surface 33, the light source 1 and condensing lens 2 are located on the front surface side of the reflecting surface 33. The light source 1 and condensing lens 2 are located in a normal direction of the reflecting surface 33 and on the front surface side of the reflecting surface 33 with respect to the reflecting surface 33. The condensing lens 2 is disposed to face the reflecting surface 33.

In FIG. 10, the optical axis of the light source 1 coincides with the optical axis of the condensing lens 2. In FIG. 10, the optical axes of the light source 1 and condensing lens 2 have an intersection on the reflecting surface 33. When light is refracted at the incident surface 31, a central light ray emitted from the condensing lens 2 reaches the reflecting surface 33. That is, the optical axis or central light ray of the condensing lens 2 has an intersection on the reflecting surface 33.

The arrangement illustrated in FIG. 10 makes it possible to reduce the length of the light guide component 3 in an optical axis direction (z axis direction), and shorten the depth (length in the z axis direction) of an optical system. Here, "optical system" refers to an optical system including, as its components, the condensing lens 2, light guide component 3, and projection lens 4.

Further, it becomes easy to guide light emitted from the condensing lens 2 to the reflecting surface 33. Thus, it becomes easy to efficiently concentrate light at a region on the inner side of the edge 321 of the emitting surface 32. By concentrating light emitted from the condensing lens 2 at a region on the emitting surface 32 side of the reflecting surface 33, it is possible to increase the emission amount of light emitted from a region on the +y axis side of the edge 321.

In this case, the intersection between the optical axis of the condensing lens 2 and the reflecting surface 33 is located on the emitting surface 32 side of the reflecting surface 33. In another aspect, the intersection between the central light ray emitted from the condensing lens 2 and the reflecting surface 33 is located on the emitting surface 32 side of the reflecting surface 33.

Thus, it becomes easy to brighten a region on the lower side of the cutoff line 91 of the light distribution pattern projected on the irradiated surface 9. Further, the reduction in the length of the light guide component 3 in the optical axis direction (z axis direction) reduces internal absorption of light in the light guide component 3, improving the light use efficiency. "Internal absorption" refers to light loss inside the material excepting loss due to surface reflection when light passes through the light guide component. The internal absorption increases as a length of the light guide component increases.

A light beam entering the light guide element 3 from the light source 1 is on the front surface side of the reflecting surface 33, and a central light ray of the light beam has an intersection on a plane including the reflecting surface 33.

In the first embodiment, as an example, the light guide element 3 is described as the light guide component 3. Further, in the first embodiment, as an example, the light beam entering the light guide element 3 from the light source 1 enters through the incident surface 31. The front surface of the reflecting surface 33 is a surface for reflecting light.

The light beam entering the light guide element 3 from the light source 1 is on the front surface side of the reflecting surface 33, and travels toward the reflecting surface 33.

Second Modification Example

Further, in the headlight module 100 according to the first embodiment of the present invention, the emitting surface 232 of the condensing lens 2 is parallel to a plane perpendicular to the optical axis of the condensing lens 2. However, the shape of the emitting surface 232 is not limited to such a shape.

Figure 11A:
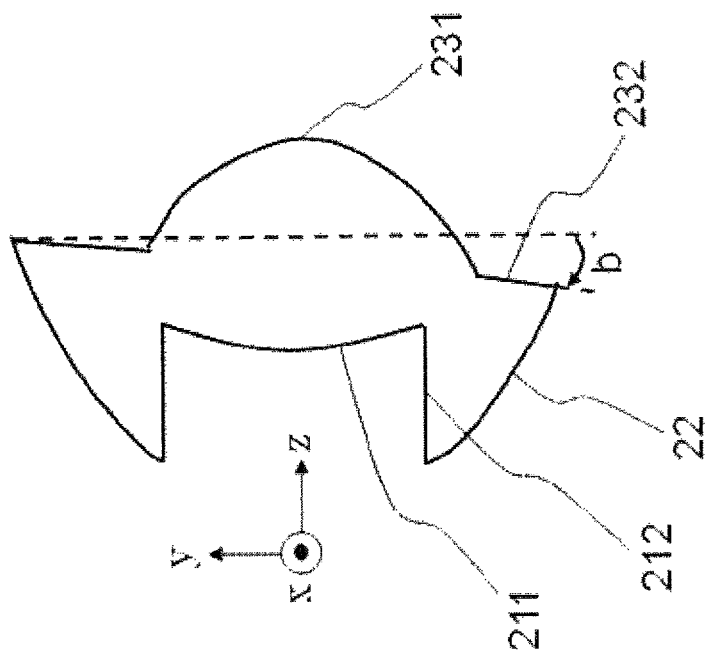
FIGS. 11(A) and 11(B) are diagrams illustrating shapes of a condensing lens 2 of the headlight module 100 according to a second modification example of the first embodiment.
Figure 11B:
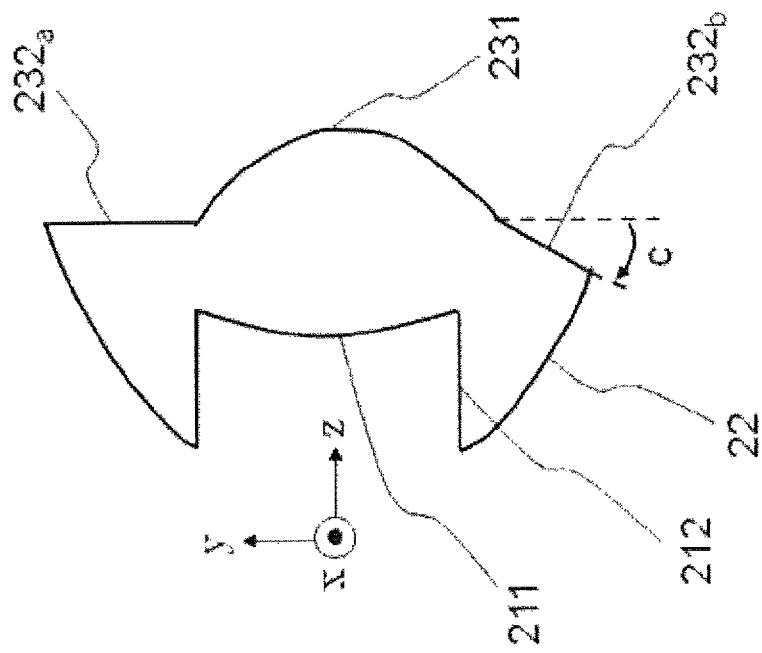
Figure 12:
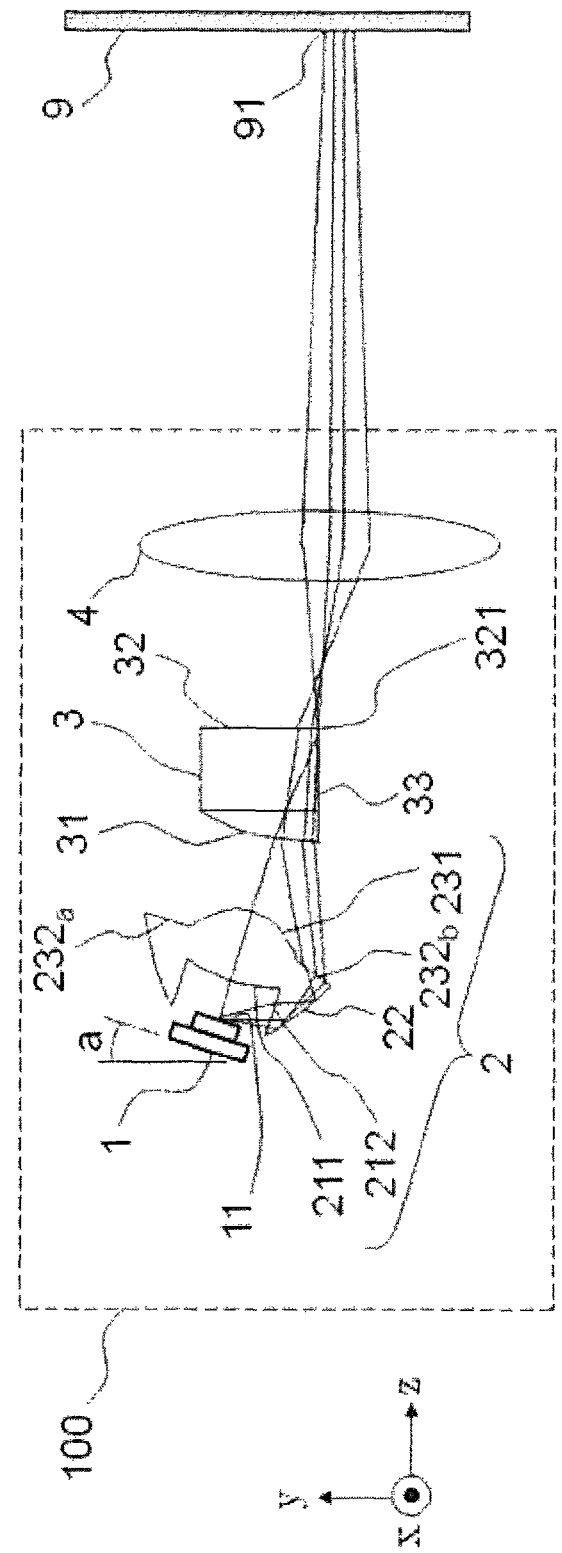
FIG. 12 is a configuration diagram illustrating a configuration of the headlight module 100 according to the second modification example of the first embodiment.

FIGS. 11(A) and 11(B) are diagrams illustrating shapes of the condensing lens 2. FIG. 12 is a configuration diagram illustrating a configuration of the headlight module 100.

For example, as illustrated in FIGS. 11(A) and 11(B), the whole or a part of the emitting surface 232 may be inclined with respect to a plane perpendicular to the optical axis.

In FIG. 11(A), the emitting surface 232 of the condensing lens 2 is formed on the same plane. The emitting surface 232 on the same plane is inclined by an angle b with respect to the optical axis of the condensing lens 2. The emitting surface 232 of FIG. 11(A) is inclined to face in the −y axis direction. That is, when viewed from the +x axis direction, the emitting surface 232 is rotated clockwise about the x axis. The dashed line in FIG. 11(A) represents a plane parallel to an x-y plane. That is, the dashed line in FIG. 11(A) represents a plane perpendicular to the optical axis of the condensing lens 2.

In FIG. 11(B), the emitting surface 232 of the condensing lens 2 is not formed on the same plane. The emitting surface 232 has regions $232_a$ and $232_b$.

The region $232_a$ is formed by a flat surface perpendicular to the optical axis of the condensing lens 2.

The region $232_a$ is, for example, a region of the emitting surface 232 on the +y axis side of the optical axis of the condensing lens 2.

The region $232_a$ will be described in a more limited way. if the region $232_a$ is a flat surface perpendicular to the optical axis of the condensing lens 2, light emitted from the region $232_a$ reaches the front surface side of the reflecting surface 33. Light reflected at the front surface of the reflecting surface 33 is emitted from the emitting surface 32. Further, light emitted from the emitting surface $232_a$ reaches the incident surface 31.

The front surface of the reflecting surface 33 is a surface for reflecting light of the reflecting surface 33. In the direction of a perpendicular line to the reflecting surface 33, the front surface of the reflecting surface 33 is a surface on the side on which the condensing lens 2 is located.

On the other hand, the region $232_b$ is formed by a flat surface inclined by an angle c with respect to a plane perpendicular to the optical axis.

The region $232_b$ is, for example, a region of the emitting surface 232 on the −y axis side of the optical axis of the condensing lens 2.

The region $232_b$ will be described in a more limited way. If the region $232_b$ is a flat surface perpendicular to the optical axis of the condensing lens 2, light emitted from the region $232_b$ reaches the back surface side of the reflecting surface 33. If the region $232_b$ is a flat surface perpendicular to the optical axis of the condensing lens 2, light emitted from the region $232_b$ reaches the back surface side of the reflecting surface 33. Further, light emitted from the emitting surface $232_a$ does not reach the incident surface 31.

The back surface of the reflecting surface 33 is a back surface of a reflecting surface of the reflecting surface 33. In the direction of a perpendicular line to the reflecting surface 33, the back surface of the reflecting surface 33 is a surface on the opposite side of the condensing lens 2.

The region $232_b$ on the −y axis side of the emitting surface 232 is inclined to face in the −y axis direction. That is, when viewed from the +x axis direction, the region $232_b$ on the −y axis side of the emitting surface 232 is rotated clockwise by the angle c about the x axis. The dashed line in FIG. 11(B) represents a plane parallel to an x-y plane. That is, the dashed line in FIG. 11(B) represents a plane perpendicular to the optical axis of the condensing lens 2.

For example, if the respective optical axes of the light source 1 and condensing lens 2 are arranged to be inclined in the −y axis direction with respect to the z axis, as in the first modification example, it is difficult to cause all of the light emitted from the emitting surface 232 located at the lower end portion (end portion on the −y axis side) of the condensing lens 2 to enter the light guide component 3.

This is because, for example, in the case of FIG. 10, the position in the y axis direction of the end portion on the −y axis direction side of a region corresponding to the region $232_b$ is located on the −y axis direction side of the position in the y axis direction of the end portion on the −z axis direction side of the reflecting surface 33. "Emitting surface 232 located at the lower end portion (end portion on the −y axis side) of the condensing lens 2" refers to a region corresponding to the region $232_b$ illustrated in FIG. 12.

However, as illustrated in FIG. 12, by inclining the region $232_b$ at the lower end portion (−y axis direction) of the emitting surface 232 of the condensing lens 2, light is refracted in the +y axis direction.

That is, a light concentration position of light emitted from the region $232_b$ is shorter than a light concentration position of light emitted from the region $232_a$. "Light concentration position" refers to a position at which a light beam emitted from an emitting surface is smallest.

That is, a light concentration position of light emitted from the emitting surface 232 (region $232_a$) located on the front surface side of the reflecting surface 33 of the emitting surface 232 of the condensing lens 2 is farther from the condensing lens 2 than a light concentration position of light emitted from the emitting surface 232 (region $232_b$) located on the back surface side of the reflecting surface 33 of the emitting surface 232 of the condensing lens 2.

A light concentration position of light emitted from the side (region $232_a$) far from the reflecting surface 33 with respect to the optical axis of the condensing lens 2 of the emitting surface 232 of the condensing lens 2 is farther from the condensing lens 2 than a light concentration position of light emitted from the side (region $232_b$) near the reflecting surface 33 with respect to the optical axis of the condensing lens 2 of the emitting surface 232 of the condensing lens 2.

By providing the region $232_b$, it is possible to cause light, which would not enter the light guide component 3 if the region $232_b$ were not provided, to enter the light guide component 3. Thus, it is possible to improve the light use efficiency.

The region $232_b$ of the second modification example is rotated clockwise by the angle c about an axis parallel to the x axis, as viewed from the +x axis direction. However, this is not mandatory, and the region $232_b$ may be rotated counterclockwise about an axis parallel to the x axis, as viewed from the +x axis direction.

For example, suppose that the position in the y axis direction of the end portion on the −y axis direction side of the region $232_b$ is located on the +y axis direction side of the position in the y axis direction of the end portion on the −z axis direction side of the reflecting surface 33. That is, suppose that the end portion on the −y axis direction side of the region $232_b$ is located on the +y axis direction side of the end portion on the −z axis direction side of the reflecting surface 33.

To irradiate the reflecting surface 33 with a large amount of light to improve the light use efficiency, the region $232_b$ needs to be rotated counterclockwise about an axis parallel to the x axis, as viewed from the +x axis direction. This is because light is refracted in the −y axis direction when exiting the region $232_b$, and thus a large amount of light reaches the reflecting surface 33.

The headlight module 100 includes the condensing element 2 for concentrating light emitted from the light source 1. Of the light beam entering the light guide element 3 from the condensing element 2, in a normal direction of the reflecting surface 33, a focal length of the condensing element 2 with respect to a first light ray at the end on the front surface side of the reflecting surface 33 is longer than a focal length of the condensing element 2 with respect to a second light ray at the end on the side opposite to the first light ray.

In the first embodiment, as an example, the light guide element 3 is described as the light guide component 3. Further, as an example, the condensing element 2 is described as the condensing lens 2. Further, as an example, the light beam entering the light guide element 3 from the light source 1 enters through the incident surface 31.

In the first embodiment, the normal direction of the reflecting surface 33 is described as the y axis direction. However, as illustrated in FIG. 13B, if the reflecting surface 33 is inclined, the normal direction is also inclined with respect to the y axis.

In the first embodiment, the front surface of the reflecting surface 33 is a surface for reflecting light. The front surface side of the reflecting surface 33 is described as the +y axis direction side. Further, in the second modification example, the first light ray is described as a light ray emitted from an end portion on the +y axis side of the region $232_a$. The second light ray is described as a light ray emitted from an end portion on the −y axis side of the region $232_b$.

Third Modification Example

Further, in the headlight module 100 according to the first embodiment of the present invention, the reflecting surface 33 of the light guide component 3 is a flat surface parallel to an x-z plane. However, the reflecting surface 33 is not limited to a flat surface parallel to an x-z plane.

Figure 13A:
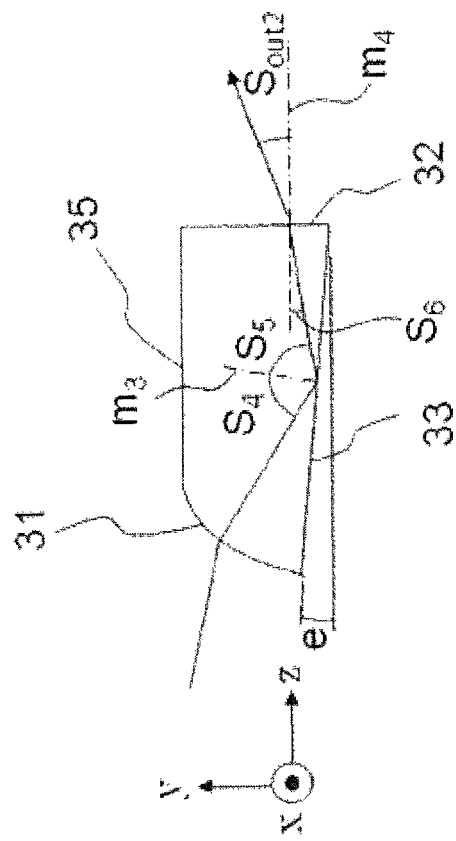
FIGS. 13(A) and 13(B) are diagrams illustrating shapes of light guide components 3 and 35 of the headlight module 100 according to a third modification example of the first embodiment.
Figure 13B:
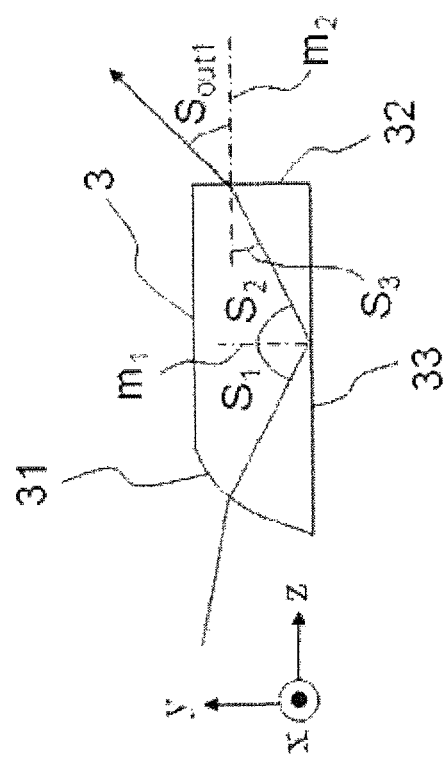

FIGS. 13(A) and 13(B) are diagrams illustrating a comparison of shape between the light guide component 3 and a light guide component 35 of the headlight module 100 according to the first embodiment. FIG. 13(A) illustrates the above-described light guide component 3 for comparison. FIG. 13(B) illustrates the light guide component 35 of a third modification example.

The reflecting surface 33 of the light guide component 35 illustrated in FIG. 13(B) is not a surface parallel to a z-x plane. For example, as illustrated in FIG. 13(B), the reflecting surface 33 may be a flat surface inclined with respect to a z-x plane with the x axis as a rotational axis.

The reflecting surface 33 of the light guide component 35 is a surface rotated clockwise about the x axis, as viewed from the +x axis direction. In FIG. 13(B), the reflecting surface 33 is a surface rotated by an angle e with respect to a z-x plane. That is, the end portion on the incident surface 31 side of the reflecting surface 33 is located on the +y axis side of the end portion on the emitting surface 32 side.

The reflecting surface 33 of the light guide component 3 illustrated in FIG. 13(A) is a flat surface parallel to an x-z plane. Light entering through the incident surface 31 is reflected at the reflecting surface 33 and emitted from the emitting surface 32. The incident angle of the light on the reflecting surface 33 is an incident angle $S_1$. The reflection angle of the light at the reflecting surface 33 is a reflection angle $S_2$. A perpendicular line $m_1$ to the reflecting surface 33 is indicated by a dot-and-dash line in FIG. 13(A). According to the law of reflection, the reflection angle $S_2$ is equal to the incident angle $S_1$.

Light is incident on the emitting surface 32 at an incident angle $S_3$. The light is emitted from the emitting surface 32 at an emission angle $S_{out1}$. A perpendicular line $m_2$ to the emitting surface 32 is indicated by a dot-and-dash line in FIG. 13(A). According to Snell's law, the relationship between the incident angle $S_3$ and the emission angle $S_{out1}$ is given by the following formula (1):

$$n \cdot \sin S_3 = \sin S_{out1} \qquad (1)$$

where the symbol n is the refractive index of the light guide component 3. The refractive index n is typically greater than 1. "·" used in the formula (1) denotes "multiplication."

Since the light is greatly refracted at the incident surface 31, the emission angle $S_{out1}$ of the light emitted from the emitting surface 32 is great. As the emission angle $S_{out1}$ becomes greater, the aperture of the projection lens 4 becomes larger. This is because, if the emission angle $S_{out1}$ is great, the projection lens 4 needs to receive light incident from a position far from the optical axis.

On the other hand, the reflecting surface 33 of the light guide component 35 illustrated in FIG. 13(B) is inclined with respect to an x-z plane. The inclination direction of the reflecting surface 33 is the clockwise rotation direction with respect to an x-z plane as viewed from the +x axis direction.

That is, the reflecting surface 33 is inclined with respect to the traveling direction (+z axis direction) of light in a direction such that an optical path in the light guide component 35 becomes wider. The reflecting surface 33 is inclined so that the optical path in the light guide component 35 becomes wider in the traveling direction (+z axis direction) of light. Here, the traveling direction of light is the traveling direction of light in the light guide component 35. Thus, the traveling direction of light is the direction parallel to the optical axis of the light guide component 35.

In the direction of the optical axis of the light guide component 35, the reflecting surface 33 faces toward the emitting surface 32. "Face toward the emitting surface 32" indicates that the reflecting surface 33 can be seen from the emitting surface 32 side (+z axis direction side).

Light entering through the incident surface 31 is reflected at the reflecting surface 33 and emitted from the emitting surface 32. The incident angle of the light on the reflecting surface 33 is an incident angle $S_4$. The reflection angle of the light at the reflecting surface 33 is a reflection angle $S_5$. A perpendicular line $m_3$ to the reflecting surface 33 is indicated by a dot-and-dash line in FIG. 13(B). According to the law of reflection, the reflection angle $S_5$ is equal to the incident angle $S_4$.

The light is incident on the emitting surface 32 at an incident angle $S_6$. The light is emitted from the emitting surface 32 at an emission angle $S_{out2}$. A perpendicular line $m_4$ to the emitting surface 32 is indicated by a dot-and-dash line in FIG. 13(B). According to Snell's law, the relationship between the incident angle $S_6$ and the emission angle $S_{out2}$ is given by the following formula (2):

$$n \cdot \sin S_6 = \sin S_{out2} \quad (2)$$

where the symbol n is the refractive index of the light guide component 35. The refractive index n is typically greater than 1. "·" used in the formula (2) denotes "multiplication."

The incident angle $S_4$ is greater than the incident angle $S_1$ because of the inclination of the reflecting surface 33. Further, the reflection angle $S_5$ is greater than the reflection angle $S_2$. Thus, the incident angle $S_6$ is less than the incident angle $S_3$. The relationships between the incident angles $S_3$ and $S_6$ and the emission angles $S_{out1}$ and $S_{out2}$ when the light is refracted at the emitting surface 32 obeys Snell's law. Since the refractive indexes n of the light guide components 3 and 35 are equal to each other, the emission angle $S_{out2}$ is less than the emission angle $S_{out1}$.

To make the emission angle $S_{out2}$ less than the emission angle $S_{out1}$, it is also possible to form the reflecting surface 33 into a curved surface shape. Specifically, the reflecting surface 33 is formed by a curved surface such that the optical path becomes wider in the traveling direction (+z axis direction) of light.

In the direction of the optical axis of the light guide component 35, the reflecting surface 33 is formed by a curved surface facing toward the emitting surface 32.

The inclination of the reflecting surface 33 functions to decrease the emission angle $S_{out}$ at which light reflected at the reflecting surface 33 is emitted from the emitting surface 32. Thus, the inclination of the reflecting surface 33 can reduce the aperture of the projection lens 4, downsizing the headlight module 100. In particular, it contributes to thinning the headlight module 100 in the height direction (y axis direction).

Further, by changing the angle of inclination of the reflecting surface 33, it is possible to change the position of the high illuminance region.

In the direction of the optical axis of the projection optical element 4, the reflecting surface 33 is inclined to face toward the emitting surface 32.

As an example, the projection optical element 4 is described as the projection lens 4.

Fourth Modification Example

Further, the first embodiment of the present invention describes a case where the single headlight module 100 includes the single light source 1 and the single condensing lens 2. However, the number of sets of the light source 1 and condensing lens 2 in a single headlight module is not limited to one. In the following description, a light source 1 and a condensing lens 2 will be collectively referred to as a light source module 15.

Figure 14:
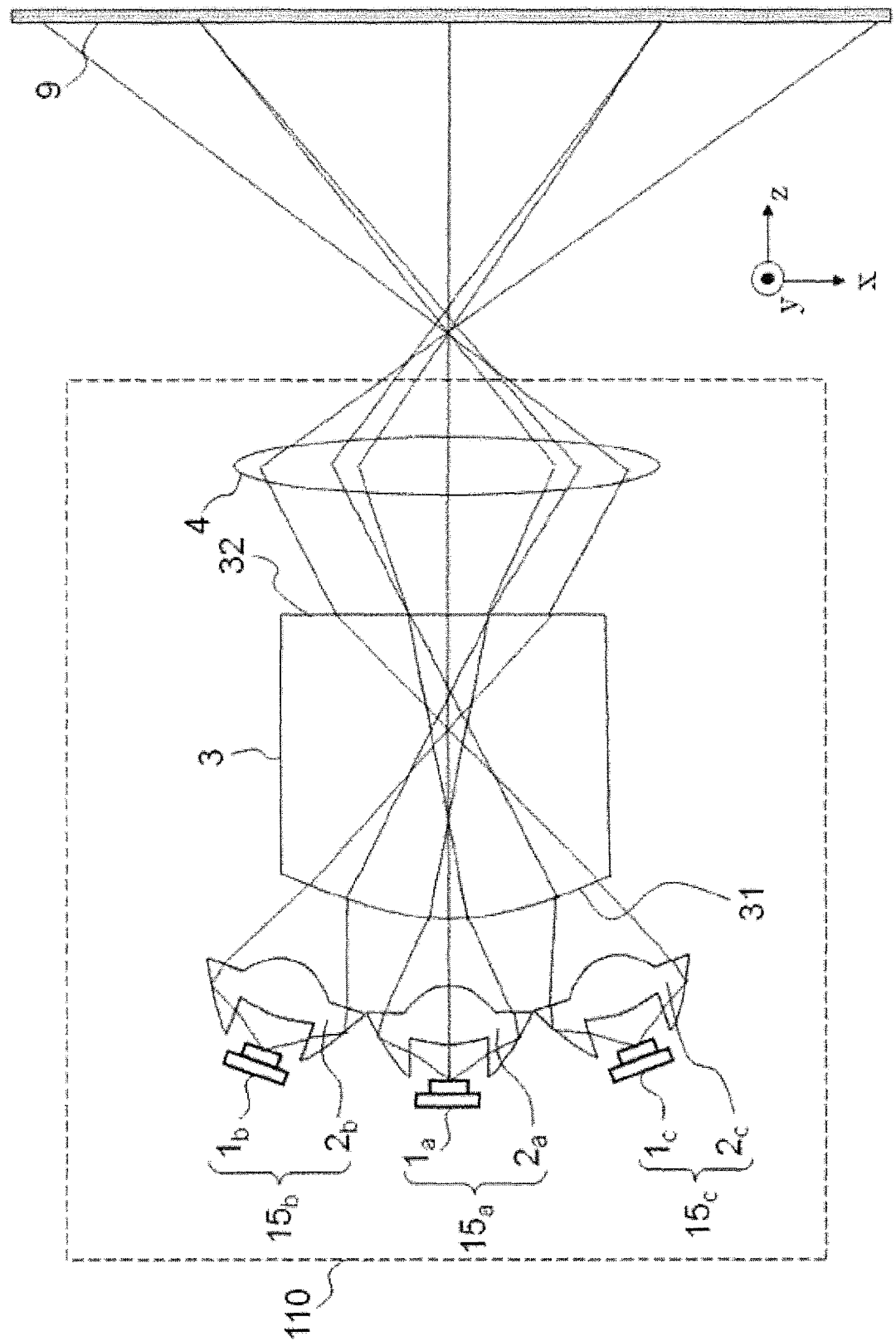
FIG. 14 is a configuration diagram illustrating a configuration of a headlight module 110 according to a fourth modification example of the first embodiment.

FIG. 14 is a configuration diagram illustrating a configuration of a headlight module 110 according to the first embodiment. FIG. 14 is a diagram of the headlight module 110 as viewed from the +y axis direction.

For example, the headlight module 110 illustrated in FIG. 14 includes three light source modules $15_a$, $15_b$, and $15_c$. The light source modules $15_a$, $15_b$, and $15_c$ include light sources $1_a$, $1_b$, and $1_c$ and condensing lenses $2_a$, $2_b$, and $2_c$, respectively. In FIG. 14, the three light source modules 15 are the light source module $15_a$, light source module $15_b$, and light source module $15_c$.

When viewed from the y axis direction, the light source $1_a$ and condensing lens $2_a$ are disposed on the optical axes of the light guide component 3 and projection lens 4. The light source $1_a$ and condensing lens $2_a$ constitute the light source module $15_a$.

Further, the light source $1_b$ is disposed on the −x axis side of the light source $1_a$. The condensing lens $2_b$ is disposed on the −x axis side of the condensing lens $2_a$. The light source $1_b$ and condensing lens $2_b$ constitute the light source module $15_b$. That is, the light source module $15_b$ is disposed on the −x axis side of the light source module $15_a$.

Further, the light source $1_c$ is disposed on the +x axis side of the light source $1_a$. The condensing lens $2_c$ is disposed on the +x axis side of the condensing lens $2_a$. The light source $1_c$ and condensing lens $2_c$ constitute the light source module $15_c$. That is, the light source module $15_c$ is disposed on the +x axis side of the light source module $15_a$.

Light emitted from the light source $1_a$ passes through the condensing lens $2_a$ and enters the light guide component 3 through the incident surface 31. When viewed from the y axis direction, a position in the x axis direction at which the light is incident on the incident surface 31 coincides with a position of the optical axis of the light guide component 3. The incident light is reflected at the reflecting surface 33 and emitted from the emitting surface 32. When viewed from the y axis direction, a position in the x axis direction at which the light is emitted from the emitting surface 32 coincides with a position of the optical axis of the light guide component 3.

Light emitted from the light source $1_b$ passes through the condensing lens $2_b$ and enters the light guide component 3 through the incident surface 31. When viewed from the y axis direction, a position in the x axis direction at which the light is incident on the incident surface 31 is on the −x axis side of the optical axis of the light guide component 3. The incident light is reflected at the reflecting surface 33 and emitted from the emitting surface 32. When viewed from the y axis direction, a position in the x axis direction at which the light is emitted from the emitting surface 32 is on the +x axis side of the optical axis of the light guide component 3.

Light emitted from the light source $1_c$ passes through the condensing lens $2_c$ and enters the light guide component 3 through the incident surface 31. When viewed from the y axis direction, a position in the x axis direction at which the light is incident on the incident surface 31 is on the +x axis side of the optical axis of the light guide component 3. The incident light is reflected at the reflecting surface 33 and emitted from the emitting surface 32. When viewed from the y axis direction, a position in the x axis direction at which the light is emitted from the emitting surface 32 is on the −x axis side of the optical axis of the light guide component 3.

Thus, the configuration illustrated in FIG. 14 can spread the light beam emitted from the emitting surface 32 in the horizontal direction (x axis direction). Since the emitting surface 32 and irradiated surface 9 are in conjugate relation with each other, the headlight module 110 can increase the width of the light distribution pattern in the horizontal direction.

Such a configuration makes it possible to increase the amount of light without providing multiple headlight modules 100. That is, the headlight module 110 contributes to downsizing of the entire headlight device. Further, the headlight module 110 can easily achieve a light distribution wide in the horizontal direction (x axis direction).

Further, in FIG. 14, the multiple light source modules 15 are arranged in the horizontal direction (x axis direction). However, the multiple light source modules 15 may be arranged in the vertical direction (y axis direction). For example, light source modules 15 are arranged in two levels in the y axis direction. This makes it possible to increase the amount of light of the headlight module 110.

Further, by performing control for individually turning on or off the light sources $1_a$, $1_b$, and $1_c$, it is possible to select an illuminated area in front of the vehicle. Thus, it is possible to provide the headlight module 110 with a light distribution change function. That is, the headlight module 110 can have a function of changing the light distribution.

For example, when a vehicle turns right or left at an intersection, a light distribution wider in the direction in which the vehicle turns than the light distribution of a typical low beam is required. In such a case, by performing control for individually turning on or off the light sources $1_a$, $1_b$, and $1_c$, it is possible to obtain an optimum light distribution corresponding to the traveling situation. The driver can obtain better visibility in the traveling direction by changing the light distribution of the headlight module 110.

Second Embodiment

FIG. 15 is a configuration diagram illustrating a configuration of a headlight module 120 according to a second embodiment of the present invention. Elements that are the same as in FIG. 1 will be given the same reference characters, and descriptions thereof will be omitted. The elements that are the same as in FIG. 1 are the light source 1, condensing lens 2, light guide component 3, and projection lens 4.

As illustrated in FIG. 15, the headlight module 120 according to the second embodiment includes the light source 1, light guide component 3, projection lens 4, a rotation mechanism 5, and a control circuit 6. The headlight module 120 may include the condensing lens 2.

The rotation mechanism 5 rotates the light guide component 3 and projection lens 4 as a unit about an optical axis. That is, the headlight module 120 according to the second embodiment differs from the headlight module 100 according to the first embodiment in having the rotation mechanism 5 and control circuit 6.

<Tilt of Vehicle Body and Tilt of Light Distribution Pattern>

In general, when a motorcycle corners, the vehicle body tilts. When the vehicle body of the motorcycle tilts, the headlight device tilts together with the vehicle body. Thus, there is a problem that a corner area toward which the driver's gaze is directed is not sufficiently illuminated.

"Corner area" refers to an illumination area in the traveling direction of the vehicle when the vehicle is turning. The corner area is an area in the traveling direction toward which the driver's gaze is directed. Typically, when the vehicle turns left, the corner area is an area on the left side of an illumination area when the vehicle travels straight. Further, when the vehicle turns right, the corner area is an area on the right side of the illumination area when the vehicle travels straight.

Figure 16A:
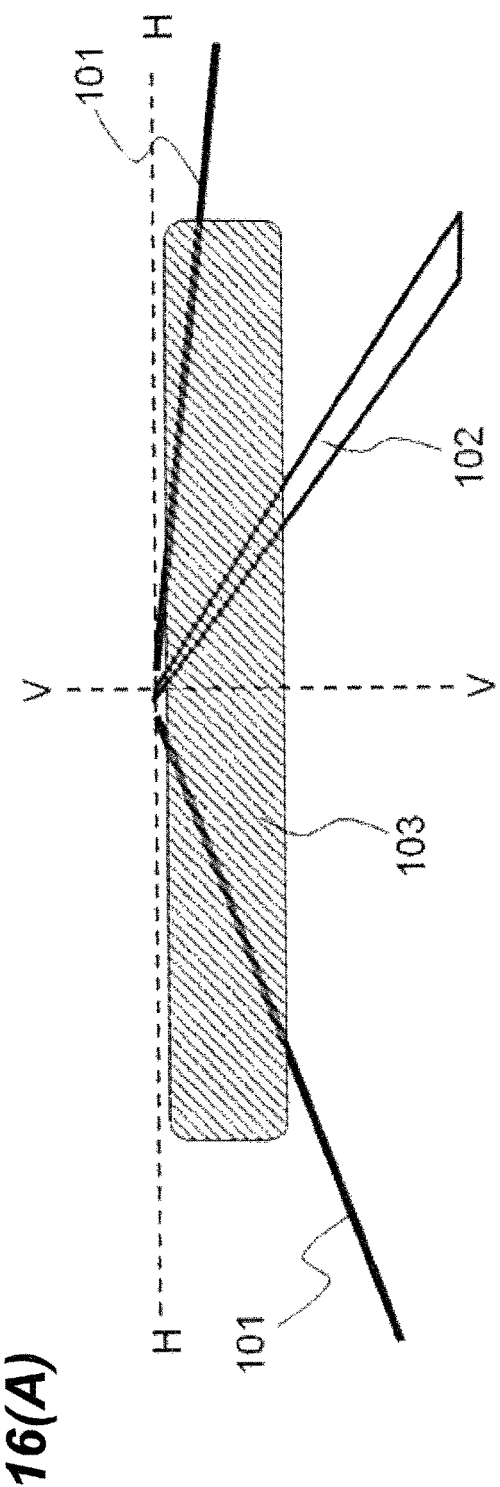
FIGS. 16(A) and 16(B) are schematic diagrams illustrating light distribution patterns 103 and 104 of a motorcycle.
Figure 16B:
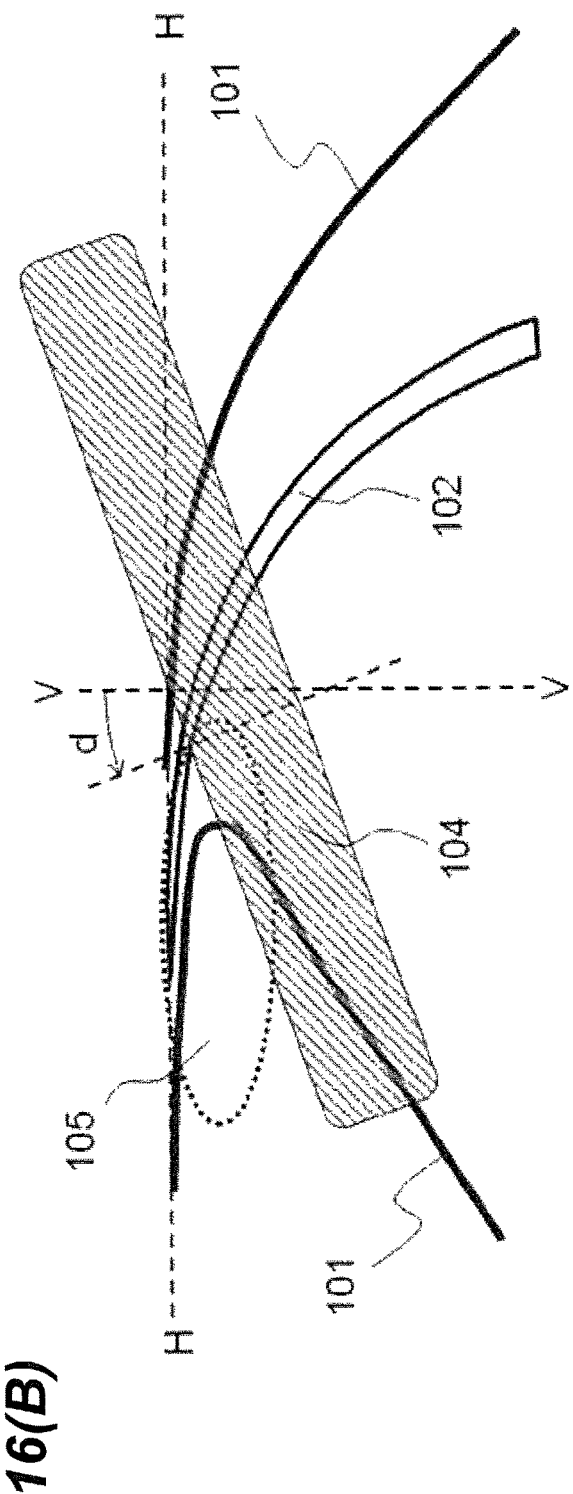

FIGS. 16(A) and 16(B) are schematic diagrams illustrating light distribution patterns 103 and 104 of the motorcycle. FIG. 16(A) illustrates the light distribution pattern 103 in a situation where the motorcycle travels without tilting the vehicle body. That is, FIG. 16(A) illustrates the light distribution pattern 103 in a situation where the motorcycle travels straight. FIG. 16(B) illustrates the light distribution pattern 104 in a situation where the motorcycle travels while tilting the vehicle body to the left. That is, FIG. 16(B) illustrates the light distribution pattern 104 in a situation where the motorcycle turns left.

In FIGS. 16(A) and 16(B), the motorcycle is traveling in a left lane. The line H-H represents the horizon line. The line V-V represents a line perpendicular to the line H-H (horizon line) at a position of the vehicle body. Since the motorcycle travels in the left lane, the center line 102 is located on the right side of the line V-V. Further, the lines 101 represent parts of the left edge and right edge of the road surface. The motorcycle illustrated in FIG. 16(B) is cornering while tilting the vehicle body to the left by a tilt angle d with respect to the line V-V. The tilt angle d of the vehicle body relative to the line V-V of the motorcycle is referred to as the bank angle.

The light distribution pattern 103 illustrated in FIG. 16(A) is wide in the horizontal direction and illuminates a predetermined area without waste. However, the light distribution pattern 104 illustrated in FIG. 16(B) is radiated while being tilted in such a manner that the left side is down and the right side is up. At this time, an area in the traveling direction toward which the driver's gaze is directed is a corner area 105. "Predetermined" here refers to, for example, being specified by road traffic rules or the like.

In FIG. 16(B), the corner area 105 is on the left side of the line V-V and in contact with the line H-H below the line H-H. In FIG. 16(B), the corner area 105 is represented by a dashed line.

A typical headlight device is fixed to a vehicle body. Thus, when the vehicle corners, on the road (in FIG. 16, left side) in the traveling direction, the headlight device illuminates an area below the road surface. Thus, the corner area 105 is not sufficiently illuminated and is dark.

Further, when the vehicle corners, on the road (in FIG. 16, right side) in a direction opposite to the traveling direction, the typical headlight device illuminates a position above the road surface. Thus, the headlight device may illuminate an oncoming vehicle with dazzling light.

Figure 17:
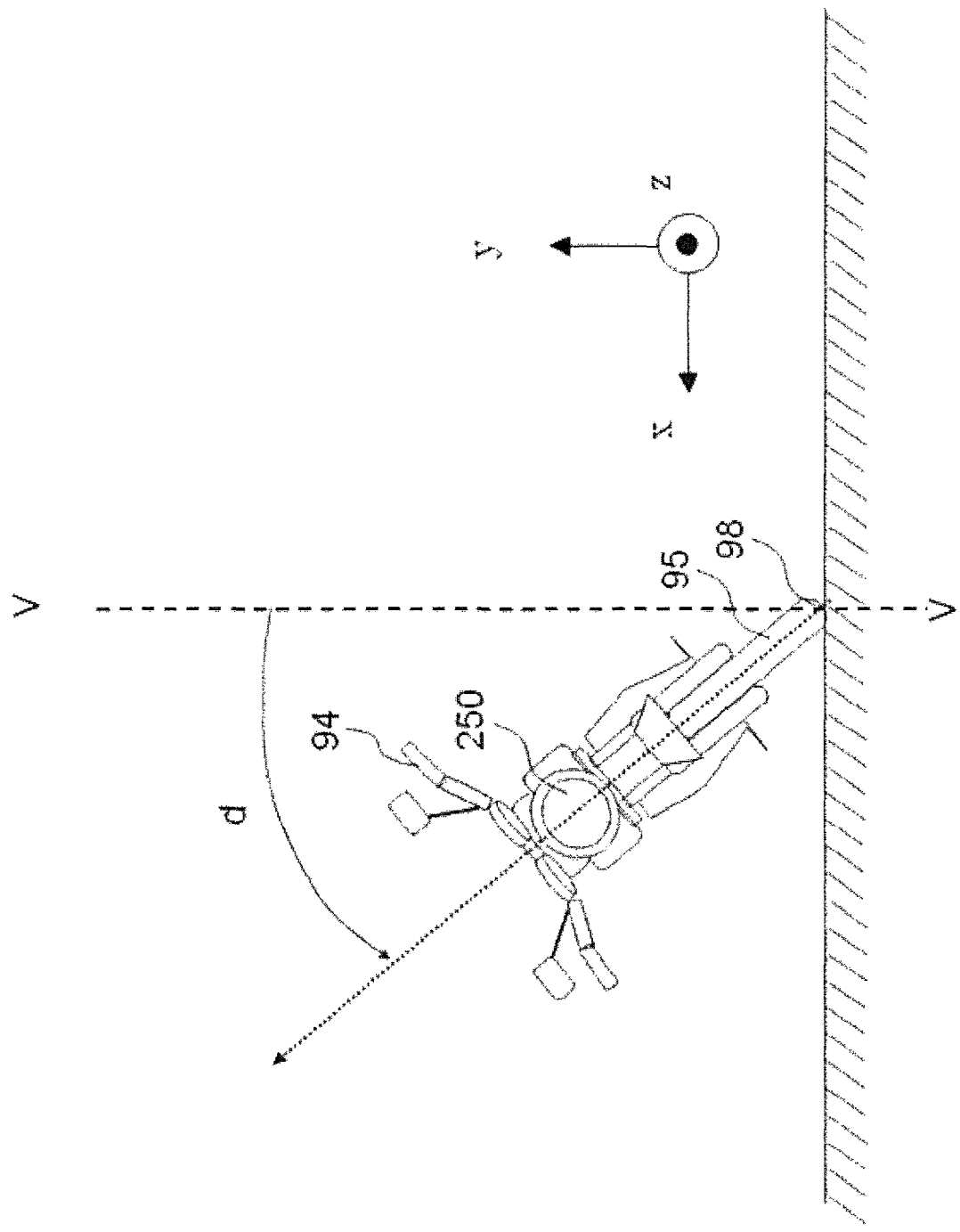
FIG. 17 is an explanatory diagram illustrating a tilt angle d of a vehicle body.

FIG. 17 is an explanatory diagram illustrating the tilt angle d of the vehicle body. FIG. 17 is a schematic diagram illustrating a state in which the vehicle body of the motorcycle 94 is tilted, as viewed from the front of the motorcycle 94. FIG. 17 illustrates a state in which the motorcycle 94 is tilted by the tilt angle d to the right with respect to the traveling direction.

In FIG. 17, the motorcycle 94 is tilted by the tilt angle d to the right with respect to the traveling direction. That is, the motorcycle 94 rotates to the left or right about a position 98 at which a wheel 95 makes contact with the ground.

In FIG. 17, the motorcycle 94 is rotated counterclockwise by the angle d about the position 98 at which the wheel 95 makes contact with the ground, as viewed from the +z axis direction. In this case, it can be seen that the headlight device 250 is also tilted by the tilt angle d.

The headlight module 120 according to the second embodiment solves such a problem with small and simple structure.

<Configuration of Headlight Module 120>

As illustrated in FIG. 15, the rotation mechanism 5 of the headlight module 120 according to the second embodiment supports the light guide component 3 and projection lens 4 rotatably about an optical axis.

The rotation mechanism 5 includes, for example, a stepping motor 51, gears 52, 53, 54, and 55, and a shaft 56. The stepping motor 51 may be replaced with, for example, a DC motor or the like.

The control circuit 6 sends a control signal to the stepping motor 51. The control circuit 6 controls a rotation angle and a rotation speed of the stepping motor 51.

The control circuit 6 is connected to a vehicle body tilt sensor 65 for detecting the tilt angle d of the motorcycle 94. The vehicle body tilt sensor 65 is, for example, a sensor, such as a gyro, or the like. The control circuit 6 receives a signal of the tilt angle d of the vehicle body detected by the vehicle body tilt sensor 65. The control circuit 6 performs calculation based on the detected signal to control the stepping motor 51.

If the motorcycle 94 is tilted by the tilt angle d, the control circuit 6 rotates the light guide component 3 and projection lens 4 by the angle d in a direction opposite to the tilt direction of the vehicle body. That is, the direction in which the light guide component 3 and projection lens 4 is rotated is opposite to the tilt direction of the vehicle body.

The gear 53 is mounted on the light guide component 3 so that a rotational axis of the gear 53 coincides with the optical axis of the light guide component 3 and the gear 53 surrounds the light guide component 3. That is, the rotational axis of the gear 53 coincides with the optical axis of the light guide component 3. Further, the gear 53 is disposed around the light guide component 3. In FIG. 15, the gear 53 is disposed to surround the light guide component 3. However, the gear 53 may be disposed at a part of the circumference of the light guide component 3.

The gear 55 is mounted on the projection lens 4 so that a rotational axis of the gear 55 coincides with the optical axis of the projection lens 4 and the gear 55 surrounds the projection lens 4. That is, the rotational axis of the gear 55 coincides with the optical axis of the projection lens 4. Further, the gear 55 is disposed around the projection lens 4. In FIG. 15, the gear 55 is disposed to surround the projection lens 4. However, the gear 55 may be disposed at a part of the circumference of the projection lens 4.

The shaft 56 coincides with a rotational axis of the stepping motor 51. The shaft 56 is also mounted to a rotation shaft of the stepping motor 51. The shaft 56 is disposed in parallel with the optical axis of the light guide component 3 and the optical axis of the projection lens 4.

A rotational axis of the gear 52 coincides with the shaft 56. The gear 52 is mounted on the shaft 56. The gear 52 meshes with the gear 53.

A rotational axis of the gear 54 coincides with the shaft 56. The gear 54 is mounted on the shaft 56. The gear 54 meshes with the gear 55.

Since the rotation mechanism 5 is configured in this manner, as the rotation shaft of the stepping motor 51 rotates, the shaft 56 rotates. As the shaft 56 rotates, the gears 52 and 54 rotate. As the gear 52 rotates, the gear 53 rotates. As the gear 53 rotates, the light guide component 3 rotates about the optical axis. As the gear 54 rotates, the gear 55 rotates. As the gear 55 rotates, the projection lens 4 rotates about the optical axis.

Since the gears 52 and 54 are mounted on the single shaft 56, the light guide component 3 and projection lens 4 rotate simultaneously. The light guide component 3 and projection lens 4 also rotate in the same direction.

The rotation mechanism 5 rotates the light guide component 3 and projection lens 4 based on a control signal obtained from the control circuit 6. The direction in which the light guide component 3 and projection lens 4 are rotated is a direction opposite to the tilt direction of the vehicle body. The tilt direction of the vehicle body is also referred to as the "bank direction."

The rotation angles of the light guide component 3 and projection lens 4 depend on the numbers of teeth of the gears 52, 53, 54, and 55. If the rotation angles of the light guide component 3 and projection lens 4 are set to be equal to each other, the rotation mechanism 5 can rotate the light guide component 3 and projection lens 4 as a unit.

The emitting surface 32 of the light guide component 3 can be treated as a secondary light source. "Secondary light source" refers to a surface light source that emits planar light.

Further, the emitting surface 32 is in an optically conjugate relation with the irradiated surface 9.

Thus, if the light guide component 3 and projection lens 4 are rotated about the optical axis without changing the geometrical relation between the light guide component 3 and the projection lens 4, the light distribution pattern illuminating the irradiated surface 9 is also rotated by the same rotational amount as that of the light guide component 3 and projection lens 4.

Thus, by rotating the light guide component 3 and projection lens 4 in a direction opposite to the tilt direction by the same amount as the tilt angle d, it is possible to correctly compensate the tilt of the light distribution pattern due to the tilt of the vehicle body of the motorcycle 94.

The rotation mechanism 5 is not limited to the above and may be other rotation mechanisms. Stepping motors for rotating each of the light guide component 3 and projection lens 4 may be provided to individually control their amounts of rotation. That is, a stepping motor for the light guide component 3 and a stepping motor for the projection lens 4 may be provided.

Figure 18A:
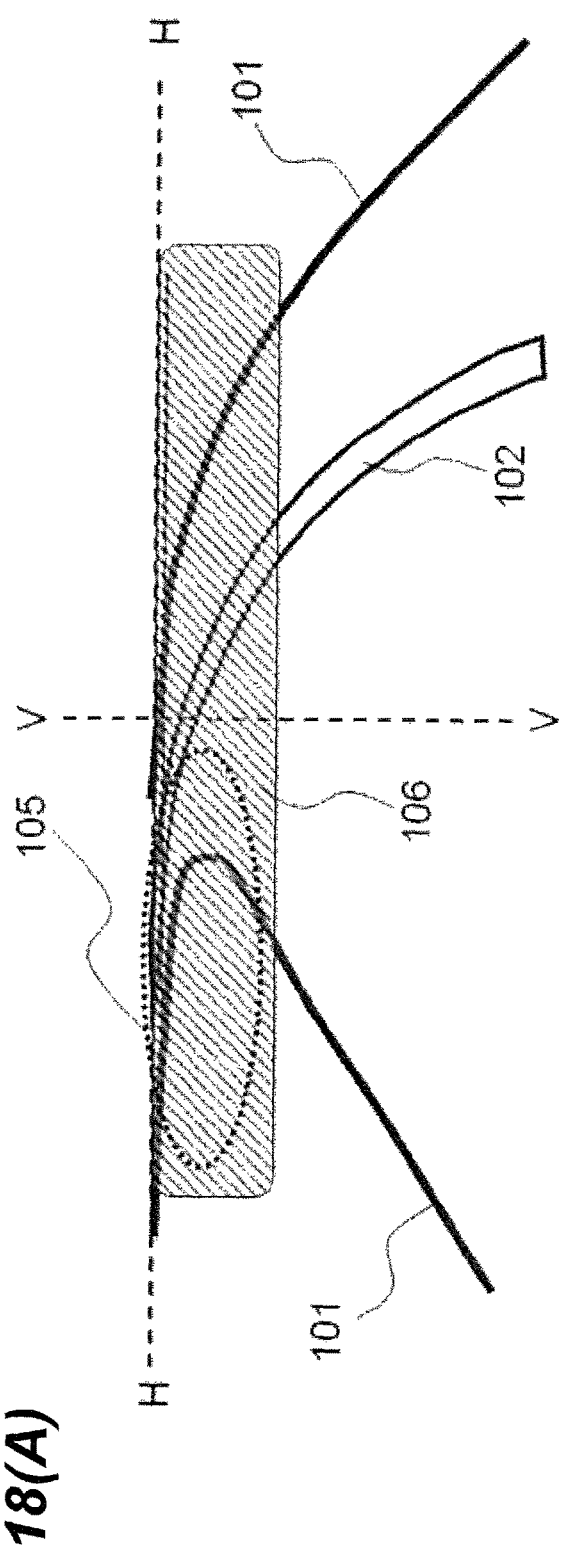
FIGS. 18(A) and 18(B) are schematic diagrams illustrating light distribution patterns corrected by the headlight module 120 according to the second embodiment.
Figure 18B:
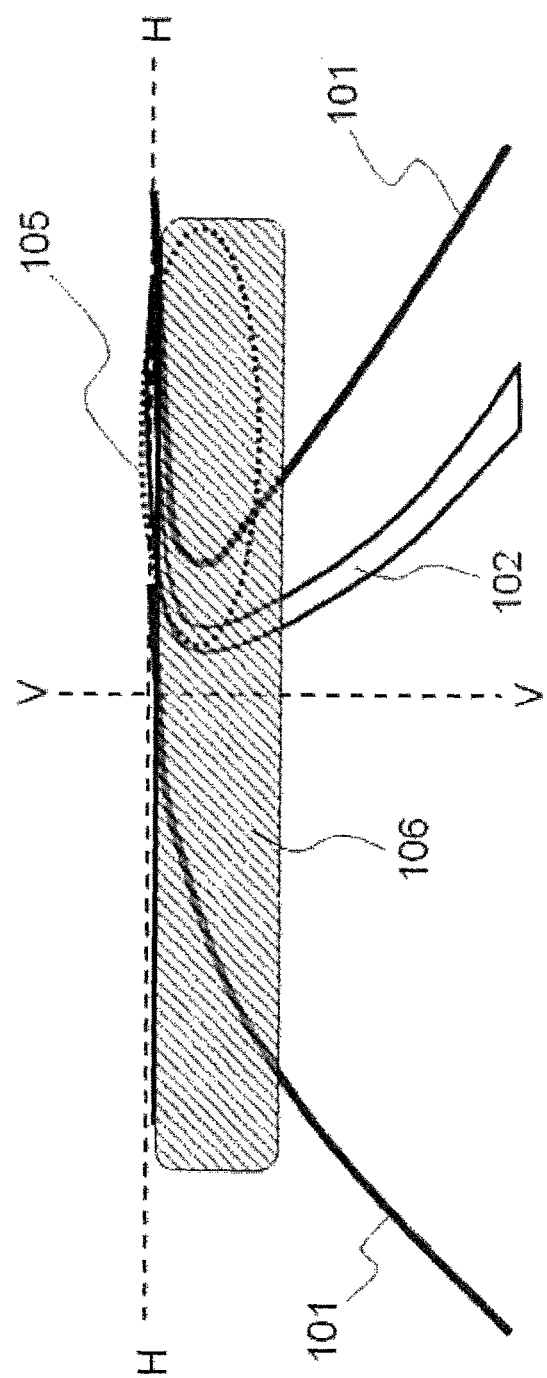

FIGS. 18(A) and 18(B) are schematic diagrams each illustrating a case where the light distribution pattern is corrected by the headlight module 120. FIG. 18(A) illustrates a case of cornering to the left while traveling in the left lane. FIG. 18(B) illustrates a case of cornering to the right while traveling in the left lane.

As described above, the control circuit 6 rotates the light distribution pattern 106 in accordance with the tilt angle d of the vehicle body. The light distribution pattern 106 in FIG. 18(A) is rotated by the tilt angle d clockwise as viewed in the traveling direction. The light distribution pattern 106 in FIG. 18(B) is rotated by the tilt angle d counterclockwise as viewed in the traveling direction. Whether the vehicle body tilts to the left or right, the headlight module 120 can provide the same light distribution pattern 106 as in the case where the vehicle body is not tilted, as a result.

In this manner, the headlight module 120 according to the second embodiment rotates the light guide component 3 and projection lens 4 in accordance with the tilt angle d of the vehicle body. Thereby, the formed light distribution pattern 106 rotates about an optical axis of an optical system. The projection lens 4 magnifies and projects light with the rotated light distribution pattern 106.

Thereby, the headlight module 120 can illuminate an area (corner area 105) in the traveling direction toward which the driver's gaze is directed.

Further, since the light guide component 3 and projection lens 4, which are relatively small as compared to conventional optical components, are rotated, it is possible to drive them with a small driving force, as compared to a case of rotating a light source and a large lens that are provided in a conventional headlight device.

Further, it becomes unnecessary to rotatably support a large-diameter lens. From these, the rotation mechanism 5 can be downsized.

Further, if a surface shape of the projection lens 4 is, for example, a toroidal lens having different curvatures in the x axis direction and y axis direction, it is effective to rotate the projection lens 4 together with the light guide component 3. The toroidal lens is a lens having different powers in the x axis direction and y axis direction. By employing the toroidal lens as the projection lens 4, the formation of the light distribution pattern can be shared with the light guide component 3.

If the projection lens 4 has a function of sharing the formation of the light distribution pattern with the light guide component 3, the projection lens 4 is not limited to the toroidal lens and may be a cylindrical lens or a lens having a free-form surface. The cylindrical lens is a lens having refractive power to perform convergence or divergence in one direction but having no refractive power in the orthogonal direction.

Further, in FIG. 15, a configuration in which the projection lens 4 is rotated is illustrated. However, a configuration in which the projection lens 4 is not rotated may be employed.

The headlight module 120 includes the rotation mechanism 5 for rotating the light guide component 3 about an axis parallel to the optical axis and the controller 6. The controller 6 drives the rotation mechanism 5.

In a case where the projection lens 4 has the shape of a solid of revolution with the optical axis as the center, and the optical axis of the projection lens 4 coincides with the optical axis of the light guide component 3 as described above, even if the configuration in which the projection lens 4 is rotated is not employed, there is no particular problem. "Solid of revolution" refers to a solid figure obtained by rotating a plane figure about a straight line (axis) on the same plane as the plane figure.

That is, if a lens surface of the projection lens 4 has a rotationally symmetric surface shape and a center of curvature of the projection lens 4 coincides with the optical axis of the light guide component 3, the same advantages can be obtained by rotating only the light guide component 3 about the optical axis without rotating the projection lens 4. In this case, the optical axis of the projection lens 4 coincides with the optical axis of the light guide component 3.

In this case, the gears 54 and 55 are unnecessary. That is, the rotation mechanism 5 can be further downsized and simplified, as compared to a case of rotating the light guide component 3 and projection lens 4 about the optical axis as a unit.

Further, as described in the first modification example of the first embodiment, the light source 1 and condensing lens 2 may be inclined with respect to the light guide component 3 and projection lens 4. In such a case, the light source 1 and condensing lens 2 need to be rotated integrally with the light guide component 3 about the rotational axis of the light guide component 3.

Further, as described in the fourth modification example of the first embodiment, the headlight module may include the multiple light source modules 15. Also in such a case, the light source modules 15 need to be rotated integrally with the light guide component 3 about the rotational axis of the light guide component 3.

This is because, in these cases, if the light source 1 and condensing lens 2 are fixed, rotation of the light guide component 3 changes the condition of light entering the light guide component 3, complicating formation of the light distribution pattern.

The second embodiment rotates the light guide component 3 and projection lens 4 about the optical axis. However, the light guide component 3 may be rotated about an axis other than the optical axis. The projection lens 4 may also be rotated about an axis other than the optical axis.

For example, for the light guide component 3, one end of the rotational axis may pass through the incident surface 31. Further, the other end of the rotational axis may pass through the emitting surface 32. In this manner, an axis passing through the surfaces at both ends in the optical axis direction of the light guide component 3 may be set as the rotational axis. That is, this rotational axis is inclined with respect to the optical axis of the light guide component 3.

Similarly, for example, for the projection lens 4, one end of the rotational axis may pass through an incident surface (surface on the −z axis side) of the projection lens 4. Further, the other end of the rotational axis may pass through an emitting surface (surface on the +z axis side) of the projection lens 4. In this manner, an axis passing through the surfaces at both ends in the optical axis direction of the projection lens 4 may be set as the rotational axis. That is, this rotational axis is inclined with respect to the optical axis of the projection lens 4.

However, if the rotational axis coincides with the optical axis, since the rotational axis of the light distribution pattern can be set to the optical axis, the light distribution can be controlled more easily.

Further, the headlight module 120 according to the second embodiment rotates the light guide component 3 and projection lens 4 about the optical axis by the angle d in a direction opposite to the tilt direction in accordance with the tilt angle d of the vehicle body.

However, this is not mandatory, and the rotation angle may be an arbitrary angle; for example, the light guide component 3 and projection lens 4 may be rotated about the optical axis by an angle greater than the tilt angle d. Thus, the light distribution pattern can be intentionally tilted as necessary, instead of being always horizontal.

For example, by tilting the light distribution pattern so as to raise the corner area 105 side of the light distribution, it is possible to make it easy for the driver to observe an area in the traveling direction of the vehicle. Further, in the case of a left hand corner, by tilting the light distribution pattern so as to lower a side opposite to the corner area 105 side of the light distribution, it is possible to reduce dazzling of an oncoming vehicle due to projection light.

The second embodiment is described by taking the motorcycle 94 as an example. However, for the above-described motor tricycle called gyro or the like, most of the vehicle body including a front wheel and a driver seat is tilted in the left-right direction around a corner. Thus, the headlight module 120 may be used in a motor tricycle.

The headlight module 120 may also be used in a four-wheeled vehicle. For example, when it corners to the left, the vehicle body tilts to the right. Further, when it corners to the right, the vehicle body tilts to the left. This is due to centrifugal force. In this respect, it is opposite in the bank direction to a motorcycle. However, a four-wheeled vehicle may also detect the bank angle of the vehicle body to correct the irradiated area. Further, when the vehicle body tilts because, for example, only a wheel or wheels on one side drive over an obstacle or the like, it is also possible to obtain the same irradiated area as when the vehicle body is not tilted.

The headlight module 120 includes the rotation mechanism 5 relative to the headlight module 100. The rotation mechanism 5 rotates the light guide element 3. The rotation mechanism 5 rotates the light guide element 3 about an axis passing through an end portion of the light guide element 3 on a side on which light emitted from the light source 1 is incident and the emitting surface 32.

In the second embodiment, as an example, the light guide element 3 is described as the light guide component 3.

Further, as an example, the end portion on the side on which light is incident is described as the incident surface 31.

The rotation mechanism 5 can rotate the light guide element 3 about an axis that passes through a surface passing through an end portion of the light guide element 3 on a side on which light emitted from the light source 1 is incident and a surface passing through the emitting surface 32. In another aspect, the rotation mechanism 5 can rotate the light guide element 3 about an axis that passes through a surface including an end portion of the light guide element 3 on a side on which light emitted from the light source 1 is incident and a surface including the emitting surface 32.

Further, in the second embodiment, the rotation mechanism 5 rotates the light guide element 3 about the optical axis of the projection optical element 4.

Further, in the second embodiment, the rotation mechanism 5 rotates the light guide element 3 about an axis passing through the end portion 321.

As an example, the end portion 321 is described as the edge 321.

The headlight module 120 includes the rotation means 5 relative to the headlight module 100. The rotation means 5 rotates the light guide element 3. The rotation means 5 rotates the light guide element 3 about an axis passing through an end portion of the light guide element 3 on a side on which light emitted from the light source 1 is incident and the emitting surface 32.

In the second embodiment, as an example, the light guide element 3 is described as the light guide component 3. Further, as an example, the end portion on the side on which light is incident is described as the incident surface 31.

The rotation means 5 can rotate the light guide element 3 about an axis that passes through a surface passing through an end portion of the light guide element 3 on a side on which light emitted from the light source 1 is incident and a surface passing through the emitting surface 32. In another aspect, the rotation means 5 can rotate the light guide element 3 about an axis that passes through a surface including an end portion of the light guide element 3 on a side on which light emitted from the light source 1 is incident and a surface including the emitting surface 32.

Further, in the second embodiment, the rotation means 5 rotates the light guide element 3 about the optical axis of the projection optical element 4.

Further, in the second embodiment, the rotation means 5 rotates the light guide element 3 about an axis passing through the end portion 321.

As an example, the rotation means 5 is described as the rotation mechanism 5.

Third Embodiment

FIG. 19 is a configuration diagram illustrating a configuration of a headlight module 130 according to a third embodiment of the present invention. Elements that are the same as in FIG. 1 will be given the same reference characters, and descriptions thereof will be omitted. The elements that are the same as in FIG. 1 are the light source 1, condensing lens 2, light guide component 3, and projection lens 4.

As illustrated in FIG. 19, the headlight module 130 according to the third embodiment includes the light source 1, the light guide component 3, the projection lens 4, a translation mechanism 7, and the control circuit 6. The headlight module 130 may include the condensing lens 2.

"Translation" refers to parallel displacement of each point constituting a rigid body or the like in the same direction. Hereinafter, "translation" will also be referred to as "translation." Further, the distance by which a component is translated will be referred to as the "translation amount."

The translation mechanism 7 moves the projection lens 4 in the x axis direction. That is, the headlight module 130 differs from the headlight module 100 according to the first embodiment in having the translation mechanism 7 and control circuit 6.

In headlight devices, a technique is known in which, when a vehicle corners, the optical axis of its headlight device is controlled to be directed in the traveling direction. In particular, in headlight devices for automobiles, an illuminating direction of a headlight device is moved in the left-right direction (x axis direction) of the vehicle based on information, such as a steering angle, vehicle speed, or vehicle height of the automobile. "Steering angle" refers to an angle of steering for arbitrarily changing the traveling direction of the vehicle. The "steering angle" is also referred to as the "steering angle."

However, a conventional headlight device typically employs a method of turning the entire headlight. Thus, there is a problem that the drive unit is large. Further, there is a problem that the load of the drive unit is large.

The headlight module 130 according to the third embodiment of the present invention solves such problems. The headlight module 130 solves such problems with a small and simple structure.

As illustrated in FIG. 19, the translation mechanism 7 includes a stepping motor 71, a pinion 72, a rack 73, and a shaft 76.

The translation mechanism 7 of the headlight module 130 according to the third embodiment supports the projection lens 4 translatably in the x axis direction, as illustrated in FIG. 19. The translation mechanism 7 includes, for example, the stepping motor 71, pinion 72, rack 73, and shaft 76.

The translation mechanism 7 obtains a translation amount from the control circuit 6. The translation mechanism 7 then translates the projection lens 4 in the left-right direction based on the translation amount.

A shaft of the stepping motor 71 is connected to the shaft 76. The shaft of the stepping motor 71 and the shaft 76 are disposed in parallel with the z axis. That is, the shaft of the stepping motor 71 and the shaft 76 are disposed in parallel with the optical axis of the projection lens 4.

The pinion 72 is mounted on the shaft 76. An axis of the pinion 72 is parallel to the z axis. Teeth of the pinion 72 mesh with teeth of the rack 73. The pinion 72 is disposed on the outer side of the rack 73 with respect to the projection lens 4.

The rack 73 is mounted on the projection lens 4. The rack 73 is disposed on the upper side (+y axis direction side) of the projection lens 4, as viewed in a direction (+z axis direction) from the headlight module 130 to the irradiated surface 9. Alternatively, the rack 73 may be disposed on the lower side (−y axis direction side) of the projection lens 4, as viewed in a direction (+z axis direction) from the headlight module 130 to the irradiated surface 9.

The rack 73 is disposed in parallel with the x axis. That is, the rack 73 is disposed so that the teeth of the rack 73 are aligned in the horizontal direction (x axis direction).

The teeth of the rack 73 are formed on the outer side with respect to the projection lens 4. That is, if the rack 73 is disposed on the upper side (+y axis direction side) of the projection lens 4, the teeth of the rack 73 are formed on the upper side (+y axis direction side) of the rack 73. If the rack 73 is disposed on the lower side (−y axis direction side) of the projection lens 4, the teeth of the rack 73 are formed on the lower side (−y axis direction side) of the rack 73.

As the stepping motor 71 rotates, the shaft 76 rotates. As the shaft 76 rotates, the pinion 72 rotates. That is, the pinion 72 rotates about the axis of the pinion 72 due to the rotation of the shaft 76. As the pinion 72 rotates, the rack 73 moves in the x axis direction. As the rack 73 moves in the x axis direction, the projection lens 4 moves in the x axis direction.

As described above, the translation mechanism 7 translates the projection lens 4 in the left-right direction based on the translation amount obtained from the control circuit 6.

For example, the control circuit 6 is connected to a vehicle body state sensor 66. The vehicle body state sensor 66 is, for example, a steering angle sensor, a vehicle speed sensor, or the like. "Steering angle sensor" refers to a sensor for sensing a steering angle of the front wheel when a steering wheel is turned.

The control circuit 6 receives information, such as a steering angle, vehicle speed, or vehicle height of the vehicle body, detected by the vehicle body state sensor 66. The vehicle body state sensor 66 detects a steering angle, vehicle speed, vehicle height of the vehicle body, or the like. The control circuit 6 performs calculation based on a signal of the steering angle, vehicle speed, vehicle height, or the like, and controls the stepping motor 71.

For example, it will be assumed that the projection lens 4 is a lens that images the light distribution pattern on the emitting surface 32 of the light guide component 3 at a magnification of 1000 onto the irradiated surface 9 located 25 m ahead. In this case, if the projection lens is translated by 2.0 mm from an optical axis center in the right direction (+x direction), the amount of movement of the optical axis at 25 m ahead is 1000 mm. At this time, the amount of tilt of the optical axis in the +x axis direction is represented by the following formula (3):

$$\tan^{-1}(1000 \text{ [mm]}/25000 \text{ [mm]})=2.29 \text{ [deg]} \quad (3).$$

That is, in the above example, the tilt of the optical axis is 2.29 degrees. That is, the headlight module 130 can tilt the optical axis by slightly translating the projection lens 4 in the left-right direction (x axis direction).

The control circuit 6 calculates the traveling direction of the vehicle based on the information (signal) detected by the vehicle body state sensor 66. The control circuit 6 then controls the stepping motor 71 so that an optical axis on the emitting surface 32 of the headlight module 130 is directed in an optimum direction, and adjusts the amount of shift of the projection lens 4 in the left-right direction. "Optical axis on the emitting surface 32" refers to an optical axis of light projected onto the irradiated surface 9.

Figure 20A:
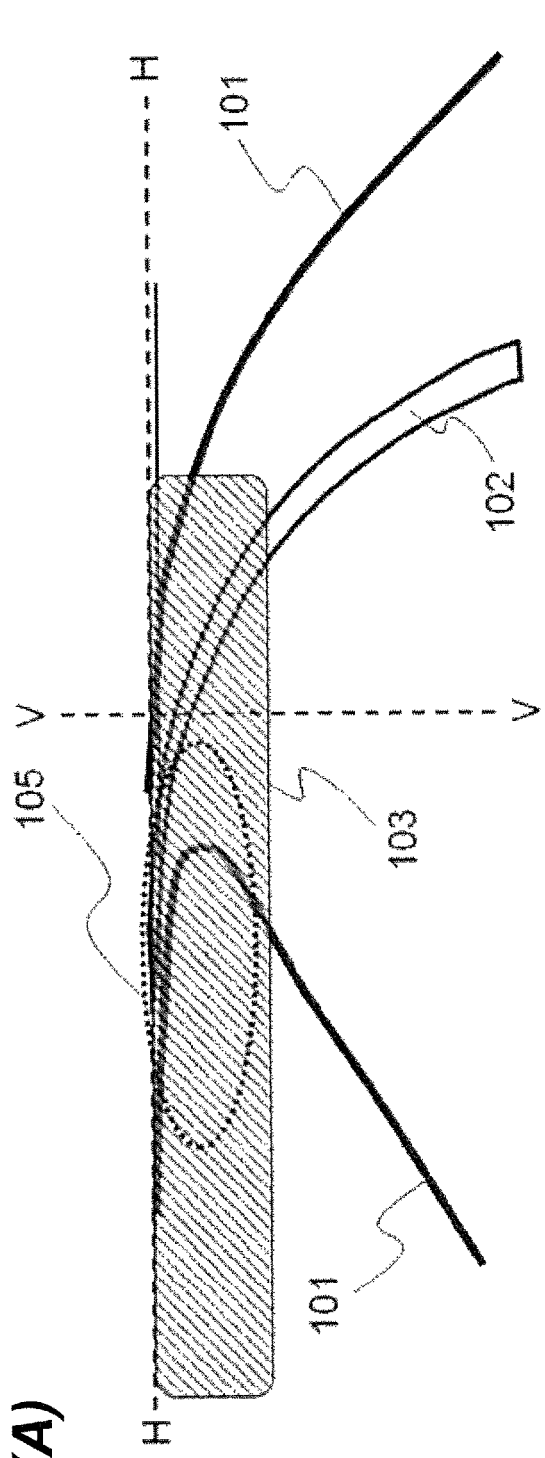
FIGS. 20(A) and 20(B) are diagrams each illustrating an irradiated area when a vehicle with the headlight module 130 according to the third embodiment is cornering.
Figure 20B:
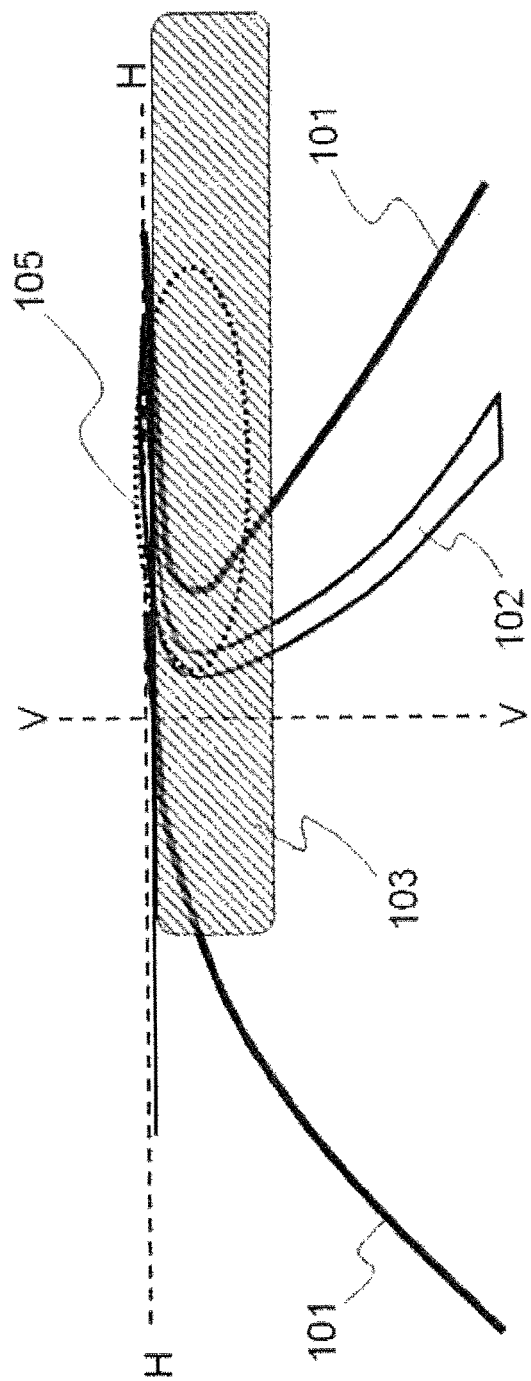

FIGS. 20(A) and 20(B) are diagrams each illustrating an irradiated area when a vehicle with the headlight module 130 according to the third embodiment is cornering. FIG. 20(A) illustrates a situation where the vehicle is traveling in the left lane of a corner curved to the left. FIG. 20(B) illustrates a situation where the vehicle is traveling in the left lane of a corner curved to the right.

In FIG. 20(A), the light distribution pattern 103 has been moved to the left side in the horizontal direction (direction of the line H-H). The corner area 105 is located at a center of the light distribution pattern 103. In FIG. 20(B), the light distribution pattern 103 has been moved to the right side in the horizontal direction (direction of the line H-H). The corner area 105 is located at a center of the light distribution pattern 103.

As described above, the control circuit 6 can direct the light distribution pattern 103 in an optimum direction by tilting the optical axis of the light distribution pattern 103 in the horizontal direction in accordance with the steering angle of the vehicle or the like. In FIG. 20, the "horizontal direction" is the direction of the line H-H.

Thus, in the case of traveling in a curve, whether the curve is left or right hand, the control circuit 6 can direct the optical axis of the light distribution pattern 103 to the corner area 105. The corner area 105 is in a driver's gaze direction. Here, "optical axis of the light distribution pattern 103 refers to a center of the cutoff line of the light distribution pattern 103 in the horizontal direction.

That is, in the case of traveling in a curve, whether the curve is left or right hand, the control circuit 6 can direct the light distribution pattern 103 to the corner area 105, which is in a driver's gaze direction. By the control of the control circuit 6, the headlight module 130 can illuminate the corner area 105 with a part having the highest illuminance of the light distribution pattern 103.

In this manner, the headlight module 130 according to the third embodiment translates the projection lens 4 by an optimum translation amount corresponding to the steering angle or the like of the vehicle. Thereby, when the vehicle turns a corner to the right or left, the headlight module 130 can illuminate an area (corner area 105) toward which the driver's gaze is directed, with a part having the highest illuminance of the light distribution pattern 103.

The headlight module 130 slightly translates the projection lens 4 in the left-right direction. Thus, the headlight module 130 can drive the driven part (projection lens 4) with a small driving force, as compared to a conventional case of rotating an illuminator (light source) and a large-diameter lens that are provided in a lamp main body. Further, since the driven part (projection lens 4) is smaller than that of the conventional case, the structure for supporting the driven part can be made small. Further, since the distance by which the projection lens 4 is translated is small, the light distribution pattern 103 can be moved in a short time.

The headlight module 130 of the third embodiment translates the projection lens 4 in the left-right direction (x axis direction) relative to the light guide component 3. However, as a method of translating the optical axis of the light distribution pattern in the left-right direction with respect to the traveling direction of the vehicle as in the third embodiment, the following method may be used. For example, the same advantages can be obtained by a method of turning the projection lens 4 in the left-right direction, i.e., a method of rotating the projection lens 4 about an axis parallel to the y axis and passing through the optical axis of the projection lens 4.

The headlight module 130 includes the translation mechanism 7 for translating the projection optical element 4 in a direction perpendicular to the optical axis of the projection optical element 4 relative to the light guide element 3.

In the third embodiment, as an example, the light guide element 3 is described as the light guide component 3. Further, as an example, the projection optical element 4 is described as the projection lens 4.

The headlight module 130 includes the translation means 7 for translating the projection optical element 4 in a direction perpendicular to the optical axis of the projection optical element 4 relative to the light guide element 3.

As an example, the translation means 7 is described as the translation mechanism 7.

<Modifications>

Figure 21:
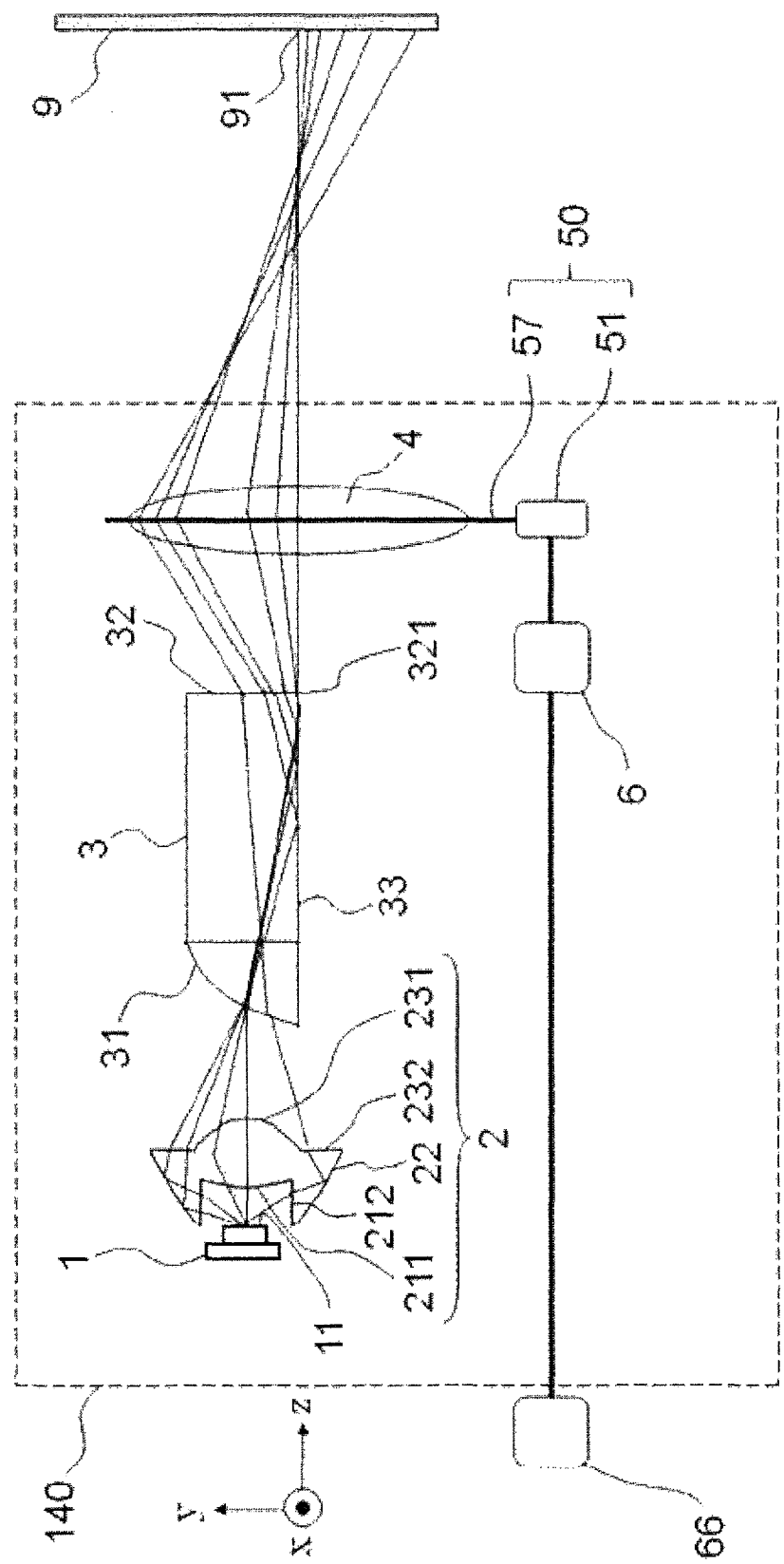
FIG. 21 is a configuration diagram illustrating a configuration of a headlight module 140 according to the third embodiment.

FIG. 21 is a configuration diagram illustrating a configuration of a headlight module 140. The headlight module 140 rotates the projection lens 4 about a shaft 57 parallel to the y axis and passing through an optical axis.

The headlight module 140 includes the light source 1, the light guide component 3, the projection lens 4, a rotation mechanism 50, and the control circuit 6. The headlight module 140 may include the condensing lens 2.

The rotation mechanism 50 rotates the projection lens 4 about the shaft 57.

The shaft 57 is a shaft parallel to the y axis and passing through the optical axis of the projection lens 4. The shaft 57 is a shaft parallel to the y axis and perpendicular to the optical axis of the projection lens 4. For simplicity, in FIG. 21, the shaft 57 is depicted to pass through the projection lens 4 in the y axis direction. Actually, the shaft 57 is formed by a pin or the like projecting from an end portion in the y axis direction of the projection lens 4.

The stepping motor 51 rotates the shaft 57. A shaft of the stepping motor 51 is connected to the shaft 57.

When the projection lens 4 is rotated clockwise about the rotation shaft 57 (shaft parallel to the y axis and passing through the optical axis of the projection lens 4) as viewed from the +y axis direction, the light distribution pattern on the irradiated surface 9 moves to the right (+x axis direction). Conversely, when the projection lens 4 is rotated counterclockwise about the rotation shaft 57 (shaft parallel to the y axis and passing through the optical axis of the projection lens 4), the light distribution pattern on the irradiated surface 9 moves to the left (−x axis direction).

With this method, the headlight module 140 can move the light distribution pattern on the irradiated surface 9 in the left-right direction. In this method, a part to be moved is only the projection lens 4. The headlight module 140 can smoothly move the light distribution pattern in the left-right direction with a small driving force. Further, since the angle by which the projection lens 4 is rotated is also small, the light distribution pattern 103 can be moved in a short time.

The headlight module 140 includes the rotation mechanism 50 for rotating the projection optical element 4 about the shaft 57 perpendicular to the optical axis of the projection optical element 4 relative to the light guide element 3.

In the third embodiment, as an example, the light guide element 3 is described as the light guide component 3. Further, as an example, the projection optical element 4 is described as the projection lens 4.

The headlight module 140 includes the rotation means 50 for rotating the projection optical element 4 about the shaft 57 perpendicular to the optical axis of the projection optical element 4 relative to the light guide element 3.

As an example, the rotation means 50 is described as the rotation mechanism 50.

Fourth Embodiment

Figure 22:
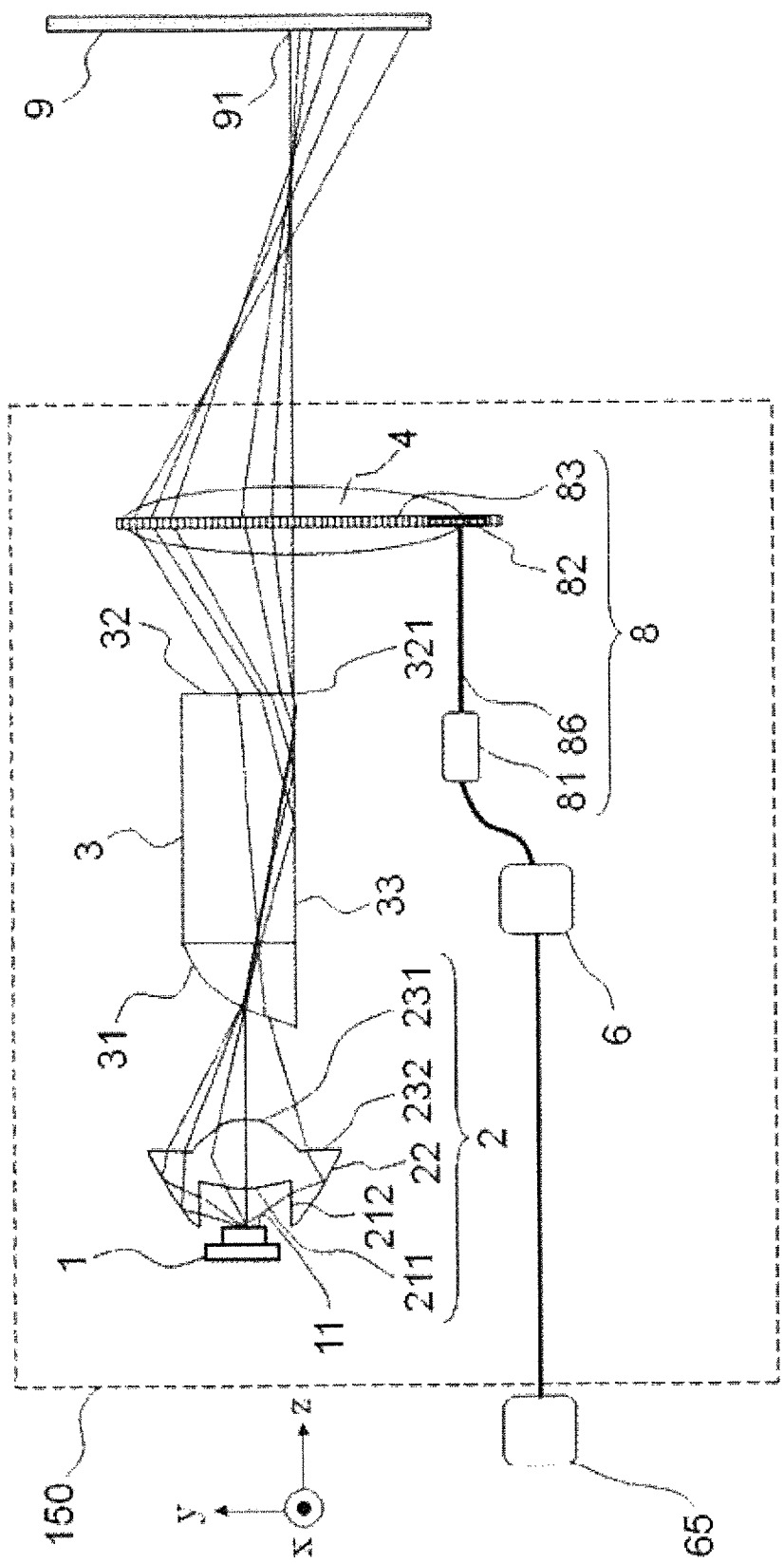
FIG. 22 is a configuration diagram illustrating a configuration of a headlight module 150 according to a fourth embodiment.

FIG. 22 is a configuration diagram illustrating a configuration of a headlight module 150 according to a fourth embodiment of the present invention. Elements that are the same as in FIG. 1 will be given the same reference characters, and descriptions thereof will be omitted. The elements that are the same as in FIG. 1 are the light source 1, condensing lens 2, light guide component 3, and projection lens 4.

As illustrated in FIG. 22, the headlight module 150 according to the fourth embodiment includes the light source 1, the light guide component 3, the projection lens 4, a translation mechanism 8, and the control circuit 6. The headlight module 150 may include the condensing lens 2.

The translation mechanism 8 moves the projection lens 4 in the y axis direction. The headlight module 150 differs from the headlight module 100 of the first embodiment in having the translation mechanism 8 and control circuit 6.

For example, in a headlight device of an automobile, when people ride in a rear part of the vehicle or when luggage or the like is loaded on the rear part of the vehicle, the vehicle body tilts backward. Also when the vehicle accelerates, the vehicle body tilts backward. Further, conversely, when the vehicle decelerates, the vehicle body tilts forward.

When the vehicle body tilts forward or backward in this manner, the optical axis of the light distribution pattern of the headlight also moves in the up-down direction. That is, when the vehicle body tilts forward or backward, the light distribution pattern moves in the up-down direction. Thus, the vehicle cannot obtain an optimum light distribution. Here, "vehicle body tilts forward or backward" refers to rotation of the vehicle body about an axis of a wheel.

Further, upward movement of the light distribution pattern causes a problem, such as dazzling an oncoming vehicle.

As a method for reducing the change of the light distribution due to the forward or backward tilt of the vehicle body, a method of tilting the entire headlight device in a direction opposite to the tilt of the vehicle body is commonly used. However, since the conventional technique tilts the headlight device, it has a problem that a large driving mechanism is required.

The headlight module 150 according to the fourth embodiment solves such a problem. The headlight module 150 solves such a problem with a small and simple structure.

As illustrated in FIG. 22, the translation mechanism 8 includes, for example, a stepping motor 81, a pinion 82, a rack 83, and a shaft 86.

The translation mechanism 8 of the headlight module 150 according to the fourth embodiment supports the projection lens 4 translatably in the y axis direction, as illustrated in FIG. 22.

The translation mechanism 8 translates the projection lens 4 in the up-down direction based on a translation amount obtained from the control circuit 6.

A shaft of the stepping motor 81 is connected to the shaft 86. The shaft of the stepping motor 81 and the shaft 86 are disposed in parallel with the z axis. That is, the shaft of the stepping motor 81 and the shaft 86 are disposed in parallel with the optical axis of the projection lens 4.

The pinion 82 is mounted on the shaft 86. An axis of the pinion 82 is parallel to the z axis. Teeth of the pinion 82 mesh with teeth of the rack 83. The pinion 82 is disposed on the outer side of the rack 83 with respect to the projection lens 4.

The rack 83 is mounted on the projection lens 4. The rack 83 is disposed on the right side (+x axis direction side) of the projection lens 4, as viewed in a direction (+z axis direction) from the headlight module 150 to the irradiated surface 9. Alternatively, the rack 83 may be disposed on the left side (−x axis direction side) of the projection lens 4, as viewed in a direction (+z axis direction) from the headlight module 150 to the irradiated surface 9.

The rack 83 is disposed in parallel with the y axis. That is, the rack 83 is disposed so that the teeth of the rack 83 are aligned in the vertical direction (y axis direction).

The teeth of the rack 83 are formed on the outer side with respect to the projection lens 4. That is, if the rack 83 is disposed on the right side (+x axis direction side) of the projection lens 4, the teeth of the rack 83 are formed on the right side (+x axis direction side) of the rack 83. If the rack 83 is disposed on the left side (−x axis direction side) of the projection lens 4, the teeth of the rack 83 are formed on the left side (−x axis direction side) of the rack 83.

As the stepping motor 81 rotates, the shaft 86 rotates. As the shaft 86 rotates, the pinion 82 rotates. That is, the pinion 82 rotates about the axis of the pinion 82 due to the rotation of the shaft 86. As the pinion 82 rotates, the rack 83 moves in the y axis direction. As the rack 83 moves in the y axis direction, the projection lens 4 moves in the y axis direction.

As described above, the translation mechanism 8 translates the projection lens 4 in the up-down direction based on a translation amount obtained from the control circuit 6.

For example, the control circuit 6 receives a signal of the tilt angle of the vehicle in the forward or backward direction detected by the vehicle body tilt sensor 65. The vehicle body tilt sensor 65 detects the tilt of the vehicle body in the forward or backward direction. Then, the control circuit 6 performs calculation based on the signal of the tilt angle and controls the stepping motor 81. The vehicle body tilt sensor 65 is, for example, a sensor, such as a gyro.

For example, it is assumed that the projection lens 4 is a lens that images the emitting surface 32 at a magnification of 1000 onto the irradiated surface 9 located 25 m ahead. If it is assumed that the vehicle body tilts upward by 5 degrees in the front-back direction, displacement of the optical axis at 25 m ahead is represented by the following formula (4). "Vehicle body is upward in the front-back direction" refers to a state where the front side of the vehicle body is above the rear side. "·" used in the formulae (1) and (2) is equivalent to "×" used in the formula (4) and denotes "multiplication."

$$25000 \,[\mathrm{mm}] \times \tan 5 \,[\mathrm{deg}] = 2187.2 \,[\mathrm{mm}] \quad (4).$$

That is, the optical axis is displaced from a predetermined position by 2187.2 mm upward (in the +y axis direction). "Predetermined" here refers to a position of the optical axis when the vehicle body is not tilted. Since the magnification is 1000, the amount of shift of the projection lens 4 required to correct the displacement of the optical axis is represented by the following formula (5):

$$2187.2 \,[\mathrm{mm}] / 1000 = 2.19 \,[\mathrm{mm}] \quad (5).$$

Only by moving (translating) the projection lens 4 by 2.19 mm downward, the displacement of the optical axis can be corrected. Further, conversely, if the vehicle body tilts downward by 5 degrees in the front-back direction, the projection lens 4 should be translated by 2.19 mm upward, contrary to the above description. "Vehicle body is downward in the front-back direction" refers to a state in which the rear side of the vehicle body is above the front side.

In this manner, the headlight module 150 according to the fourth embodiment can correct the displacement of the optical axis in the up-down direction (y axis direction) due to tilt of the vehicle body in the front-back direction, by slightly translating the projection lens 4 in the y axis direction. "Tilt of the vehicle body in the front-back direction" indicates that the rear side of the vehicle body and the front side of the vehicle body are different in height.

This eliminates the need for drive of the entire headlight device, which has been common up to now. Thus, the load on the driving part is reduced. Further, since the diameter of the projection lens 4 is small, a small and simple optical axis adjuster can be achieved. Further, since the distance by which the projection lens 4 is translated is also small, the light distribution pattern 103 can be moved in a short time.

In the headlight module 150 of the fourth embodiment, the projection lens 4 is translated in the up-down direction (y axis direction) relative to the light guide component 3. However, as a method for translating the light distribution pattern in the up-down direction with respect to the traveling direction of the vehicle as in the fourth embodiment, the following method may be used.

For example, the same advantages can be obtained by a method of turning the projection lens 4 in the up-down direction, i.e., a method of rotating the projection lens 4 about an axis parallel to the x axis and passing through the optical axis of the projection lens 4.

When the projection lens 4 is rotated clockwise about a rotational axis (axis parallel to the x axis and passing through the optical axis) as viewed from the +x axis direction, the light distribution pattern on the irradiated surface 9 moves downward (−y axis direction). Conversely, when the projection lens 4 is rotated counterclockwise about the rotational axis (axis parallel to the x axis and passing through the optical axis), the light distribution pattern on the irradiated surface 9 moves upward (+y axis direction).

With this method, it is possible to easily move the light distribution pattern on the irradiated surface 9 in the up-down direction. Also in this method, a part to be moved is only the projection lens 4, and the optical axis can be smoothly adjusted with a small driving force. Further, since the angle by which the projection lens 4 is rotated is also small, the light distribution pattern 103 can be moved in a short time.

The headlight module 150 according to the fourth embodiment translates the projection lens 4 of the headlight module 100 according to the first embodiment in the up-down direction (y axis direction) of the vehicle. Alternatively, the headlight module 150 turns the projection lens 4 of the headlight module 100 according to the first embodiment in the up-down direction (y axis direction) of the vehicle.

The configuration described in the fourth embodiment is also applicable to the headlight module 110.

Further, the same advantages can also be obtained by translating, in the up-down direction (y axis direction) of the vehicle, the projection lens 4 of any of the headlight module 120 according to the second embodiment and the headlight module 130 according to the third embodiment. The same advantages can also be obtained by turning, in the up-down direction (y axis direction) of the vehicle, the projection lens 4 of any of the headlight module 120 according to the second embodiment and the headlight module 130 according to the third embodiment. In these cases, the rotation mechanism 5 of the headlight module 120 or the translation mechanism 7 of the headlight module 130 needs to be moved or rotated together with the projection lens 4.

Further, as described later, in a headlight device 250 including multiple headlight modules, the headlight modules may be assigned to different illumination areas. In such a case, the directions of movement of the illumination areas of the headlight modules are not necessarily limited to the left-right direction (third embodiment) or the up-down direction (fourth embodiment).

For example, a headlight module assigned to a high illuminance region in the light distribution pattern may move the illumination area in an oblique direction or the like in accordance with the driving situation of the vehicle.

In such a case, by rotating the configuration described in the third embodiment or fourth embodiment about an optical axis to arrange it, it is possible to move the illumination area to an arbitrary position on a plane (irradiated surface 9) perpendicular to the optical axis.

That is, the projection lens 4 moves on a plane perpendicular to the optical axis of the projection lens 4, thereby changing the emission direction of the emitted light. Alternatively, the projection lens 4 rotates about an axis perpendicular to the optical axis of the projection lens 4, thereby changing the emission direction of the emitted light.

The headlight module 150 includes the translation mechanism 8 for translating the projection optical element 4 in a direction perpendicular to the optical axis of the projection optical element 4 relative to the light guide element 3.

In the fourth embodiment, as an example, the light guide element 3 is described as the light guide component 3. Further, as an example, the projection optical element 4 is described as the projection lens 4.

The headlight module 150 includes the translation means 8 for translating the projection optical element 4 in a direction perpendicular to the optical axis of the projection optical element 4 relative to the light guide element 3.

As an example, the translation means 8 is described as the translation mechanism 8.

Fifth Embodiment

Figure 23:
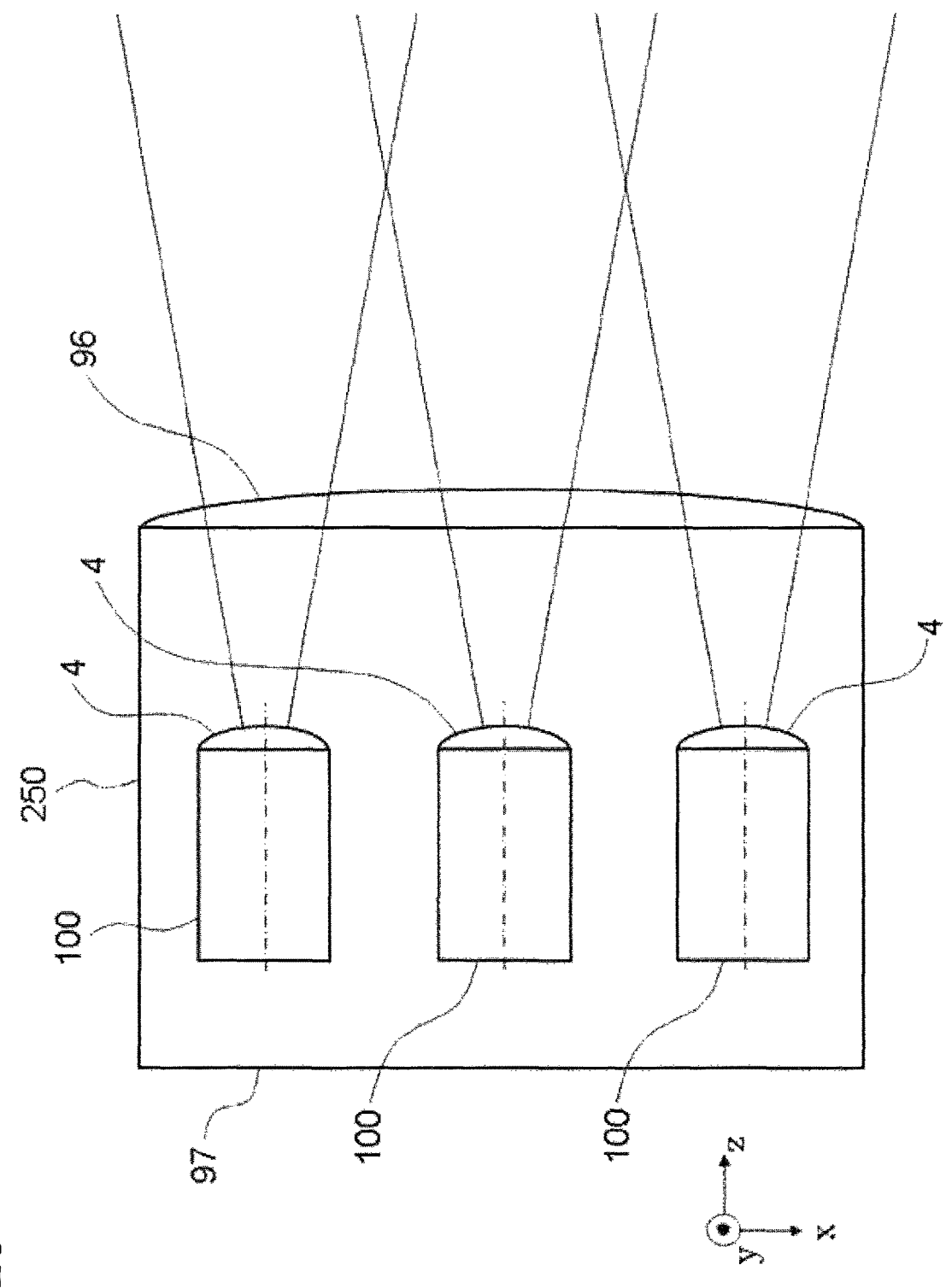
FIG. 23 is a configuration diagram illustrating a configuration of a headlight device 250 with headlight modules according to a fifth embodiment of the present invention.

FIG. 23 is a configuration diagram illustrating a configuration of the headlight device 250 having the headlight module 100, 110, 120, 130, 140, or 150. In the above embodiments, the embodiments of the headlight modules 100, 110, 120, 130, 140, and 150 are described. In FIG. 23, as an example, an example having the headlight modules 100 is illustrated.

For example, all or a subset of the three headlight modules 100 illustrated in FIG. 23 may be replaced with the headlight modules 110, 120, 130, 140, or 150.

The headlight device 250 includes a housing 97. Further, the headlight device 250 may include a cover 96.

The housing 97 holds the headlight modules 100.

The housing 97 is disposed inside a vehicle body.

The headlight modules 100 are housed inside the housing 97. In FIG. 23, as an example, the three headlight modules 100 are housed. The number of headlight modules 100 is not limited to three. The number of headlight modules 100 may be one or three or more.

The headlight modules 100 are arranged in the x axis direction inside the housing 97, for example. Arrangement of the headlight modules 100 is not limited to the arrangement in the x axis direction. In view of the design, function, or the like, the headlight modules 100 may be displaced from each other in the y or z axis direction.

Further, in FIG. 23, the headlight modules 100 are housed inside the housing 97. However, the housing 97 need not have a box shape. The housing 97 may consist of a frame or the like and have a configuration in which the headlight modules 100 are fixed to the frame. This is because in the case of a four-wheeled automobile or the like, the housing 97 is disposed inside the vehicle body. The frame or the like may be a part constituting the vehicle body. In this case, the housing 97 is a housing part that is a part constituting the vehicle body.

In the case of a motorcycle, the housing 97 is disposed near the handle. In the case of a four-wheeled automobile, the housing 97 is disposed inside the vehicle body.

The cover 96 transmits light emitted from the headlight modules 100. The light passing through the cover 96 is emitted in front of the vehicle. The cover 96 is made of transparent material.

The cover 96 is disposed at a surface part of the vehicle body and exposed on the outside of the vehicle body.

The cover 96 is disposed in the z axis direction from the housing 97.

Light emitted from a headlight module 100 passes through the cover 96 and is emitted in front of the vehicle. In FIG. 23, the light emitted from the cover 96 is superposed with light emitted from the adjacent headlight modules 100 to form a single light distribution pattern.

The cover 96 is provided to protect the headlight modules 100 from weather, dust, or the like. However, if the projection lens 4 is configured to protect the components inside the headlight modules 100 from weather, dust, or the like, there is no need to provide the cover 96.

As described above, if the headlight device 250 has multiple headlight modules 100, it is an assembly of the headlight modules 100. Further, if the headlight device 250 has a single headlight module 100, it is equal to the headlight module 100. That is, the headlight module 100 is the headlight device 250.

The above-described embodiments use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Further, although the embodiments of the present invention are described as above, the present invention is not limited to these embodiments.

DESCRIPTION OF REFERENCE CHARACTERS 100, 110, 120, 130, 140, 150 headlight module, 250 headlight device, 1 light source, 11 light emitting surface, 15a, 15b, 15c light source module, 2 condensing lens, 211, 212 incident surface, 22 reflecting surface, 231, 232 emitting surface, 232a, 232b region, 3, 30, 35 light guide component, 31 incident surface, 32 emitting surface, 321 edge, 33 reflecting surface, 4 projection lens, 5, 50 rotation mechanism, 51 stepping motor, 52, 53, 54, 55 gear, 56, 57 shaft, 6 control circuit, 65 vehicle body tilt sensor, 66 vehicle body state sensor, 7 translation mechanism, 71 stepping motor, 72 pinion, 73 rack, 76 shaft, 8 translation mechanism, 81 stepping motor, 82 pinion, 83 rack, 86 shaft, 9 irradiated surface, 91 cutoff line, 92 region on the lower side of the cutoff line, 93 brightest region, 94 motorcycle, 95 wheel, 96 cover, 97 housing, 98 position in contact with the ground, 101 line indicating a road surface, 102 center line, 103, 104, 106 light distribution pattern, 105 corner area, PH light concentration position, $S_{out}$, $S_{out1}$, $S_{out2}$ emission angle, $S_1$, $S_3$, $S_4$, $S_6$ incident angle, $S_2$, $S_5$ reflection angle, $m_1$, $m_2$, $m_3$, $m_4$ perpendicular line, d tilt angle, Q point.

The invention claimed is:

1. A headlight module comprising:
   a light source for emitting light;
   a condensing element for concentrating light emitted from the light source;
   a light guide element having an incident surface for receiving light emitted from the condensing element, a reflecting surface for reflecting the received light, and an emitting surface for emitting the received light; and
   a projection optical element for projecting a first light distribution pattern formed on the emitting surface, as a second light distribution pattern, wherein the incident surface has positive refractive power or negative refractive power, wherein a condensing function of the condensing element and the incident surface forms a shape of the first light distribution pattern, wherein the reflecting surface superposes light that enters through the incident surface and is reflected at the reflecting surface and light that enters through the incident surface and is not reflected at the reflecting surface on the emitting surface, thereby forming a high luminous intensity region on the emitting surface, and wherein the high luminous intensity region is formed in a region of the first light distribution pattern.

2. The headlight module of claim 1, wherein the emitting surface has a curved surface shape.

3. The headlight module of claim 1, wherein in a light beam entering the light guide element from the condensing element, in a normal direction of the reflecting surface, a light concentration position of a first light ray at an end on a front surface side of the reflecting surface is farther from the condensing element than a light concentration position of a second light ray at an end on a side opposite to the first light ray.

4. The headlight module of claim 1, wherein an end portion of the reflecting surface in a direction in which the received light travels in the light guide element includes a point located at a position of a focal point of the projection optical element in a direction of an optical axis of the projection optical element.

5. The headlight module of claim 1, wherein the light source is a solid-state light source having directivity.

6. The headlight module of claim 5, wherein the projection optical element projects a shape of a light emitting surface of the light source.

7. The headlight module of claim 1, wherein the reflecting surface is inclined so that an optical path in the light guide element becomes wider in a direction in which the received light travels in the light guide element.

8. A headlight device comprising the headlight module of claim 1.

9. A headlight module comprising:
a light source for emitting light;
a light guide element having an incident surface for receiving light emitted from the light source, a reflecting surface for reflecting the received light, and an emitting surface for emitting the received light; and
a projection optical element for projecting a first light distribution pattern formed on the emitting surface, as a second light distribution pattern, wherein the incident surface has positive refractive power, wherein the incident surface forms a shape of the first light distribution pattern by changing a divergence angle of light entering through the incident surface, wherein the reflecting surface superposes light that enters through the incident surface and is reflected at the reflecting surface and light that enters through the incident surface and is not reflected at the reflecting surface on the emitting surface, thereby forming a high luminous intensity region on the emitting surface, and wherein the high luminous intensity region is formed in a region of the first light distribution pattern.

10. The headlight module of claim 9, wherein the emitting surface has a curved surface shape.

11. The headlight module of claim 9, wherein when viewed in a first plane that is a plane parallel to a direction in which the light guide element emits light and perpendicular to the reflecting surface, the incident surface has positive refractive power.

12. The headlight module of claim 11, wherein the incident surface has a first focal point in the first plane, and
wherein when viewed in a second plane that is a plane parallel to the direction in which the light guide element emits light and perpendicular to the first plane, the incident surface has positive refractive power so as to have a second focal point at a position different from the first focal point in the direction in which the light guide element emits light.

13. The headlight module of claim 11, wherein when viewed in a second plane that is a plane parallel to the direction in which the light guide element emits light and perpendicular to the first plane, the incident surface has negative refractive power.

14. The headlight module of claim 9, further comprising a condensing element for concentrating light emitted from the light source,
wherein in a light beam entering the light guide element from the condensing element, in a normal direction of the reflecting surface, a light concentration position of a first light ray at an end on a front surface side of the reflecting surface is farther from the condensing element than a light concentration position of a second light ray at an end on a side opposite to the first light ray.

15. The headlight module of claim 9, wherein an end portion of the reflecting surface in a direction in which the received light travels in the light guide element includes a point located at a position of a focal point of the projection optical element in a direction of an optical axis of the projection optical element.

16. The headlight module of claim 9, wherein the light source is a solid-state light source having directivity.

17. The headlight module of claim 16, wherein the projection optical element projects a shape of a light emitting surface of the light source.

18. The headlight module of claim 9, wherein the reflecting surface is inclined so that an optical path in the light guide element becomes wider in a direction in which the received light travels in the light guide element.

19. A headlight device comprising the headlight module of claim 9.

* * * * *